(12) United States Patent
Shi et al.

(10) Patent No.: US 12,179,205 B2
(45) Date of Patent: Dec. 31, 2024

(54) REAGENT PACKAGING DEVICES AND USES THEREOF

(71) Applicant: CytoChip Inc., Irvine, CA (US)

(72) Inventors: Wendian Shi, Irvine, CA (US); Yuzhe Ding, Irvine, CA (US)

(73) Assignee: CytoChip Inc., Irvine, CA (US)

( * ) Notice: Subject to any disclaimer, the term of this patent is extended or adjusted under 35 U.S.C. 154(b) by 87 days.

(21) Appl. No.: 17/808,187

(22) Filed: Jun. 22, 2022

(65) Prior Publication Data

US 2022/0314224 A1    Oct. 6, 2022

Related U.S. Application Data

(63) Continuation of application No. 16/612,126, filed as application No. PCT/US2018/031893 on May 9, 2018, now Pat. No. 11,400,453.

(60) Provisional application No. 62/504,866, filed on May 11, 2017.

(51) Int. Cl.
 B01L 3/00    (2006.01)
(52) U.S. Cl.
 CPC ........... B01L 3/52 (2013.01); B01L 3/502715 (2013.01); *B01L 2300/044* (2013.01); *B01L 2400/0481* (2013.01); *B01L 2400/0487* (2013.01)
(58) Field of Classification Search
 CPC ............ B01L 3/52; B01L 3/502715; B01L 2300/044; B01L 2400/0481; B01L 2400/0487
 USPC ................................................ 422/555, 500
 See application file for complete search history.

(56) References Cited

U.S. PATENT DOCUMENTS

| | | | |
|---|---|---|---|
| 5,660,796 | A | 8/1997 | Sheehy |
| 6,033,631 | A | 3/2000 | Zuckermann et al. |
| 8,795,607 | B2 | 8/2014 | Kurowski et al. |
| 2004/0241042 | A1 | 12/2004 | Pugia et al. |

(Continued)

FOREIGN PATENT DOCUMENTS

| | | |
|---|---|---|
| CN | 1534297 A | 10/2004 |
| CN | 101024340 A | 8/2007 |

(Continued)

OTHER PUBLICATIONS

First Search Report, dated Mar. 22, 2021, 2 pages, issued by the China National Intellectual Property Administration (CNIPA) regarding CN 201880031228, now allowed.

(Continued)

*Primary Examiner* — Christine T Mui
(74) *Attorney, Agent, or Firm* — AVEK IP, LLC

(57) ABSTRACT

The present disclosure relates to new types of fluid packaging devices and methods of making and using such fluid packaging devices. In various embodiments, the present disclosure provides devices, systems, and methods for packaging fluids. In various embodiments, the present disclosure provides a device including a storage compartment; a fluid stored in the storage compartment; a first aperture on the storage compartment; and a second aperture on the storage compartment. The first aperture is initially sealed or closed before the use of the device and configured to be opened to receive a pneumatic pressure. The second aperture is initially sealed or closed before the use of the device and configured to be opened to allow the fluid to exit or enter the storage compartment via the opened second aperture.

20 Claims, 40 Drawing Sheets

(56) References Cited

U.S. PATENT DOCUMENTS

| | | | |
|---|---|---|---|
| 2007/0183935 A1* | 8/2007 | Clemmens | B01L 3/50273 |
| | | | 435/286.7 |
| 2010/0308051 A1* | 12/2010 | Weber | B01L 3/502738 |
| | | | 220/266 |
| 2011/0002812 A1 | 1/2011 | Asogawa et al. | |
| 2011/0020497 A1 | 1/2011 | Steven et al. | |
| 2011/0186466 A1* | 8/2011 | Kurowski | B01L 3/502715 |
| | | | 220/4.01 |
| 2012/0107811 A1 | 5/2012 | Kelso et al. | |
| 2013/0130262 A1 | 5/2013 | Battrell et al. | |
| 2013/0136671 A1 | 5/2013 | Li et al. | |
| 2014/0033809 A1 | 2/2014 | Bransky et al. | |
| 2014/0161686 A1 | 6/2014 | Bort et al. | |
| 2014/0263439 A1* | 9/2014 | Wright | F17D 1/08 |
| | | | 222/93 |
| 2014/0287525 A1 | 9/2014 | Talmer et al. | |
| 2015/0093815 A1 | 4/2015 | Kiani et al. | |
| 2017/0081099 A1 | 3/2017 | Priscal et al. | |

FOREIGN PATENT DOCUMENTS

| | | |
|---|---|---|
| CN | 101176001 A | 5/2008 |
| CN | 102105227 A | 6/2011 |
| CN | 102387966 A | 3/2012 |
| CN | 103038331 A | 4/2013 |
| CN | 105992648 A | 10/2016 |
| WO | 2016161524 A1 | 10/2016 |
| WO | 2016187605 A1 | 11/2016 |

OTHER PUBLICATIONS

International Preliminary Report on Patentability, dated Nov. 12, 2019, 9 pages, issued in PCT Application No. PCT/US2018/031893.

International Search Report and Written Opinion, dated Aug. 3, 2018, 10 pages, issued in PCT Application No. PCT/US2018/031893.

Supplementary European Search Report, dated Jan. 17, 2020, 3 pages, issued in European U.S. Appl. No. 18/799,397, now allowed.

* cited by examiner

REAGENT PACKAGING DEVICES AND USES THEREOF

CROSS REFERENCE TO RELATED APPLICATIONS

This application is a continuation of the U.S. application Ser. No. 16/612,126, filed on Nov. 8, 2019, which is the United States national stage entry under 35 U.S.C. 371 of PCT/US18/31893, filed on May 9, 2018, which claims priority to U.S. Provisional Patent Application No. 62/504,866, filed on May 11, 2017, the disclosure of which are incorporated by reference herein in their entireties.

FIELD OF THE DISCLOSURE

The disclosure relates generally to the field of medicine and medical devices. More specifically, the disclosure relates to the field of medical fluid packaging devices.

BACKGROUND

All publications cited herein are incorporated by reference in their entirety to the same extent as if each individual publication or patent application were specifically and individually indicated to be incorporated by reference. The following description includes information that may be useful in understanding the present disclosure. It is not an admission that any of the information provided herein is prior art or relevant to the presently disclosure, or that any publication specifically or implicitly referenced is prior art.

In various applications of chemical, biological, or in vitro diagnostic analysis, fluid reagents are often used to prepare and process samples to be analyzed. Conventionally, these fluid reagents are packaged and stored in bulk, for example, in large containers, from which small portions of the fluid reagents are taken out for each time of analysis. Therefore, skilled technicians and precision fluid-handling tools are often required for precisely pipetting and aliquoting the desired amount of the fluid reagents. These operations occupy additional personnel and time in analysis and increase the risk of human errors and cross-contamination between samples. Also, bulk storage can subject the fluid reagents to limited shelf life once their packages are opened for the first use.

Hence, fluid reagents are sometimes stored in disposable fluid packaging devices, each of which is sufficient for only one test. During the test, the stored reagents are released from a packaging device into an assay device, for example, a diagnostic cartridge. The packaging device and the assay device form a self-sufficient assay system. Examples of these disposable fluid packaging devices and their uses are described in US 2011/0186466 A1 and US 2012/0107811 A1. In these fluid packaging devices, a chamber body is used to package the fluid reagents, and is separated from the assay device with a breakable seal. After the seal is broken, an external compression mechanism is used to press the chamber body and push the fluid reagents out of the chamber body into the assay device.

However, these fluid packaging devices are sensitive to issues such as dead volume of their chamber bodies and bubbles in reagents because the fluid reagents are driven out by the shrinkage of their chamber volume. As a result, they have imprecision and inconsistency problems with the reagent volume released for analysis.

To solve these imprecision and inconsistency problems, the present disclosure provides new types of fluid packaging devices and methods of making and using such fluid packaging devices.

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

The present disclosure provides new types of fluid packaging devices and methods of making and using such fluid packaging devices. These fluid packaging devices can be used to deliver desired amounts of reagents for analysis. They can be used with assay devices to form self-sufficient assay systems. In some situations, a packaging device and an assay device can be manufactured separately and then assembled prior to sample analysis, for example, by adhering the packaging device to the assay device. In other situations, a packaging device can be built into an assay device, manufactured together, and used for sample analysis without additional assembly steps. Furthermore, these fluid packaging devices may have functions in addition to packaging and storing fluid reagents. For example, they can perform functions in the assay devices (e.g., serving as mixing chambers, reaction chambers and storage chambers, etc.); this can simplify the overall design of the assay system.

Various embodiments of the present disclosure provide a device. The device includes: a storage compartment; a fluid stored in the storage compartment; a first aperture on the storage compartment; and a second aperture on the storage compartment. The first aperture is initially sealed or closed before the use of the device and configured to be opened to receive a pneumatic pressure. The second aperture is initially sealed or closed before the use of the device and configured to be opened to allow the fluid to exit or enter the storage compartment via the opened second aperture. In various embodiments, the device is configured for storing or packaging a fluid. In various embodiments, the device can be used for storing or packaging a fluid. In various embodiments, the device is a fluid storing or packaging device.

Various embodiments of the present disclosure provide a method. The method includes: providing a device that comprise a storage compartment, a fluid stored in the storage compartment, a first aperture on the storage compartment, and a second aperture on the storage compartment; opening the first aperture; opening the second aperture; and applying a pneumatic pressure to the opened first aperture to move the fluid to exit or enter the storage compartment via the opened second aperture. The first aperture is initially sealed or closed before the use of the device. The second aperture is initially sealed or closed before the use of the device.

In various embodiments, the device is a part of a fluidic cartridge device. In various embodiments, the method further comprises transferring at least a portion of the fluid stored in the storage compartment to form a sample mixture with at least a portion of a sample received in the fluidic cartridge device. In various embodiments, the method further comprises transferring at least a portion of the sample received in the cartridge device into the storage compartment via the opened second aperture. In various embodiments, the method further comprises placing the cartridge device into a reader instrument for analysis.

Various embodiments of the present disclosure provide a system for analyzing a sample. The system comprises: a device and a reader instrument configured for receiving the device to perform an analysis of the sample. In the system, the device comprises: a storage compartment; a fluid stored in the storage compartment; a first aperture on the storage compartment; and a second aperture on the storage compartment. The first aperture is initially sealed or closed before the use of the device and configured to be opened to receive a pneumatic pressure. The second aperture is initially sealed or closed before the use of the device and configured to be opened to allow the fluid to exit or enter the storage compartment via the opened second aperture. More information and examples of the reader instrument can be found in U.S. patent application Ser. No. 15/803,133 and U.S. patent application Ser. No. 15/819,416, which are incorporated herein by reference in their entirety as if fully set forth.

In some embodiments, the disclosure provides a fluid cartridge device including a packaging device. The packaging device includes a storage compartment; a fluid stored in the storage compartment; and an aperture on the storage compartment, the aperture being initially sealed or closed before the use of the packaging device and being configured to be opened to allow the fluid to exit or enter the storage compartment via the opened aperture.

The packaging device is configured to transfer at least a portion of the fluid stored in the storage compartment to form a sample mixture with at least a portion of a sample received in the fluid cartridge device.

The packaging device is configured to transfer at least a portion of the sample mixture back into the storage compartment via the opened aperture, such that the packaging device functions both as a storage device and as a mixing device.

Optionally, the aperture includes a reversible seal.

Optionally, the aperture is configured to be opened to allow the fluid to exit or enter the storage compartment via the opened aperture by an internal actuation component inside the storage compartment.

Optionally, the internal actuation component is configured to open the aperture by compressing a part of the packaging device.

Optionally, a gas-liquid interface or a vacuum-liquid interface is initially positioned above the aperture along a gravity direction.

Optionally, the packaging device includes an additional aperture on the storage compartment; and the additional aperture is initially sealed or closed before the use of the packaging device.

Optionally, the additional aperture includes an intact area of a barrier layer; and the additional aperture is configured to be pierced open.

Optionally, the additional aperture is configured to be opened to receive a pneumatic pressure.

Optionally, the additional aperture is positioned higher than the aperture along a gravity direction; and a gas-liquid interface or a vacuum-liquid interface is initially positioned between the additional aperture and the aperture along the gravity direction.

Optionally, the fluid cartridge device further includes a microfluidic channel. The microfluidic channel separates the additional aperture from the fluid stored in the storage compartment.

Optionally, the fluid cartridge device further includes a microfluidic channel, wherein the microfluidic channel is smaller than the additional aperture in a dimension measurement selected from the group consisting of width and height.

In some embodiments, the disclosure provides a packaging device including: a storage compartment; a fluid stored in the storage compartment; a first aperture on the storage compartment, the first aperture being initially sealed or closed before the use of the packaging device; a second aperture on the storage compartment, the second aperture being initially sealed or closed before the use of the packaging device and being configured to be opened to allow the fluid to exit or enter the storage compartment via the opened second aperture; and an internal actuation component in the storage compartment.

The second aperture includes a reversible seal; and the internal actuation component is configured to open the second aperture.

Optionally, the internal actuation component is configured to break the reversible seal by compressing a part of the packaging device.

Optionally, a gas-liquid interface or a vacuum-liquid interface is initially positioned above the second aperture along a gravity direction.

Optionally, the first aperture is positioned higher than the second aperture along a gravity direction; and a gas-liquid interface or a vacuum-liquid interface is initially positioned between the first aperture and the second aperture along the gravity direction.

Optionally, the packaging further includes a microfluidic channel. The microfluidic channel separates the first aperture from the fluid stored in the storage compartment.

Optionally, the packaging further includes a microfluidic channel. The microfluidic channel is smaller than the first aperture in a dimension measurement selected from the group consisting of width and height.

Optionally, the first aperture includes an intact area of a barrier layer; and the first aperture is configured to be pierced open.

Optionally, the first aperture is configured to be opened to receive a pneumatic pressure.

Optionally, the packaging device is configured to transfer at least a portion of the fluid stored in the storage compartment to form a sample mixture with at least a portion of a sample received in a fluid cartridge device; and the packaging device is configured to transfer at least a portion of the sample mixture back into the storage compartment via the opened aperture, such that the packaging device functions both as a storage device and as a mixing device.

BRIEF DESCRIPTION OF THE DRAWINGS

Exemplary embodiments are illustrated in the referenced figures. It is intended that the embodiments and figures disclosed herein are to be considered illustrative rather than restrictive.

DETAILED DESCRIPTION

Figure 1A:
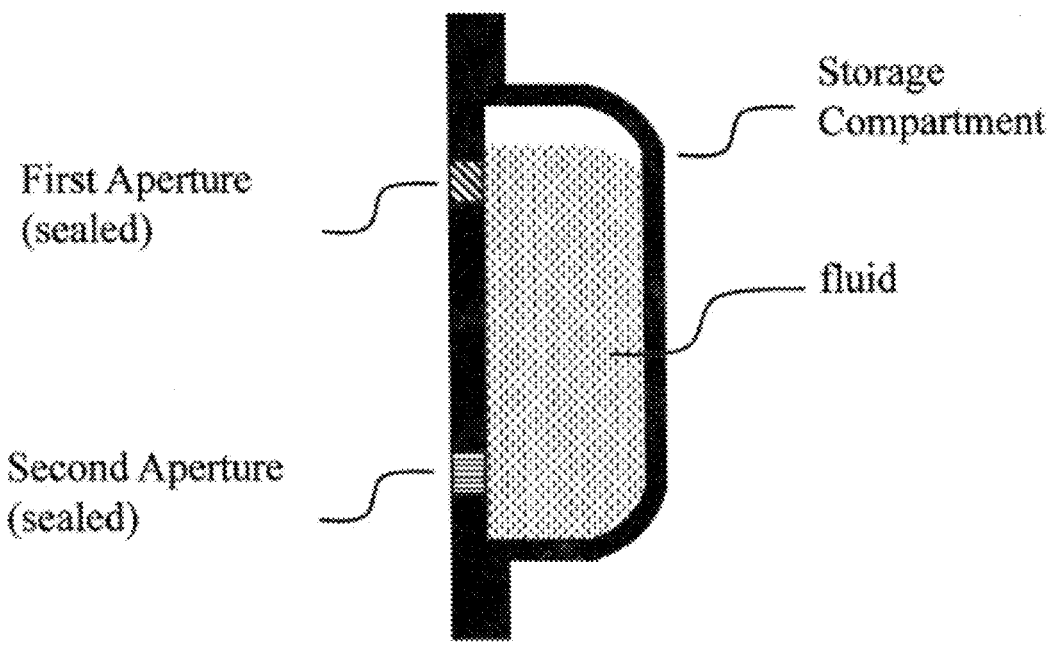
FIG. 1A illustrates, in accordance with various embodiments of the disclosure, one non-limiting example of the structures of the fluid packaging devices described herein.

All references cited herein are incorporated by reference in their entirety as though fully set forth. Unless defined otherwise, technical and scientific terms used herein have the same meaning as commonly understood by one of ordinary skill in the art to which this disclosure belongs. Tabelling, *Introduction to Microfluidics reprint edition*, Oxford University Press (2010); Hguyen et al., *Fundamentals and Applications of Microfluidics* 2$^{nd}$ ed., Artech House Incorporated (2006); Berg et al., *Microfluidics for Medical Applications*, Royal Society of Chemistry (2014); Gomez et al., *Biological Applications of Microfluidics* 1$^{st}$ ed., Wiley-Interscience (2008); and Colin et al., *Microfluidics* 1$^{st}$ ed., Wiley-ISTE (2010), provide one skilled in the art with a general guide to many of the terms used in the present application.

One skilled in the art will recognize many methods and materials similar or equivalent to those described herein, which could be used in the practice of the present disclosure. Other features and advantages of the disclosure will become apparent from the following detailed description, taken in conjunction with the accompanying drawings, which illustrate, by way of example, various features of embodiments of the disclosure. Indeed, the present disclosure is in no way limited to the methods and materials described. For convenience, certain terms employed herein, in the specification, examples and appended claims are collected here.

Unless stated otherwise, or implicit from context, the following terms and phrases include the meanings provided below. Unless explicitly stated otherwise, or apparent from context, the terms and phrases below do not exclude the meaning that the term or phrase has acquired in the art to which it pertains. Unless otherwise defined, all technical and scientific terms used herein have the same meaning as commonly understood by one of ordinary skill in the art to which this disclosure belongs. It should be understood that this disclosure is not limited to the particular methodology, devices, systems, protocols, and reagents, etc., described herein and as such can vary. The definitions and terminology used herein are provided to aid in describing particular embodiments, and are not intended to limit the claims.

As used herein the term "comprising" or "comprises" is used in reference to compositions, methods, and respective component(s) thereof, that are useful to an embodiment, yet open to the inclusion of unspecified elements, whether useful or not. It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.).

Unless stated otherwise, the terms "a" and "an" and "the" and similar references used in the context of describing a particular embodiment of the application (especially in the context of claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. The abbreviation, "e.g." is derived from the Latin exempli gratia, and is used herein to indicate a non-limiting example. Thus, the abbreviation "e.g." is synonymous with the term "for example." No language in the specification should be construed as indicating any non-claimed element essential to the practice of the application.

Various embodiments of the present disclosure provide a device. The device comprises: a storage compartment; a fluid stored in the storage compartment; a first aperture on the storage compartment; and a second aperture on the storage compartment. In various embodiments, the device is configured for storing or packaging a fluid. In various embodiments, the device can be used for storing or packaging a fluid. In various embodiments, the device is a fluid storing or packaging device. The first aperture is initially sealed or closed before the use of the device and configured to be opened to receive a pneumatic pressure. The second aperture is initially sealed or closed before the use of the device and configured to be opened to allow the fluid to exit or enter the storage compartment via the opened second aperture.

Various embodiments of the present disclosure provide a system for analyzing a sample. The system comprises: a device as described herein, and a reader instrument configured for receiving the device to perform an analysis of the sample.

Various embodiments of the present disclosure provide a system for analyzing a sample. The system comprises: a device and a reader instrument configured for receiving the device to perform an analysis of the sample. In the system, the device comprises: a storage compartment; a fluid stored in the storage compartment; a first aperture on the storage compartment; and a second aperture on the storage compartment. The first aperture is initially sealed or closed before the use of the device and configured to be opened to receive a pneumatic pressure. The second aperture is initially sealed or closed before the use of the device and configured to be opened to allow the fluid to exit or enter the storage compartment via the opened second aperture.

More information and examples of the reader instrument can be found in U.S. patent application Ser. No. 15/803,133 and U.S. patent application Ser. No. 15/819,416, which are incorporated herein by reference in their entirety as if fully set forth.

In various embodiments, the storage compartment comprises a barrier layer. In various embodiments, the storage compartment comprises a barrier layer that comprises a material having a water vapor transmission rate in the range of about 0-0.01, 0.01-0.02, 0.02-0.05, 0.05-0.1, or 0.1-0.2 g·mm/m²·day. In accordance with the present disclosure, the vapor transmission rate can be measured under the DIN 53 122 standard for quantifying moisture barrier and packaging material. In various embodiments, the storage compartment comprises a barrier layer that comprises one or more of aluminum foil, $SiO_x$, $Al_2O_3$, Cyclic Olefin Polymer, Cyclic Olefin Copolymer, Polychlorotrifluoroethylene, and High-density Polyethylene.

In various embodiments, the first aperture comprises a reversible seal or an intact area of a barrier layer. The reversible seal or the intact area of the barrier layer is configured to be opened to allow the first aperture to receive the pneumatic pressure. In various embodiments, the intact area of the barrier layer is configured to be pierced through to allow the first aperture to receive the pneumatic pressure. In various embodiments, the first aperture further comprises a predefined opening that is initially sealed by the reversible seal or the intact area of the barrier layer.

In various embodiments, the second aperture comprises a reversible seal or an intact area of a barrier layer. The reversible seal or the intact area of the barrier layer is configured to be opened to allow the fluid to exit or enter the storage compartment via the opened second aperture. In various embodiments, the intact area of the barrier layer is configured to be pierced through to allow the fluid to exit or enter the storage compartment via the opened second aperture. In various embodiments, the second aperture further comprises a predefined opening that is initially sealed by the reversible seal or the intact area of the barrier layer.

In various embodiments, the storage compartment has a storage volume in the range of about 1-10, 10-20, 20-30, 30-40, 40-50, 50-60, 60-70, 70-80, 80-90, 90-100, 100-200, 200-300, 300-400, 400-500, 500-600, 600-700, 700-800, 800-900, or 900-1000 nl. In various embodiments, the storage compartment has a storage volume in the range of about 1-10, 10-20, 20-30, 30-40, 40-50, 50-60, 60-70, 70-80, 80-90, 90-100, 100-200, 200-300, 300-400, 400-500, 500-600, 600-700, 700-800, 800-900, or 900-1000 μl. In various embodiments, the storage compartment has a storage volume in the range of about 0.01-0.1, 0.1-1, 1-10, 10-20, 20-30, 30-40, 40-50, 50-60, 60-70, 70-80, 80-90, or 90-100 ml. In various embodiments, before the use of the device, the fluid initially fills about 30-40%, 40-50%, 50-60%, 60-70%, 70-80%, 80-90%, 90-95%, 95-98%, or 98%-100% of the storage volume of the storage compartment.

In various embodiments, when the device is in use, the first aperture is positioned higher than the second aperture along the gravity orientation.

In various embodiments, the storage compartment further comprises a microfluidic channel between the first aperture and the liquid stored in the storage compartment. In various embodiments, the microfluidic channel separates the first aperture and the liquid stored in the storage compartment.

In various embodiments, a device as described herein is a part of a fluidic cartridge device. In various embodiments, the device is configured for transferring at least a portion of the fluid stored in the storage compartment to form a sample mixture with at least a portion of a sample received in the fluidic cartridge device. In various embodiments, the device is configured for transferring at least a portion of a sample received in the cartridge device into the storage compartment via the opened second aperture.

Various embodiments of the present disclosure provide a method. The method comprises: providing a device as described herein; opening the first aperture; opening the second aperture; and applying a pneumatic pressure to the opened first aperture to move the fluid to exit or enter the storage compartment via the opened second aperture.

Various embodiments of the present disclosure provide a method. The method comprises: providing a device that comprise a storage compartment, a fluid stored in the storage compartment, a first aperture on the storage compartment, and a second aperture on the storage compartment; opening the first aperture; opening the second aperture; and applying a pneumatic pressure to the opened first aperture to move the fluid to exit or enter the storage compartment via the opened second aperture. The first aperture is initially sealed or closed before the use of the device. The second aperture is initially sealed or closed before the use of the device.

In various embodiments, the storage compartment comprises a barrier layer. In various embodiments, the storage compartment comprises a barrier layer that comprises a material having a water vapor transmission rate in the range of about 0-0.01, 0.01-0.02, 0.02-0.05, 0.05-0.1, or 0.1-0.2 g·mm/m²·day. In accordance with the present disclosure, the vapor transmission rate can be measured under the DIN 53 122 standard for quantifying moisture barrier and packaging material. In various embodiments, the storage compartment comprises a barrier layer that comprises one or more of aluminum foil, $SiO_x$, $Al_2O_3$, Cyclic Olefin Polymer, Cyclic Olefin Copolymer, Polychlorotrifluoroethylene, and High-density Polyethylene.

In various embodiments, the first aperture comprises a reversible seal or an intact area of a barrier layer. The reversible seal or the intact area of the barrier layer is configured to be opened to allow the first aperture to receive the pneumatic pressure. In various embodiments, the intact area of the barrier layer is configured to be pierced through to allow the first aperture to receive the pneumatic pressure. In various embodiments, the first aperture further comprises a predefined opening that is initially sealed by the reversible seal or the intact area of the barrier layer.

In various embodiments, the second aperture comprises a reversible seal or an intact area of a barrier layer. The reversible seal or the intact area of the barrier layer is configured to be opened to allow the fluid to exit or enter the storage compartment via the opened second aperture. In various embodiments, the intact area of the barrier layer is configured to be pierced through to allow the fluid to exit or enter the storage compartment via the opened second aperture. In various embodiments, the second aperture further comprises a predefined opening that is initially sealed by the reversible seal or the intact area of the barrier layer.

In various embodiments, the storage compartment has a storage volume in the range of about 1-10, 10-20, 20-30, 30-40, 40-50, 50-60, 60-70, 70-80, 80-90, 90-100, 100-200, 200-300, 300-400, 400-500, 500-600, 600-700, 700-800, 800-900, or 900-1000 nl. In various embodiments, the storage compartment has a storage volume in the range of about 1-10, 10-20, 20-30, 30-40, 40-50, 50-60, 60-70, 70-80, 80-90, 90-100, 100-200, 200-300, 300-400, 400-500, 500-600, 600-700, 700-800, 800-900, or 900-1000 µl. In various embodiments, the storage compartment has a storage volume in the range of about 0.01-0.1, 0.1-1, 1-10, 10-20, 20-30, 30-40, 40-50, 50-60, 60-70, 70-80, 80-90, or 90-100 ml. In various embodiments, before the use of the device, the fluid initially fills about 30-40%, 40-50%, 50-60%, 60-70%, 70-80%, 80-90%, 90-95%, 95-98%, or 98%-100% of the storage volume of the storage compartment.

In various embodiments, when the device is in use, the first aperture is positioned higher than the second aperture along the gravity orientation.

In various embodiments, the storage compartment further comprises a microfluidic channel between the first aperture and the liquid stored in the storage compartment. In various embodiments, the microfluidic channel separates the first aperture and the liquid stored in the storage compartment.

In various embodiments, a method as described herein further comprises using an external actuation component to seal or close the opened second aperture. In some embodiments, the external actuation component is part of the device. In other embodiments, the external actuation component is not part of the device. In certain embodiments, the external actuation component can be part of an assay device. In certain embodiments, the external actuation component can be part of a reader instrument.

In various embodiments, a device as described herein is a part of a fluidic cartridge device. In various embodiments, the device is configured for transferring at least a portion of the fluid stored in the storage compartment to form a sample mixture with at least a portion of a sample received in the fluidic cartridge device. In various embodiments, the device is configured for transferring at least a portion of a sample received in the cartridge device into the storage compartment via the opened second aperture. In various embodiments, a method as described herein further comprises transferring at least a portion of the fluid stored in the storage compartment to form a sample mixture with at least a portion of a sample received in the fluidic cartridge device. In various embodiments, a method as described herein further comprises transferring at least a portion of the sample received in the cartridge device into the storage compartment via the opened second aperture.

In various embodiments, a method as described herein further comprises placing the cartridge device into a reader instrument for analysis. More information and examples of the reader instrument can be found in U.S. patent application Ser. No. 15/803,133 and U.S. patent application Ser. No. 15/819,416, which are incorporated herein by reference in their entirety as if fully set forth.

Various embodiments of the present disclosure provide a device. The device comprises: a storage compartment; a first aperture on the storage compartment; and a second aperture on the storage compartment. In various embodiments, the storage compartment is a fluid storage compartment configured for storing a fluid. In various embodiments, the storage compartment comprises one or more storage compartments. In various embodiments, the first aperture comprises one or more first apertures. In various embodiments, the second aperture comprises one or more second apertures.

In various embodiments, the first aperture is initially sealed before the use of the device. In various embodiments, the device further comprises a pneumatic component configured to open the sealed first aperture.

In various embodiments, the second aperture is initially sealed before the use of the device. In various embodiments, the device further comprises an actuation component configured to open the sealed second aperture. In various embodiments, the device further comprises a second actuation component configured to seal the opened second aperture. In various embodiments, the second aperture is fluidly connected to an assay device. In various embodiments, the first aperture is pneumatically connected to a pneumatic pressure source. In various embodiments, the pneumatic pressure source is configured to control the fluid movement existing or entering the storage compartment through the second aperture.

Various embodiments of the present disclosure provide a device. The device comprises: a storage compartment; a first aperture on the storage compartment; a second aperture on the storage compartment; a pneumatic component configured to open the sealed first aperture; and an actuation component configured to open the sealed second aperture. The first aperture is initially sealed before the use of the device. The second aperture is initially sealed before the use of the device.

In various embodiments, the device further comprises a second actuation component configured to seal the opened second aperture. In various embodiments, the second aperture is fluidly connected to an assay device. In various embodiments, the first aperture is pneumatically connected to a pneumatic pressure source. In various embodiments, the pneumatic pressure source is configured to control the fluid movement existing or entering the storage compartment through the second aperture.

Various embodiments of the present disclosure provide a device. The device comprises: one or more barrier layers forming a storage compartment; a first aperture on the storage compartment; and a second aperture on the storage compartment. In various embodiments, the one or more barrier layers are bonded together by a reversible bonding, a permanent bonding, or a combination thereof. In various embodiments, the storage compartment is a fluid storage compartment configured for storing a fluid. In various embodiments, the storage compartment comprises one or more storage compartments. In various embodiments, the first aperture comprises one or more first apertures. In various embodiments, the second aperture comprises one or more second apertures.

In various embodiments, the first aperture comprises an opening sealed by a reversible seal between the one or more barrier layers. In various embodiments, the device further comprises a pneumatic component configured to open the sealed first aperture.

In various embodiments, the second aperture comprises an opening sealed by a reversible seal between the one or more barrier layers. In various embodiments, the device further comprises an actuation component configured to open the sealed second aperture. In various embodiments, the device further comprises a second actuation component configured to seal the opened second aperture.

In various embodiments, the second aperture is fluidly connected to an assay device. In various embodiments, the first aperture is pneumatically connected to a pneumatic pressure source. In various embodiments, the pneumatic pressure source is configured to control the fluid movement existing or entering the storage compartment through the second aperture.

Various embodiments of the present disclosure provide a method. The method comprises: providing a device as described herein; operating the pneumatic component to open the sealed first aperture; operating the actuation component to open the sealed second aperture; and conducting one or a combination of the following steps: (a) applying a positive pneumatic pressure into the storage compartment through the first aperture and inducing a fluid movement existing the storage compartment through the second aperture; and (b) applying a negative pneumatic pressure into the storage compartment through the first aperture and inducing a fluid movement entering the storage compartment through the second aperture. In some embodiments, the method further comprises pneumatically connecting a pneumatic pressure source to the first aperture. In some embodiments, the first aperture is pneumatically connected to a pneumatic pressure source. In various embodiments, the method further comprises fluidly connecting an assay device to the second aperture. In some embodiments, the second aperture is fluidly connected to an assay device. In various embodiments, the method further comprises operating the second actuation component to seal the opened second aperture. In accordance with the present disclosure, these steps can be conducted in any order or any combination.

Various embodiments of the present disclosure provide a system. The system comprises: a device as described herein; and an assay device configured to be fluidly connected to the second aperture.

Various embodiments of the present disclosure provide a system. The system comprises: a device as described herein; and a pneumatic pressure source configured to be pneumatically connected to the first aperture.

Various embodiments of the present disclosure provide a system. The system comprises: a device as described herein; a pneumatic pressure source configured to be pneumatically connected to the first aperture; and an assay device configured to be fluidly connected to the second aperture.

In various embodiments, the assay device is a class of assay devices for cytometer analysis. In various embodiments, the assay device is a class of assay devices having a sheathless cytometer (see e.g., U.S. Patent Application No. 62/497,075 and U.S. patent application Ser. No. 15/803,133, which are incorporated herein by reference in their entirety as if fully set forth). In various embodiments, the assay device is a class of assay devices for Complete Blood Count analysis (see e.g. U.S. Patent Application No. 62/425,395 and U.S. patent application Ser. No. 15/819,416, which are incorporated herein by reference in their entirety as if fully set forth). In various embodiments, the assay device is a class of assay devices for various chemical and biological analysis (see e.g. U.S. patent application Ser. No. 15/176,729, which is incorporated herein by reference in its entirety as if fully set forth). In various embodiments, the assay device is any other disposable fluidic cartridges for chemical, biological, or in vitro diagnostic analysis.

Various embodiments of the present disclosure provide a method. The method comprises: providing a system as described herein; loading a sample to the system; and operating the system to conduct an assay of the sample. In various embodiments, the sample is a body fluid. In various embodiments, the sample can be serum, urine, blood, plasma, saliva, semen, lymph, or a combination thereof. In some embodiments, the sample is blood. In various embodiments, the assay is cytometer assay. In various embodiments, the assay is Complete Blood Count assay. In various embodiments, the assay is a chemical, biological, or in vitro diagnostic assay.

Figure 1B:
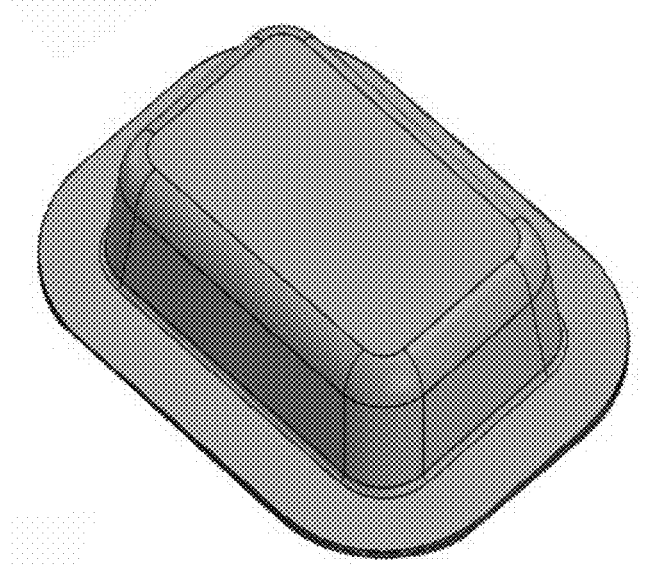
FIG. 1B illustrates, in accordance with various embodiments of the disclosure, one non-limiting example of the exterior designs of the fluid packaging devices described herein.

FIG. 1A shows one non-limiting example of the structures of the fluid packaging devices described herein. This non-limiting example has a storage compartment with a fluid packaged inside, and two apertures (first and second) accessing the storage compartment. The first and the second apertures are initially sealed to prevent the fluid leaking from the storage compartment. FIG. 1B shows one non-limiting example of the exterior designs of the fluid packaging devices described herein. This non-limiting example has a rectangular-shaped storage compartment. However, the storage compartment can be of any of other shapes including but not limited to circle, semi-circle, quarter circle, oval, ellipse, triangle, square, rectangular, corner-rounded rectangular, pentagon, hexagon, heptagon, octagon, nonagon, decagon, and dome, other regular and irregular shapes, and their combinations.

Figure 1C:
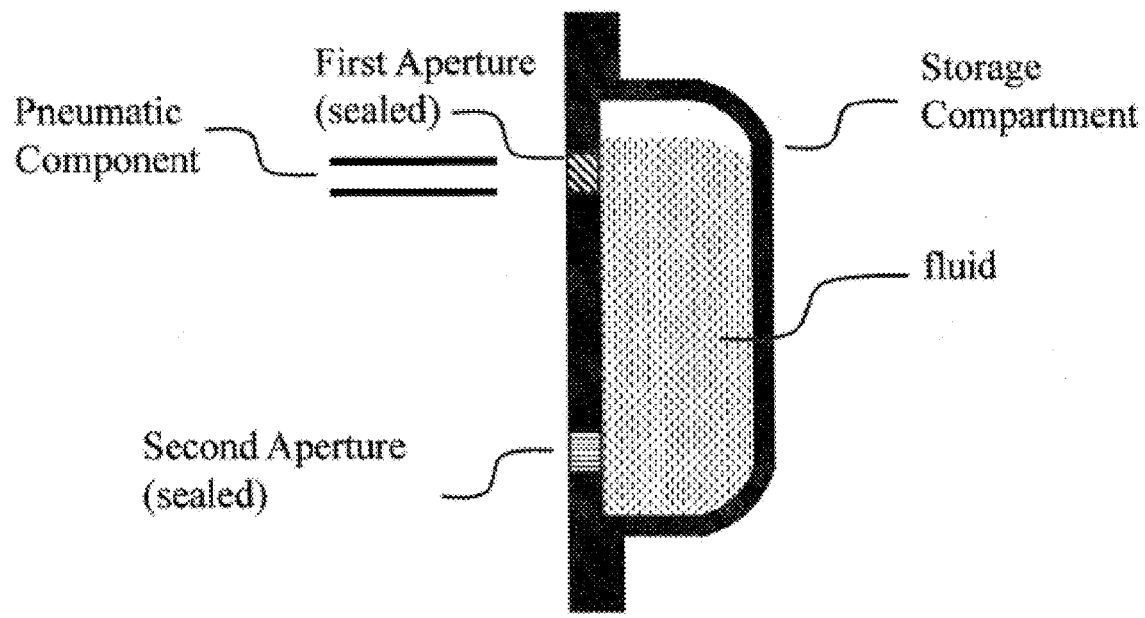
FIGS. 1C-1D illustrate, in accordance with various embodiments of the disclosure, a non-limiting example of the structures of the fluid packaging devices described herein, in which the pneumatic component is structured as a hollow needle.
Figure 1D:
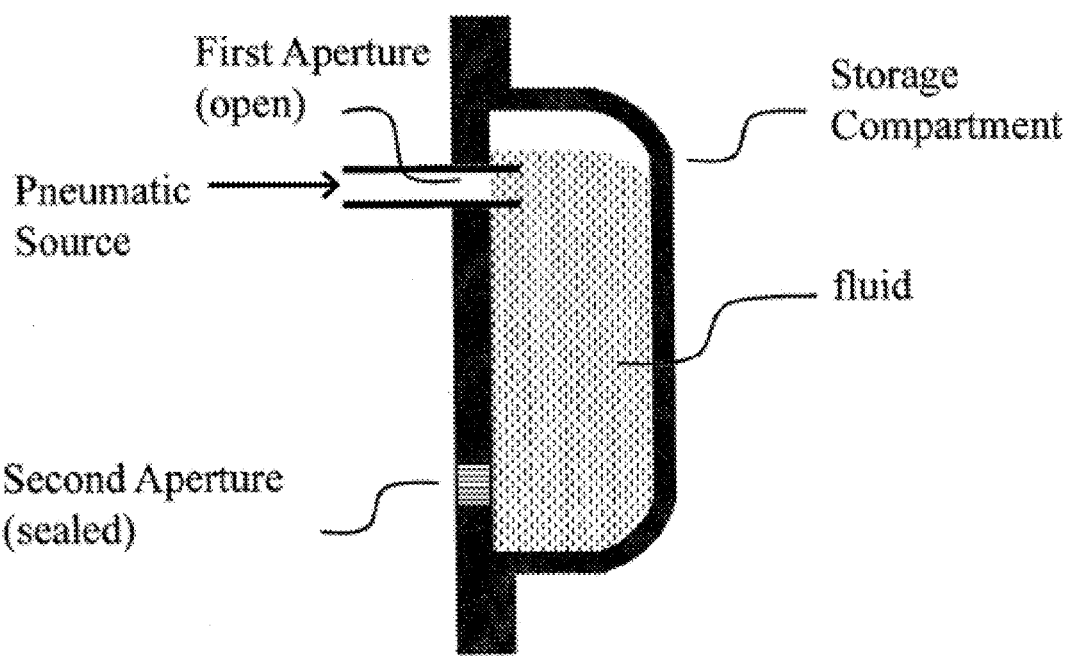
Figure 1E:
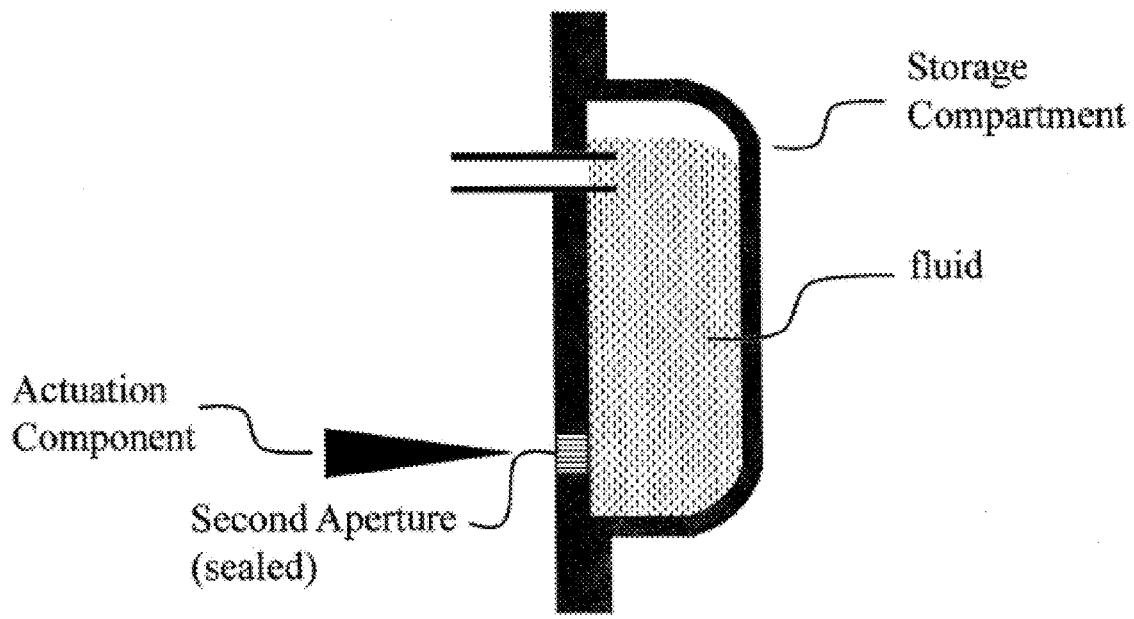
FIGS. 1E-1F illustrate, in accordance with various embodiments of the disclosure, a non-limiting example of the structures of the fluid packaging devices described herein, in which the actuation component is structured as a sharp tip.
Figure 1F:
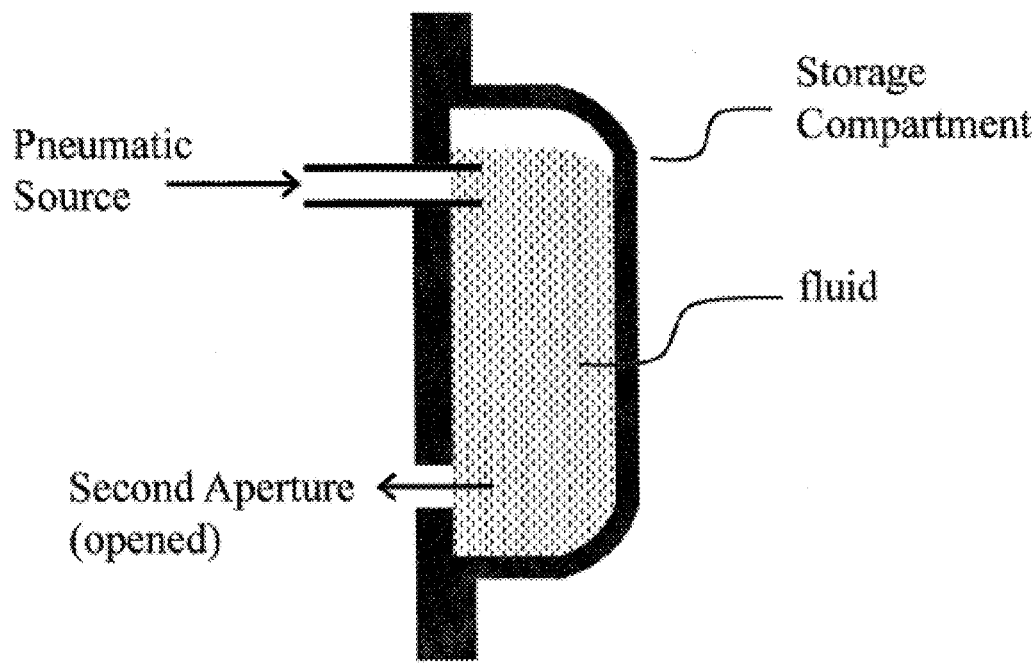

In various embodiments, the fluid packaging devices described herein can also include a pneumatic component. FIG. 1C shows such a non-limiting example in which the pneumatic component is structured as a hollow needle. As shown in FIG. 1D, the pneumatic component is used to open the sealed first aperture and connect a pneumatic pressure source to the storage compartment. In various embodiments, the fluid packaging devices described herein can also include an actuation component. FIG. 1E show such a non-limiting example in which the actuation component is structured as a sharp tip. As shown in FIG. 1F, the actuation component is used to open the sealed second aperture. The opened second aperture allows fluids to exit or enter the storage compartment. The pneumatic pressure source can be used to apply a pneumatic pressure via the opened first aperture to the storage compartment. For example, by applying a positive pneumatic pressure, which has a pressure level higher than the pressure at the second aperture, the fluid in the storage compartment is driven or accelerated to exist the storage compartment through the opened second aperture. Similarly, by applying a negative pneumatic pressure, which has a pressure level lower than the pressure at the second aperture, the fluid outside the storage compartment is drawn to enter the storage compartment through the opened second aperture. In various embodiments, the fluid packaging devices described herein can further include a second actuation component, which is used to close the second aperture after it is opened up.

Figure 2A:
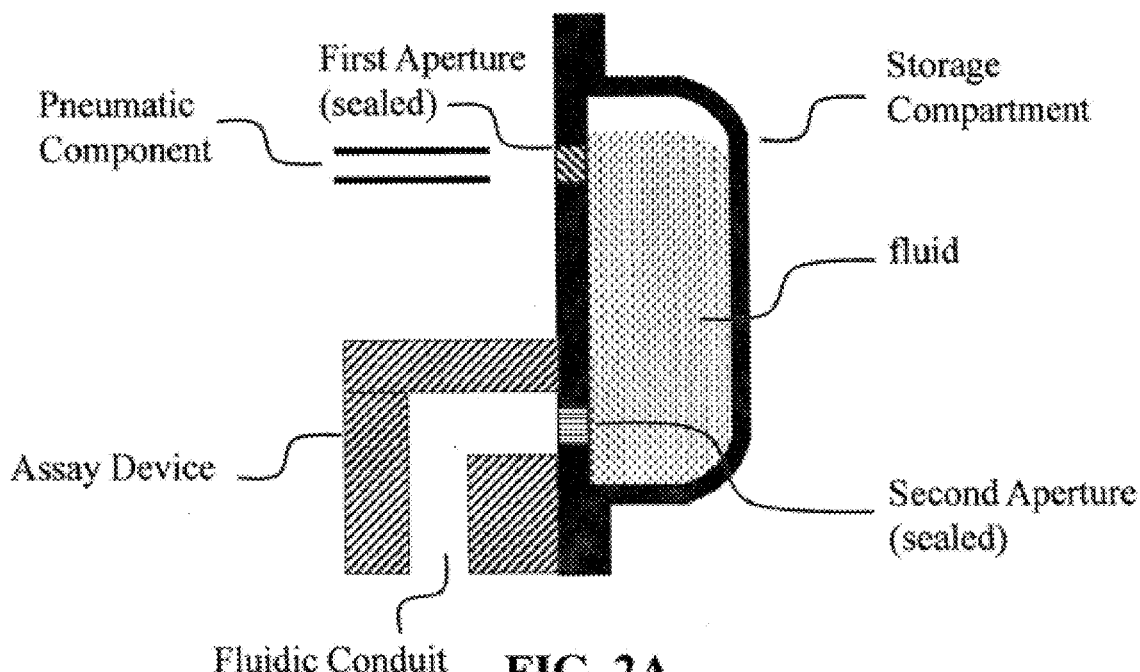
FIGS. 2A-2C illustrate, in accordance with various embodiments of the disclosure, an exemplary assay system that has a fluid packaging device attached to an assay device.
Figure 2B:
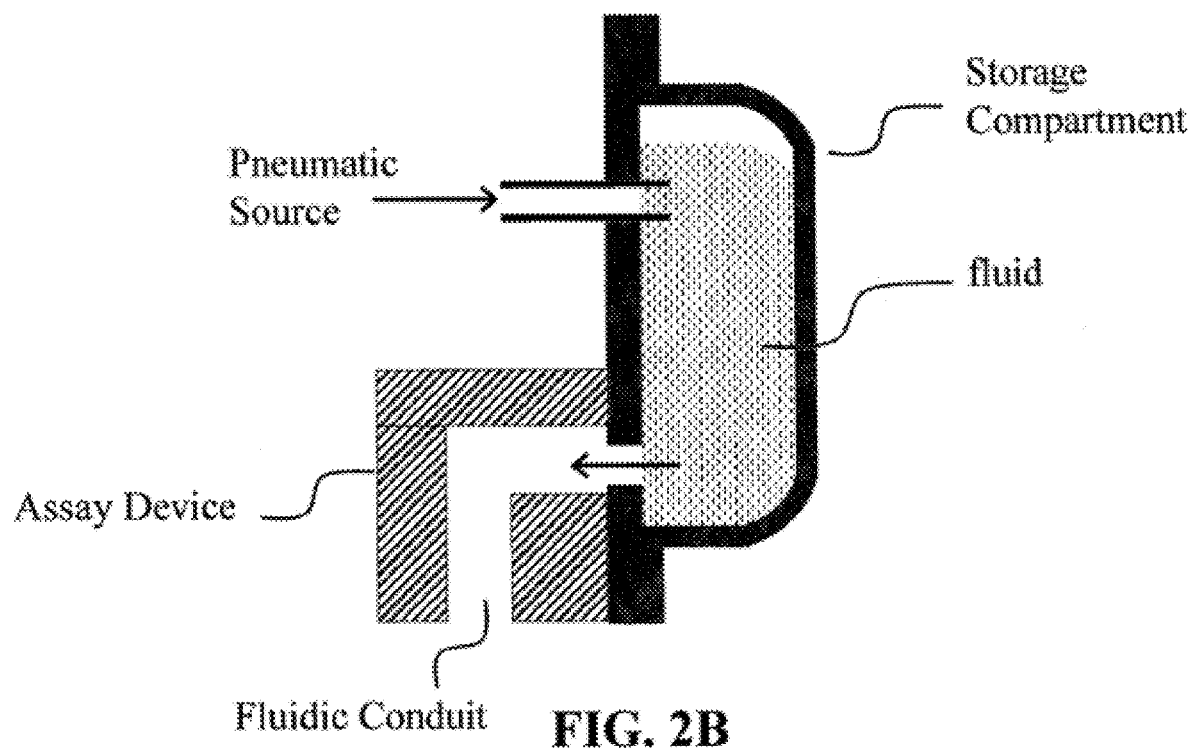
Figure 2C:
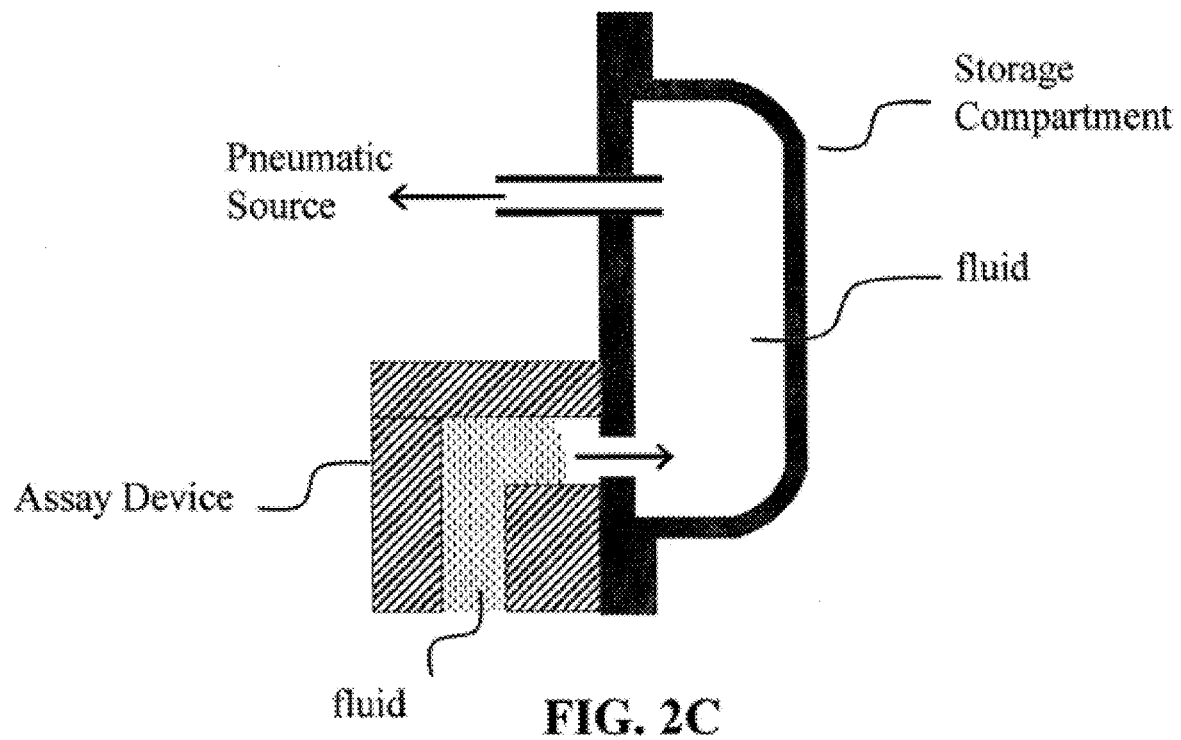

The fluidic packaging devices described herein can be used with assay devices to form assay systems. FIG. 2A shows an exemplary assay system that has a fluid packaging device attached to an assay device. The assay device has a fluidic conduit (e.g. a fluidic channel) that is fluidly connected to the second aperture of the packaging device. After the second aperture is opened, as shown in FIG. 2B, the fluid in the storage compartment can exit the second aperture and enter the assay device via the fluidic conduit. This fluid transfer can be driven by a positive pneumatic pressure applied to the opened first aperture. Also, as shown in FIG. 2C, the fluid in the assay device can enter the storage compartment via the opened second aperture. This fluid transfer can be driven by a negative pneumatic pressure applied to the opened first aperture.

Those fluid packaging devices as described in US2011/0186466 A1 and US2012/0107811 A1 have only one aperture on their fluid storage compartment. After this single aperture is opened, either by using a sharp tip to pierce the aperture (see e.g., US2011/0186466 A1) or by using a force to break a reversible bonding between two materials (see e.g., US2012/0107811 A1), a compression force is applied to the storage compartment to squeeze the fluid out of the opened aperture. When squeezing the storage compartment, the residual fluid left inside the compartment is significant in volume, rendering it difficult to introduce a precisely and consistently controlled volume of the fluid into an assay device.

To solve these precision and consistency problems, this application provides a new class of fluid packaging devices. In various embodiments, a packaging device as described herein has at least two apertures. By applying a pneumatic pressure at one of the apertures, the fluid inside the storage compartment is driven out through the other aperture. Using pressured air or any other gas to drive the fluid, volume shrinkage of the storage compartment is no longer necessary to dispense the fluid, for example, into an assay device. In this way, the storage compartment can also be used for additional fluidic functions through manipulating the pneumatic pressure. For one non-limiting example, the storage compartment can be used as a fluidic chamber as described in U.S. Patent Application No. 62/497,075 or U.S. patent application Ser. No. 15/803,133. The use of one component for multiple functions is advantageous to reduce the overall complexity of the assay system. Furthermore, by designing the geometry and orientation of the storage compartment and the two apertures, dead volume inside the storage compartment can be eliminated for dispensing fluid. In some embodiments, a packaging device as disclosed herein can be built in the same manufacturing process as the assay device, thus further simplifying the assay system.

Figure 3A:
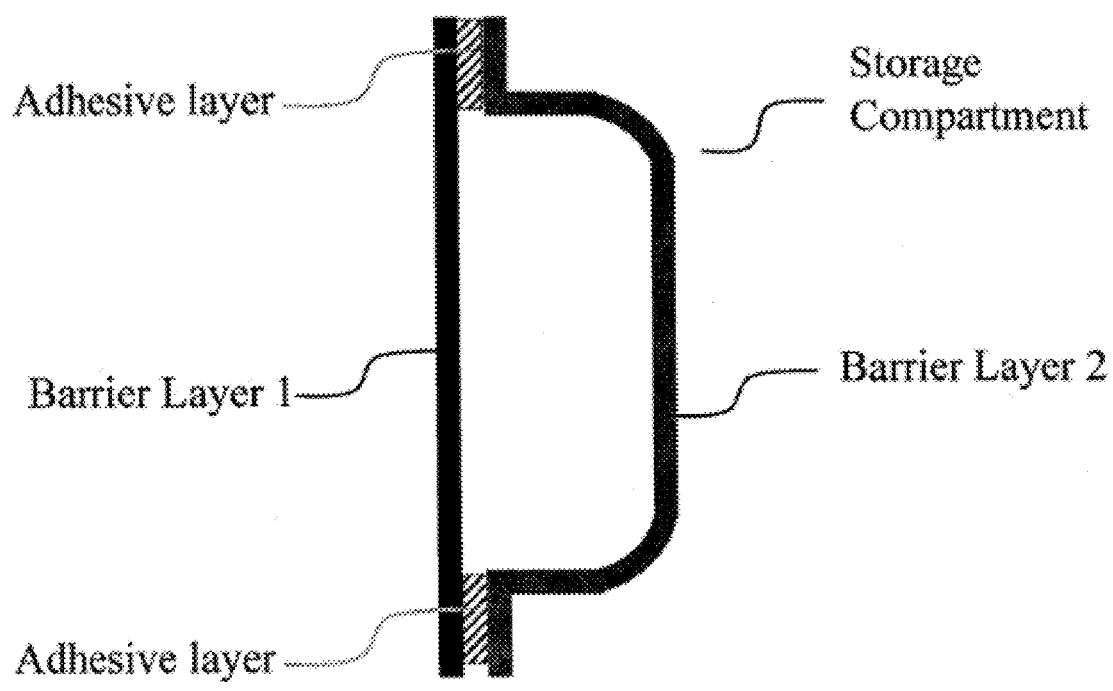
FIG. 3A illustrates, in accordance with various embodiments of the disclosure, one non-limiting example of the storage compartments described herein, which comprises a barrier layer 1, a barrier layer 2, and an adhesive layer that bonds the two barrier layers to form an enclosed space for storage.

FIG. 3A shows one non-limiting example of the storage compartments described herein, which comprises a barrier layer 1, a barrier layer 2, and an adhesive layer that bonds the two barrier layers to form an enclosed space for storage. Each of the barrier layers comprises at least one material that has low vapor transmission rate of the packaged fluid. Therefore, the barrier layer can minimize or eliminate the amount of fluid that evaporates across the barrier layer. In this way, the fluid in the storage compartment can achieve a long shelf life without significant loss of its volume. Examples of the barrier material include but are not limited to aluminum foil laminate (see e.g., those described in US2012/0107811 A1 and U.S. Pat. No. 5,030,504), thin film of $SiO_x$, or $Al_2O_3$, plastics such as Cyclic Olefin Polymer (COP), Cyclic Olefin Copolymer (COC), Polychlorotrifluoroethylene (PCTFE), and High-density Polyethylene (HDPE), etc. Examples of the adhesive layer include but are not limited to pressure sensitive adhesives, and heat sensitive adhesives, etc. The higher water vapor transmission rate the barrier material has, the thicker the barrier layer needs to be to reduce the water vapor loss during storage of the fluid. In various embodiments, the barrier material has a water vapor transmission rate in the range of about 0-0.01, 0.01-0.02, 0.02-0.05, 0.05-0.1, or 0.1-0.2 $g \cdot mm/m^2 \cdot day$ under the DIN 53 122 standard for quantifying moisture barrier and packaging material. In various embodiments, the fluid stored in the packaging device is in the liquid form. The packaging device is used to minimize the water loss from the liquid during storage.

Figure 3B:
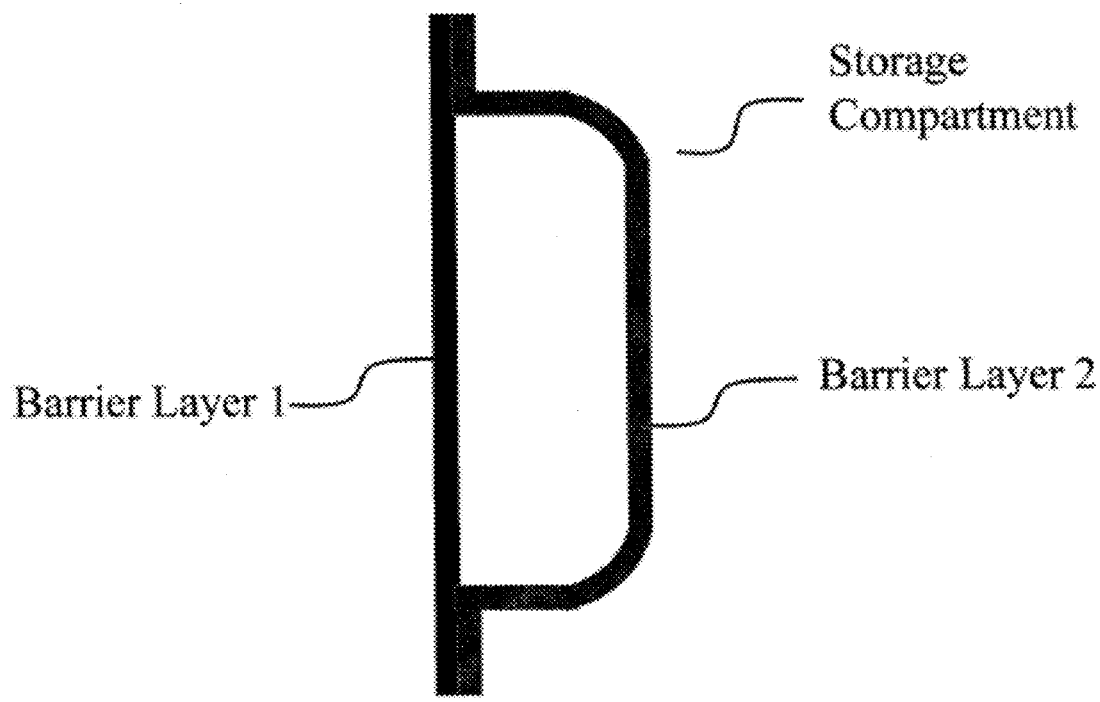
FIG. 3B illustrates, in accordance with various embodiments of the disclosure, another non-limiting example of the storage compartments described herein, which comprises a barrier layer 1 and a barrier layer 2. In this example, these two barrier layers are bonded together without using additional adhesives.

FIG. 3B shows another non-limiting example of the storage compartments described herein, which comprises a barrier layer 1 and a barrier layer 2. In this example, these two barrier layers are bonded together without using additional adhesives. Examples of this direct bonding include but are not limited to thermal fusion bonding, solvent assisted bonding, laser wielding, and ultrasonic wielding, etc.

Figure 3C:
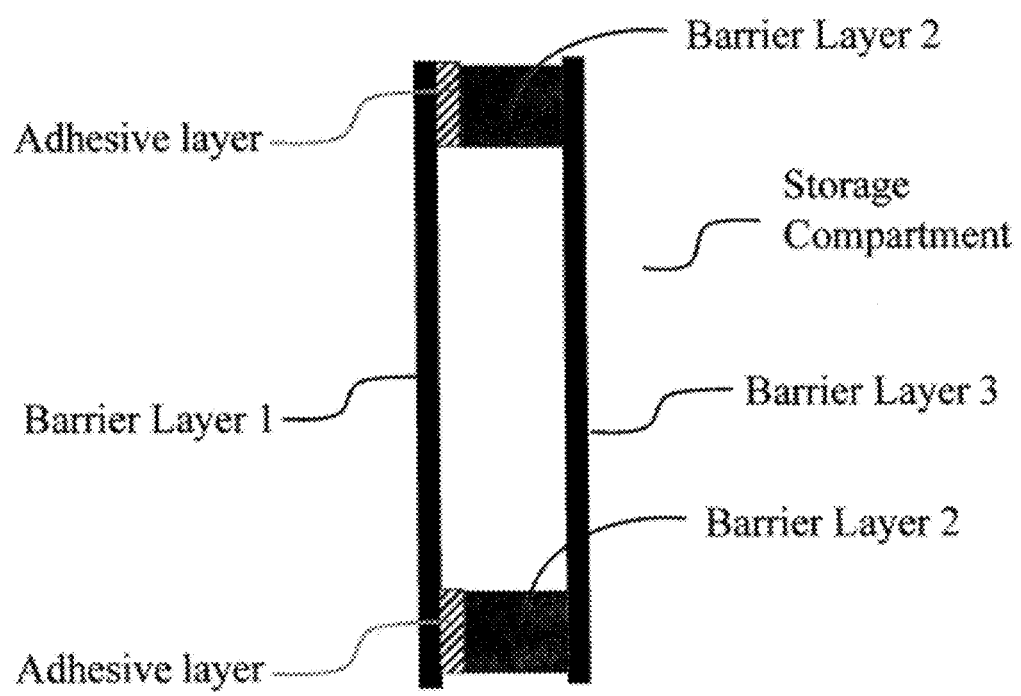
FIG. 3C illustrates, in accordance with various embodiments of the disclosure, another non-limiting example of the storage compartments described herein, which comprises three barrier layers. In this example, a barrier layer 1 is bonded to a barrier layer 2 by an adhesive layer. The barrier layer 2 is bonded to a barrier layer 3 by direct bonding.

FIG. 3C shows another non-limiting example of the storage compartments described herein, which comprises three barrier layers. In this example, a barrier layer 1 is bonded to a barrier layer 2 by an adhesive layer. The barrier layer 2 is bonded to a barrier layer 3 by direct bonding as described above. The three barrier layers together form the enclosed space for the fluid storage. In some embodiments, these barrier layers can also be used to form a portion or the whole of fluidic structures of the assay device. In this way, an assay system comprising the fluid packaging device and the assay device can be built in the same manufacturing process, and no additional assembly steps are required to attach the packaging device to the assay device.

Figure 4A:
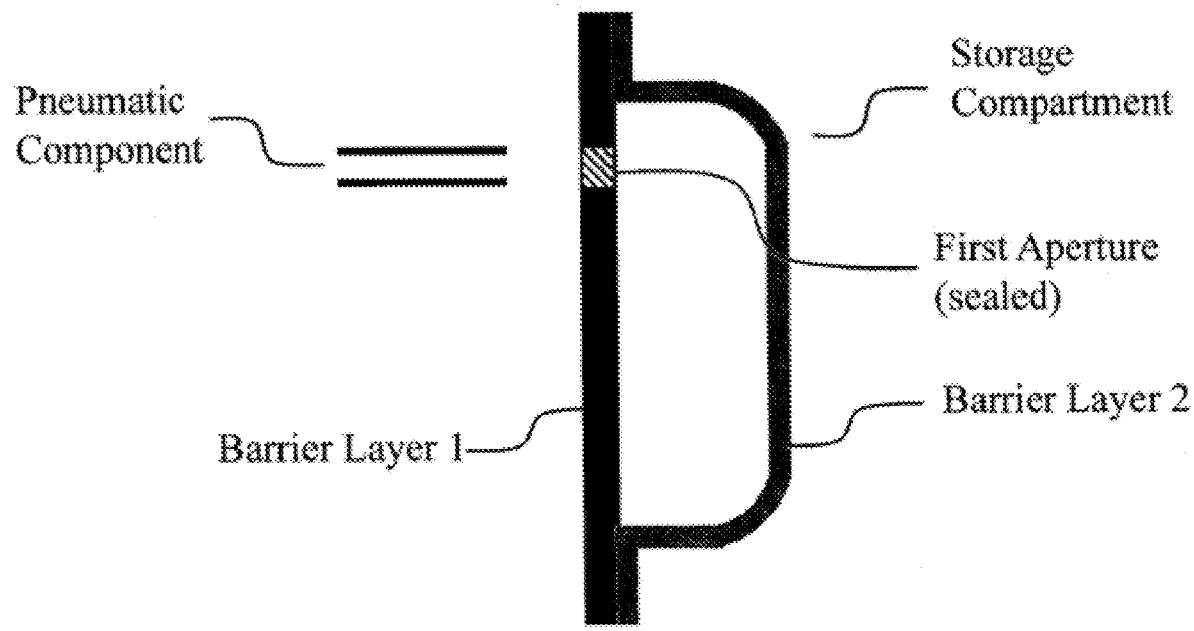
FIGS. 4A-4C illustrate, in accordance with various embodiments of the disclosure, one non-limiting example of a first aperture described herein.
Figure 4B:
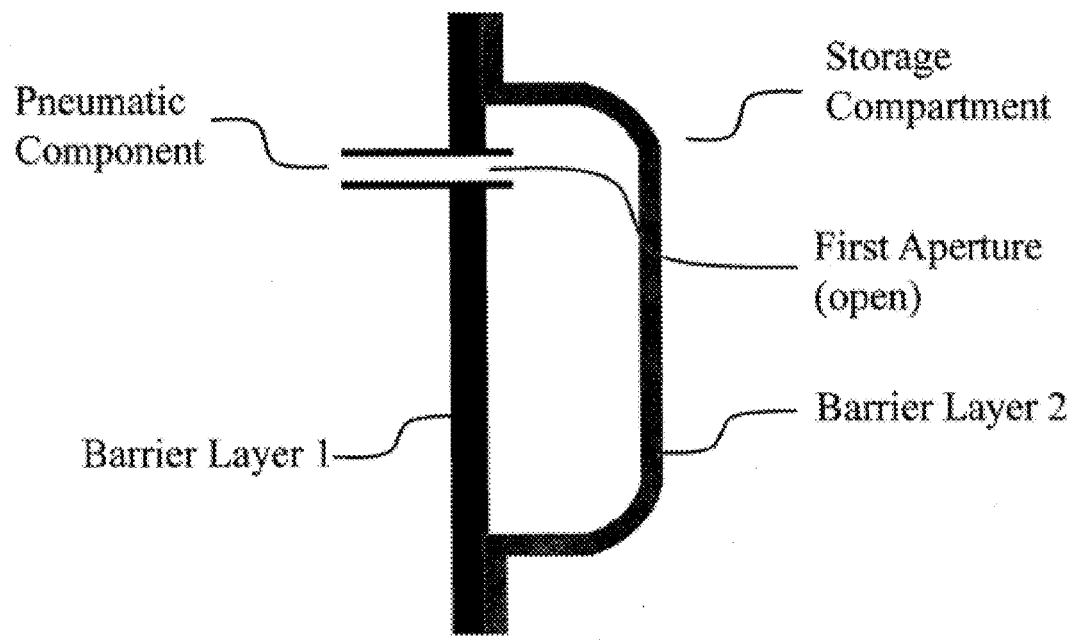
Figure 4C:
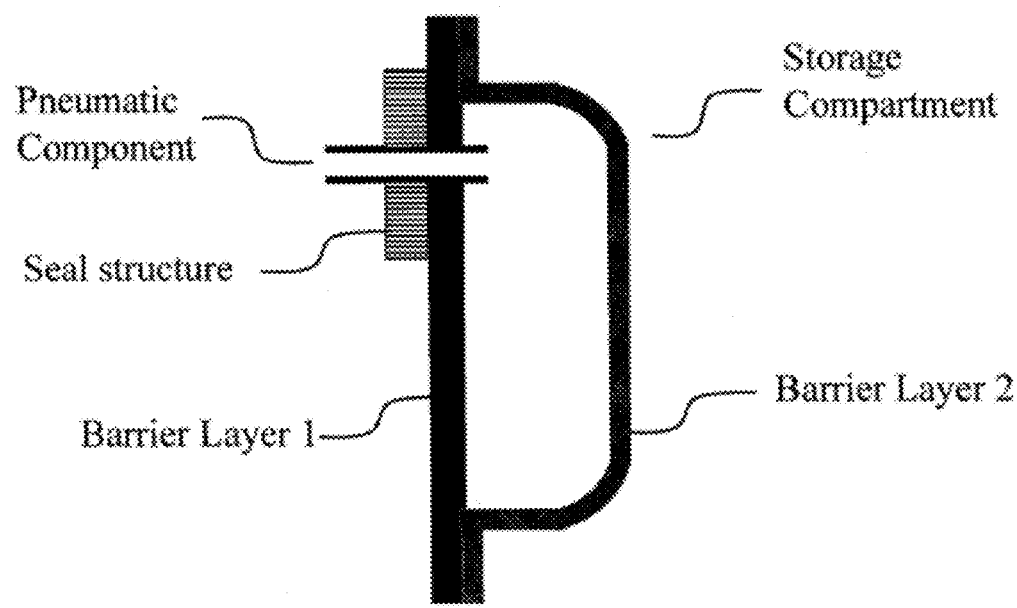

FIG. 4A shows one non-limiting example of a first aperture described herein. The storage compartment comprises two barrier layers: layer 1 and layer 2. The barrier layer 1 has a designated area that is used as the first aperture. The barrier layer 1 in this designated area is initially intact, thus the first aperture is in the sealed state to keep the fluid inside the storage compartment. As shown in FIG. 4B, the packaging device can further comprise a pneumatic component, which is used to break or pierce open the layer 1 in the first aperture. After the barrier layer 1 is broken or pieced open, the first aperture is converted into the open state and a pneumatic pressure can be applied through the aperture 1 to the storage compartment. In some embodiments, a foil laminate film is used as the barrier layer 1, and the pneumatic component comprise a hollow needle that is used to piece open the foil laminate film. As shown in FIG. 4C, the pneumatic component can further comprise a seal structure, which forms a close contact with the barrier layer 1 around the aperture 1 to prevent the pneumatic pressure to leak between the interface of the seal structure and the barrier layer 1.

Figure 4D:
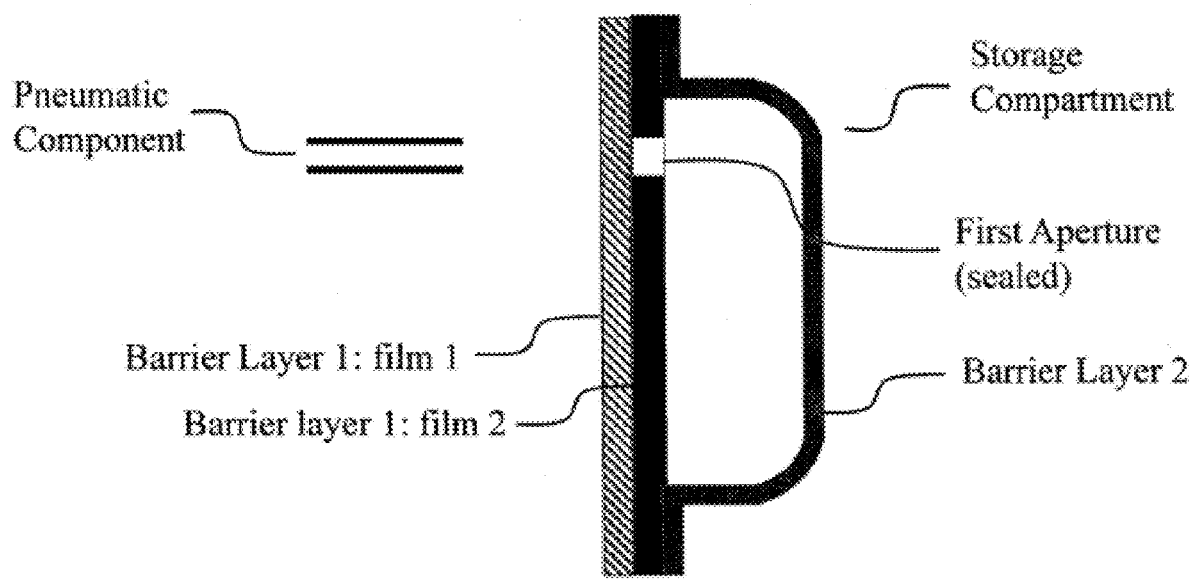
FIGS. 4D-4E illustrate, in accordance with various embodiments of the disclosure, another non-limiting example of a first aperture described herein.
Figure 4E:
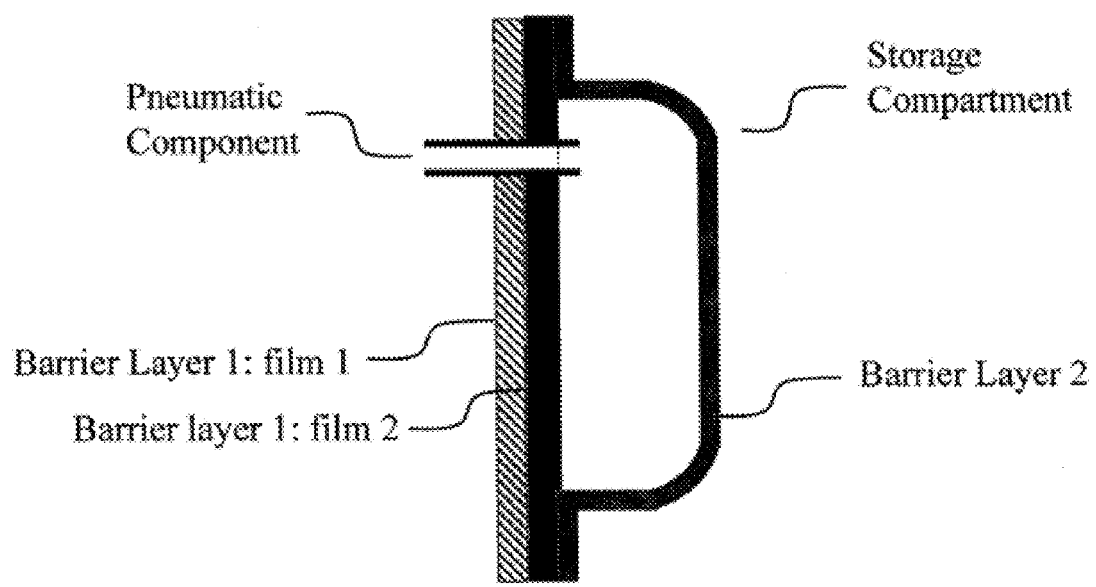

FIG. 4D is another non-limiting example of a first aperture described herein. In this example, the storage compartment comprises two barrier layers: layer 1 and layer 2. These two layers can be bonded together by an adhesive layer, by direct bonding, or by any other methods. The space between these two layers forms the enclosed space for the fluid storage. The barrier layer 1 comprises a laminate of two films: film 1 and film 2. The first aperture comprises a predefined opening on the film 2 and an intact area on the film 1 that is sealing this opening. The packaging device further comprise a pneumatic component having a hollow need. The needle is used to break or pierce open the film 1 on the first aperture, as shown in FIG. 4E, and thus open the first aperture to access the storage compartment. In some embodiments, the film 2 of the barrier layer 1 is a rigid material such as a plastic to provide additional mechanical strength for the storage compartment. In other examples, the first aperture comprises a predefined opening on the film 1 that is sealed up by an intact film 2.

Figure 5A:
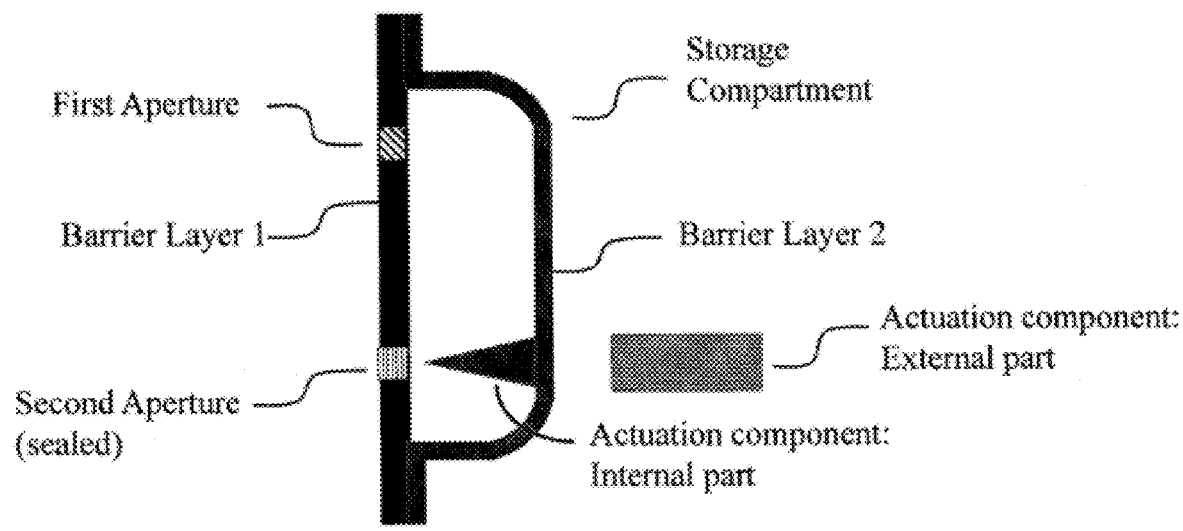
FIGS. 5A-5C illustrate, in accordance with various embodiments of the disclosure, one non-limiting example of the package device described herein. The storage compartment comprises two barrier layers: layer 1 and layer 2.
Figure 5B:
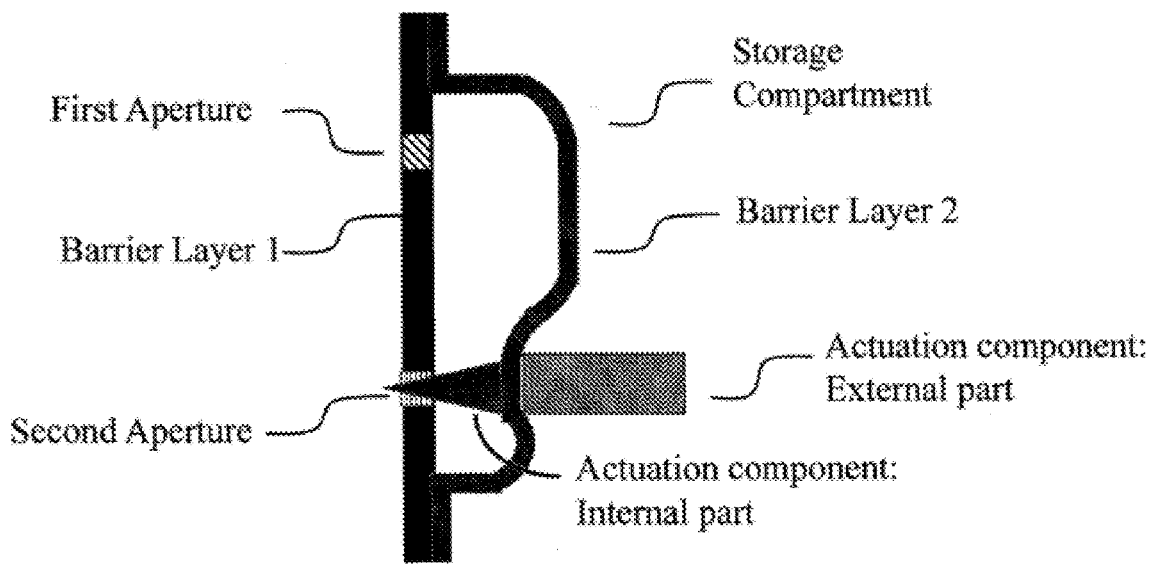
Figure 5C:
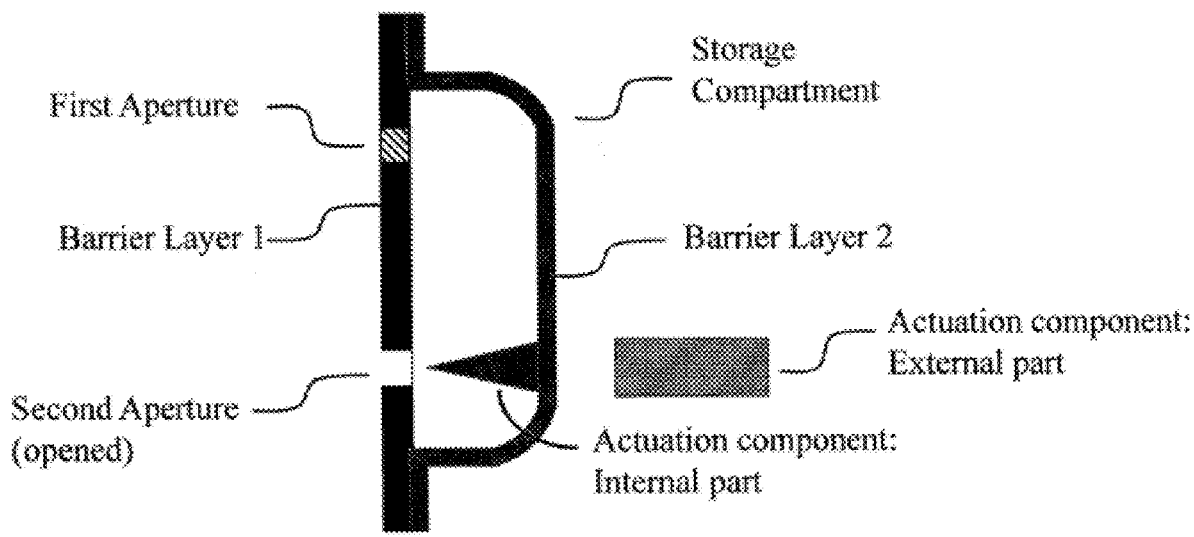

FIG. 5A shows one non-limiting example of the package device described herein. The storage compartment comprises two barrier layers: layer 1 and layer 2. On the barrier layer 1, one designated area is used as the first aperture and another designated area is used as the second aperture. When the barrier layer 1 in the second aperture is intact, the second aperture is in the sealed state to keep fluid inside the storage compartment. The packaging device comprises a pneumatic component (not shown in the drawing) to open the first aperture. The packaging device further comprises an actuation component with two parts: an internal part with a sharp tip and an external part to actuate the internal part. The internal part is affixed on the barrier layer 2, with the sharp tip facing the second aperture. To open the second aperture, the external part of the actuation component compresses the barrier layer 2 to induce deformation, which pushes the sharp tip of the internal part towards the second aperture. As shown in FIG. 5B, a sufficient displacement of the sharp tip would break or pierce open the second aperture. In some embodiments, the compression of the external part causes an elastic deformation of the barrier layer 2; as shown in FIG.

5C, upon releasing the compression, the barrier layer 2 returns to its original shape and removes the sharp tip from the opened second aperture. As a result, an opening is left behind in the second aperture to allow the fluid to exit or enter the storage compartment.

Figure 5D:
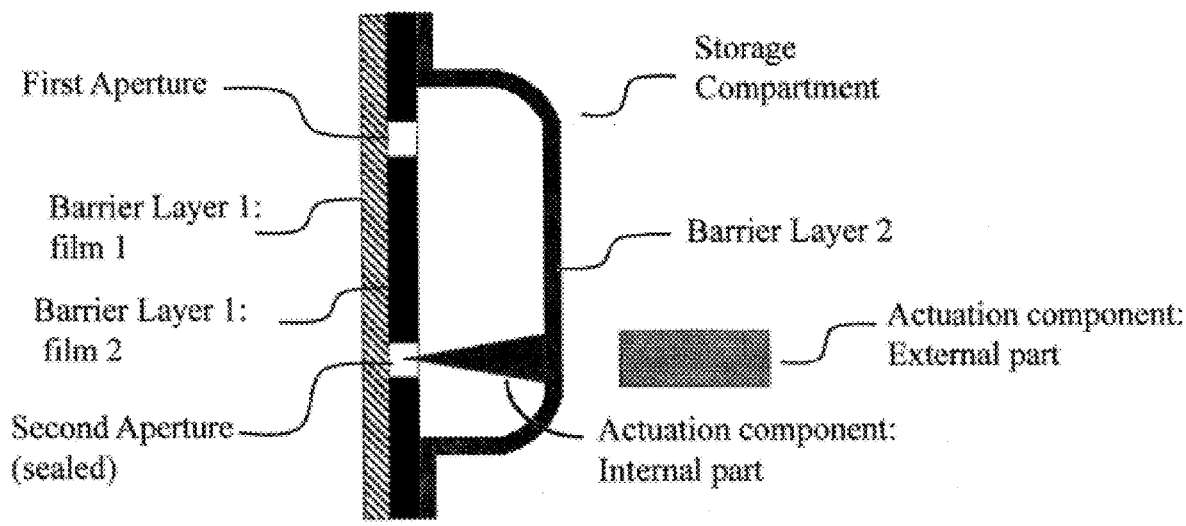
FIGS. 5D-5F illustrate, in accordance with various embodiments of the disclosure, another non-limiting example of the package device described herein. The storage compartment comprises two barrier layers: layer 1 and layer 2. The barrier layer 1 comprises a laminate of two films: film 1 and film 2.
Figure 5E:
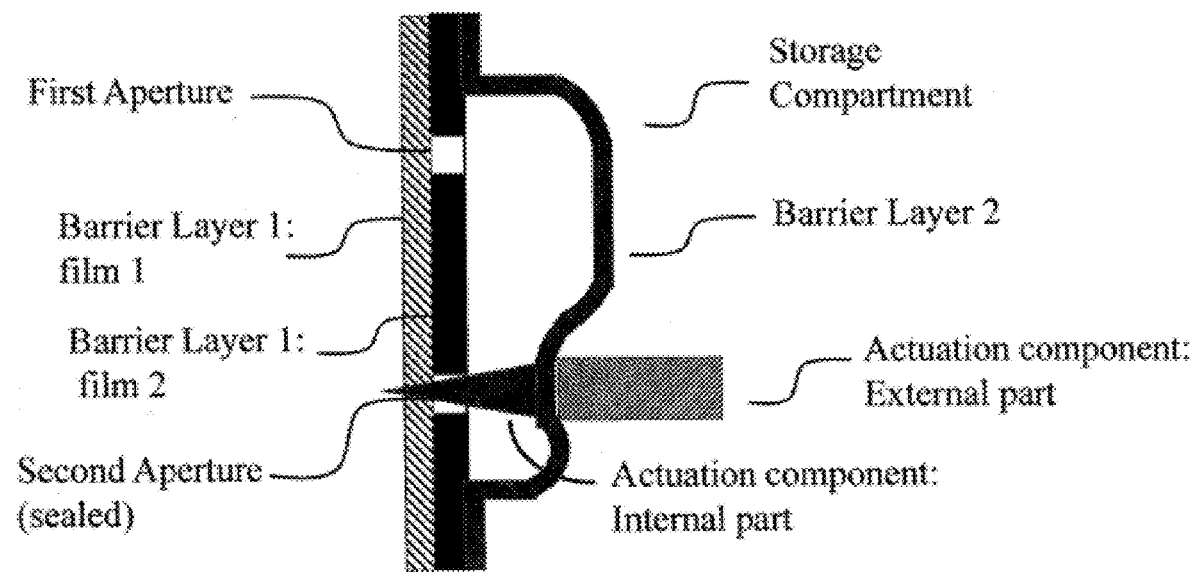
Figure 5F:
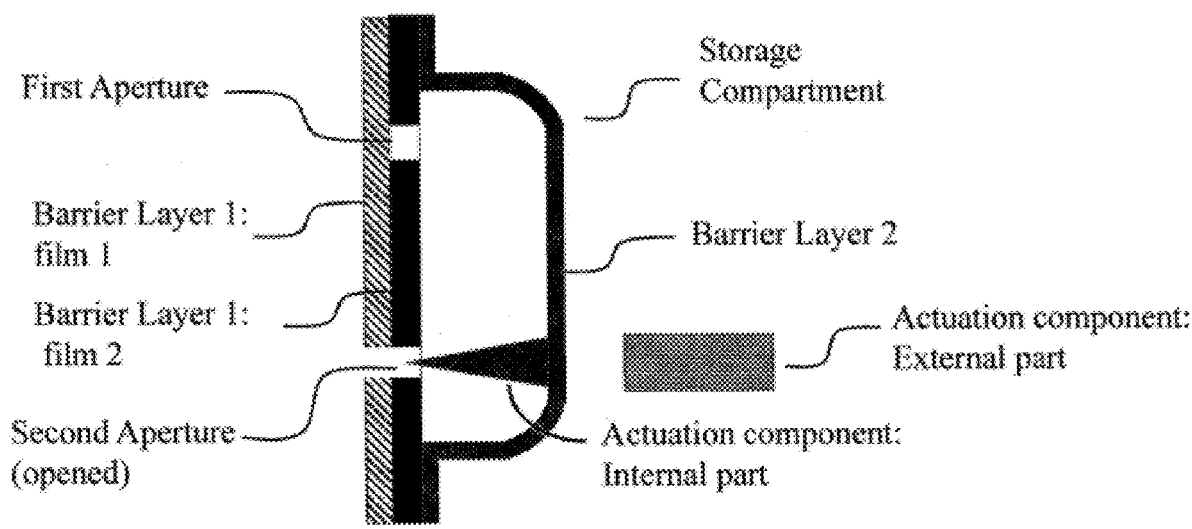

FIG. 5D shows another non-limiting example of the package device described herein. In this example, the storage compartment comprises two barrier layers: layer 1 and layer 2. The space between these two layers forms the enclosed space for the fluid storage. The barrier layer 1 comprises a laminate of two films: film 1 and film 2. The second aperture comprises a predefined opening on the film 2 and an intact area on the film 1 that is sealing the opening. The packaging device comprises a pneumatic component (not shown in the drawing) to open the first aperture. The packaging device further comprises an actuation component with two parts: an internal part with a sharp tip and an external part to actuate the internal part. The internal part is affixed on the barrier layer 2, with the sharp tip facing the second aperture. To open the second aperture, the external part of the actuation component compresses the barrier layer 2 to induce deformation, which pushes the sharp tip of the internal part towards the second aperture. As shown in FIG. 5E, a sufficient displacement of the sharp tip would break or pierce open the film 1 in the second aperture. In some embodiments, the compression of the external part causes an elastic deformation of the barrier layer 2; as shown in FIG. 5F, upon releasing the compression, the barrier layer 2 returns to its original shape and removes the sharp tip from the opened second aperture. As a result, an opening is left behind in the second aperture to allow the fluid to exit or enter the storage compartment. In some embodiments, the film 2 of the barrier layer 1 is a rigid material such as a plastic for mechanical strength of the storage compartment. In other examples, the first aperture comprises a predefined opening on the film 1 that is sealed up by an intact film 2.

Figure 5G:
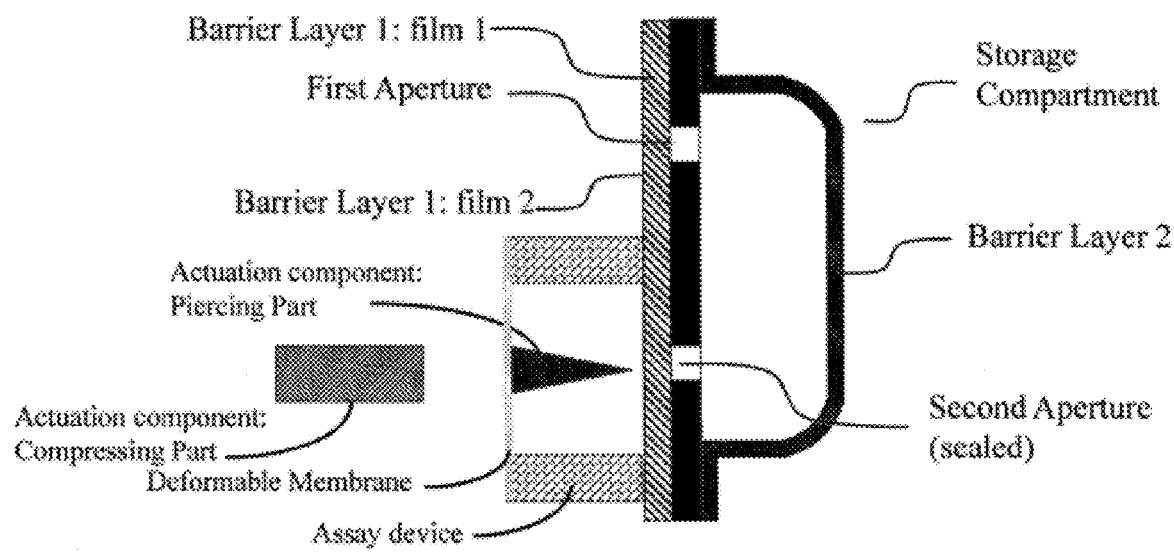
FIGS. 5G-5H illustrate, in accordance with various embodiments of the disclosure, another non-limiting example of the package device described herein, in which both the piercing part and compressing part of the actuation component are outside the storage compartment.
Figure 5H:
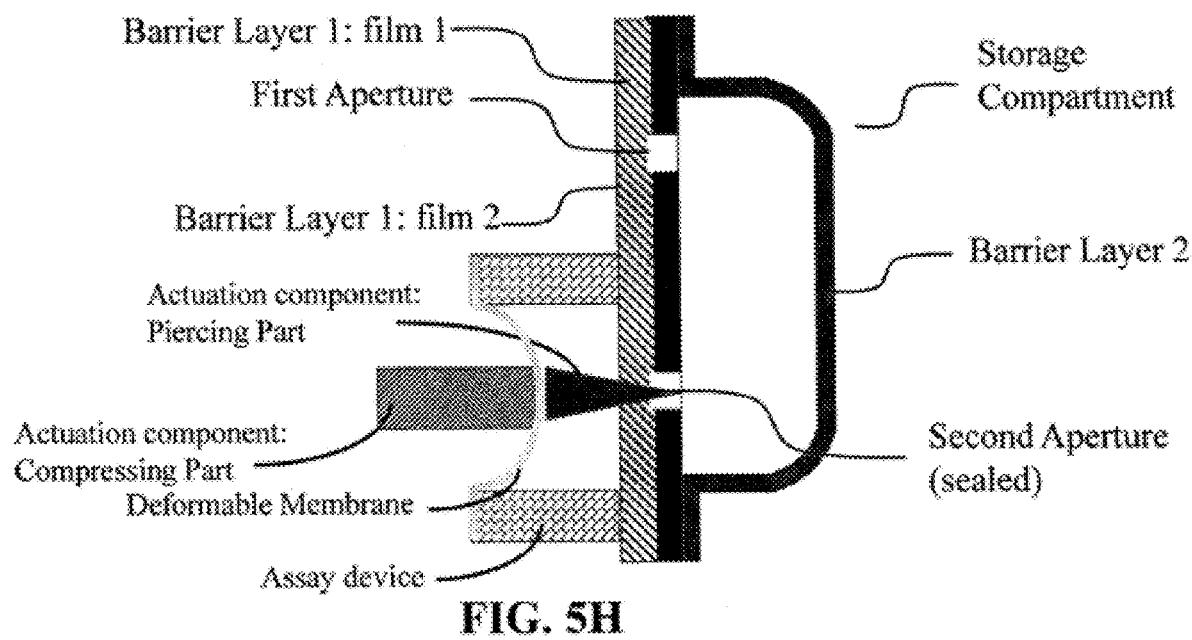

FIG. 5G shows another non-limiting example of the package device described herein, in which both the piercing part and compressing part of the actuation component are outside the storage compartment. In this example, the piercing part is affixed on an assay device that accesses the second aperture of the packaging device to form an assay system. Particularly, the piercing part is affixed onto a deformable membrane on the assay device, and the compressing part is used to deform the membrane and push the piercing part to open the second aperture, as shown in FIG. 5H.

Figure 6A:
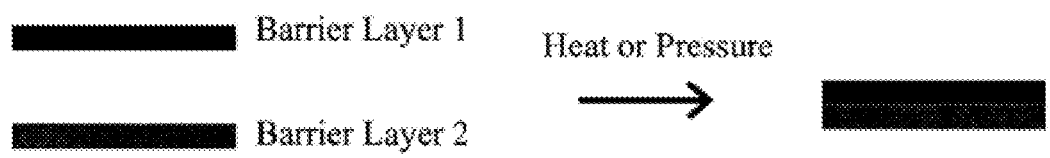
FIG. 6A illustrates, in accordance with various embodiments of the disclosure, an exemplary permanent bonding, which is a direct bonding of the two barrier layers.
Figure 6B:
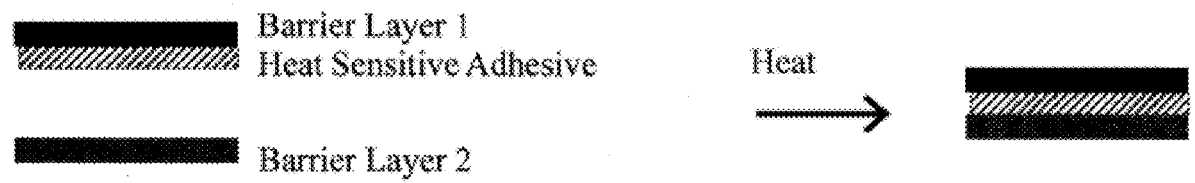
FIG. 6B illustrates, in accordance with various embodiments of the disclosure, another exemplary permanent bonding, which uses a heat sensitive adhesive to hold the barrier layers together.

The bonding between the barrier layers can be achieved using various methods. One non-limiting example is a permanent bonding, the bonding strength of which is so strong that the bonding would not be broken without damaging the barrier layers it holds together. FIG. 6A shows an exemplary permanent bonding, which is a direct bonding of the two barrier layers. This type of bonding includes but is not limited to thermal fusion bonding (see e.g., Tsao and DeVoe, Bonding of Thermoplastic Polymer Microfluidics, Microfluidics and Nanofluidics 6(1):1-16, January 2009), solvent vapor assisted bonding (see e.g., D A Mair et al., Room-Temperature Bonding for Plastic High-Pressure Microfluidic Chips, Anal Chem 79(13):5097-5102, May 2007), etc. FIG. 6B shows another exemplary permanent bonding, which uses a heat sensitive adhesive to hold the barrier layers together. A heating step is used to soften the adhesive, which then forms strong adhesion to both layers. Upon cooling down, the adhesive forms a strong bonding to hold the two layers together. Various types of existing heat sensitive adhesives (see e.g., U.S. Pat. No. 6,180,229 B1) can be used for this purpose.

Figure 6C:
FIG. 6C illustrates, in accordance with various embodiments of the disclosure, an exemplar reversible bonding, which uses a layer of pressure sensitive adhesive (PSA) to bond the layers together.
Figure 6D:
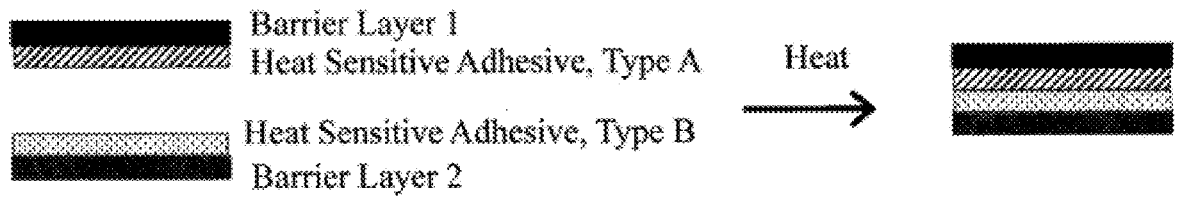
FIG. 6D illustrates, in accordance with various embodiments of the disclosure, another exemplar reversible bonding, in which two layers of heat sensitive adhesives with different bonding temperatures are used.

In other embodiments, reversible bonding can also be used. Reversible bonding has a bonding strength that can be broken without causing damage to the barrier layers being held together. FIG. 6C shows an exemplar reversible bonding, which uses a layer of pressure sensitive adhesive (PSA) to bond the layers together. A compression pressure is applied to the sandwiched structure of the layer 1, PSA, and layer 2. The PSA forms good adhesion to both barrier layers to hold them together even after the compression is released. Various types of pressure sensitive adhesives (see e.g., U.S. Pat. No. 4,645,711) can be used for this purpose. FIG. 6D shows another exemplar reversible bonding, in which two layers of heat sensitive adhesives with different bonding temperatures are used. In this example, the adhesive type A requires a higher heating temperature to form a strong bonding than the adhesive type B. By using a heating temperature that is sufficient for the type B to form a strong bonding but not sufficient for the type A to form a strong bonding, the adhesive type A will form a relatively weak bonding between the adhesive type B and the layer 1. This bonding can be broken without causing damage to the layer 1 and the layer 2 (see e.g., US2012/0107811).

Figure 7A:
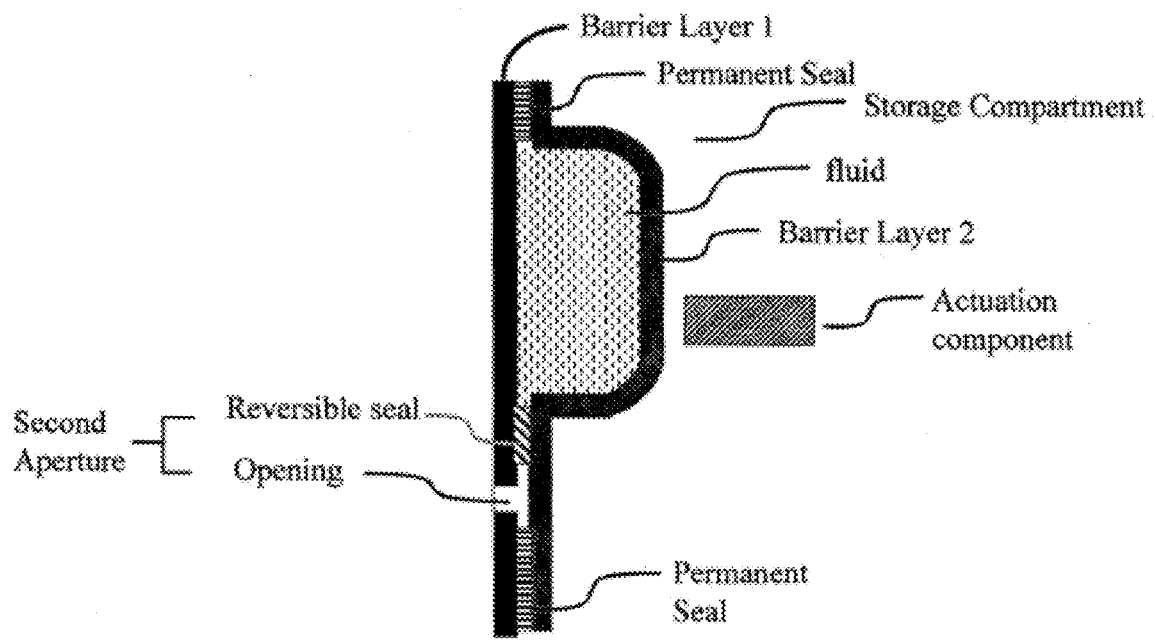
FIGS. 7A-7D illustrate, in accordance with various embodiments of the disclosure, a non-limiting example of a fluid packaging device described herein.
Figure 7B:
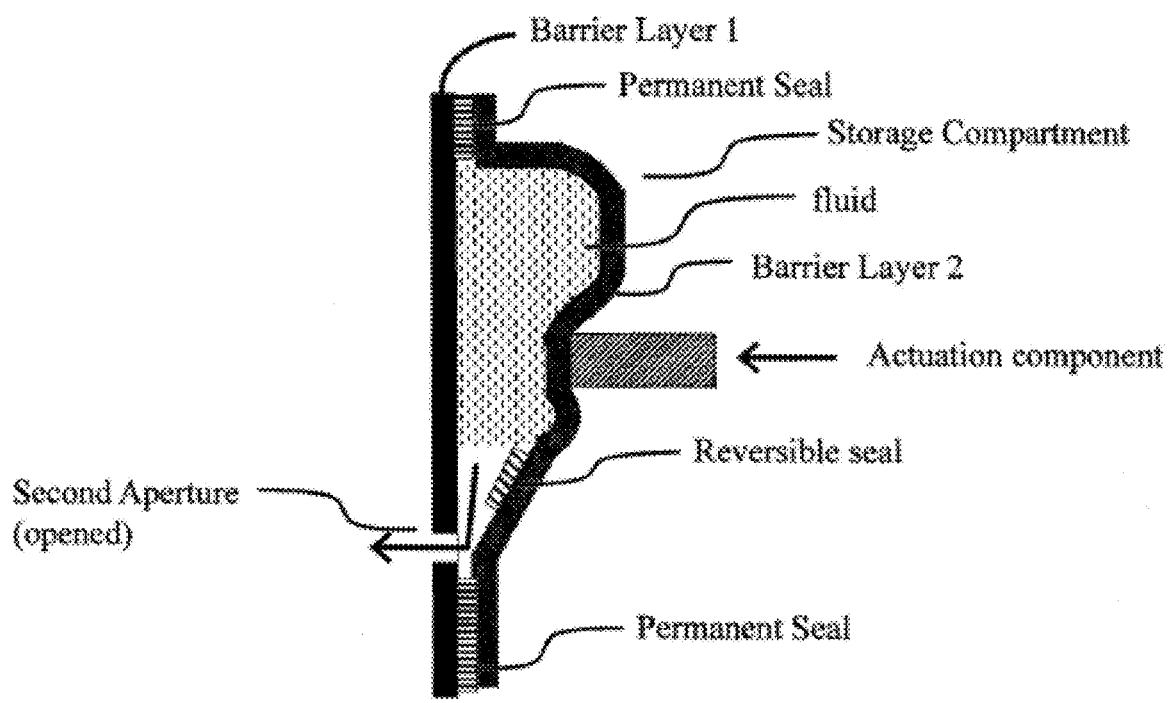

In some embodiments, the second aperture comprises a reversible seal between two of the barrier layers. FIG. 7A shows a non-limiting example of a fluid packaging device described herein. In this example, the fluid packaging devices comprises a storage compartment, a first aperture (not shown in the drawing), a pneumatic component to open the first aperture (not shown in the drawing), a second aperture, and an actuation component to open the second aperture. The storage compartment comprises two barrier layers that are bonded together using a permanent seal of heat sensitive adhesive. The second aperture comprises a predefined opening in the barrier layer 1, and a reversible seal bonding the barrier layer 1 and barrier layer 2 together. This reversible seal blocks the liquid inside the storage compartment to exit from the opening. The reversible seal can be achieved by different methods, for example, a pressure sensitive adhesive. This reversible seal can be separated by the actuation component so as to open the second aperture, as shown in FIG. 7B. In this example, the actuation component applies a mechanical compression force on the barrier layer 2, which causes the barrier layer 2 to deform and further compress the liquid inside the storage compartment. The compression on the liquid generates a hydraulic pressure, which applies a tensile stress on the reversible seal. When this tensile stress increases above the bonding strength of the reversible seal, it breaks open the reversible seal between the two layers, thus creating a path for fluid in the storage compartment to exit through the predefined opening. Various methods of how to use a compression force to open a reversible seal can be used (see e.g., US 2012/0107811 A1).

Figure 7C:
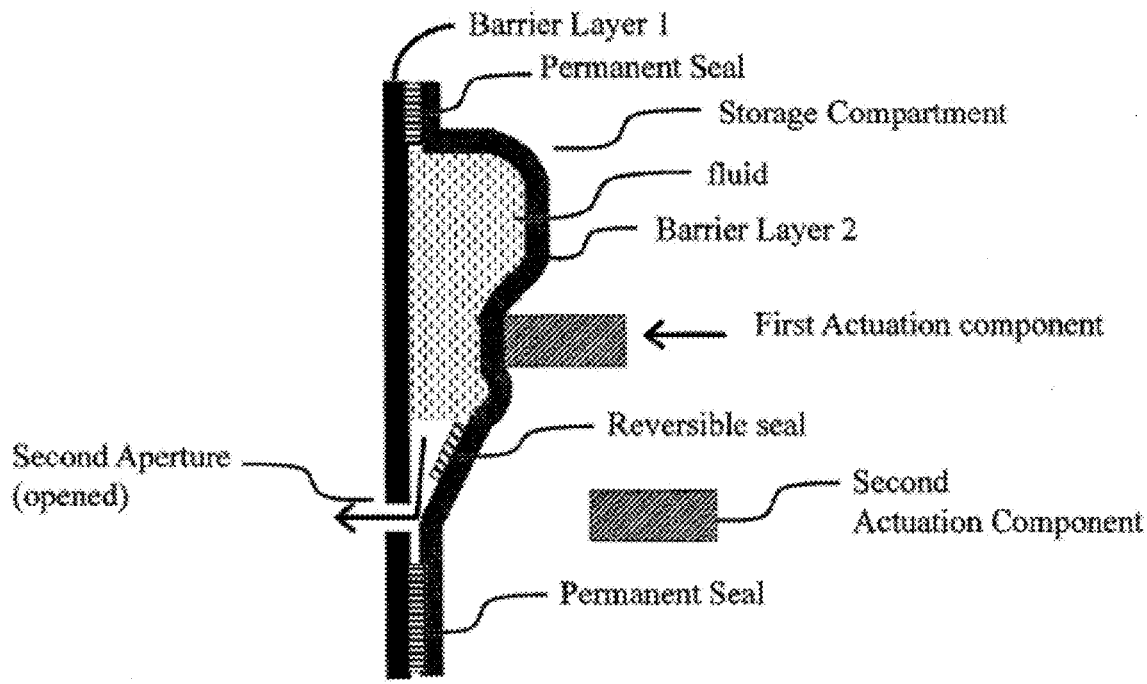
Figure 7D:
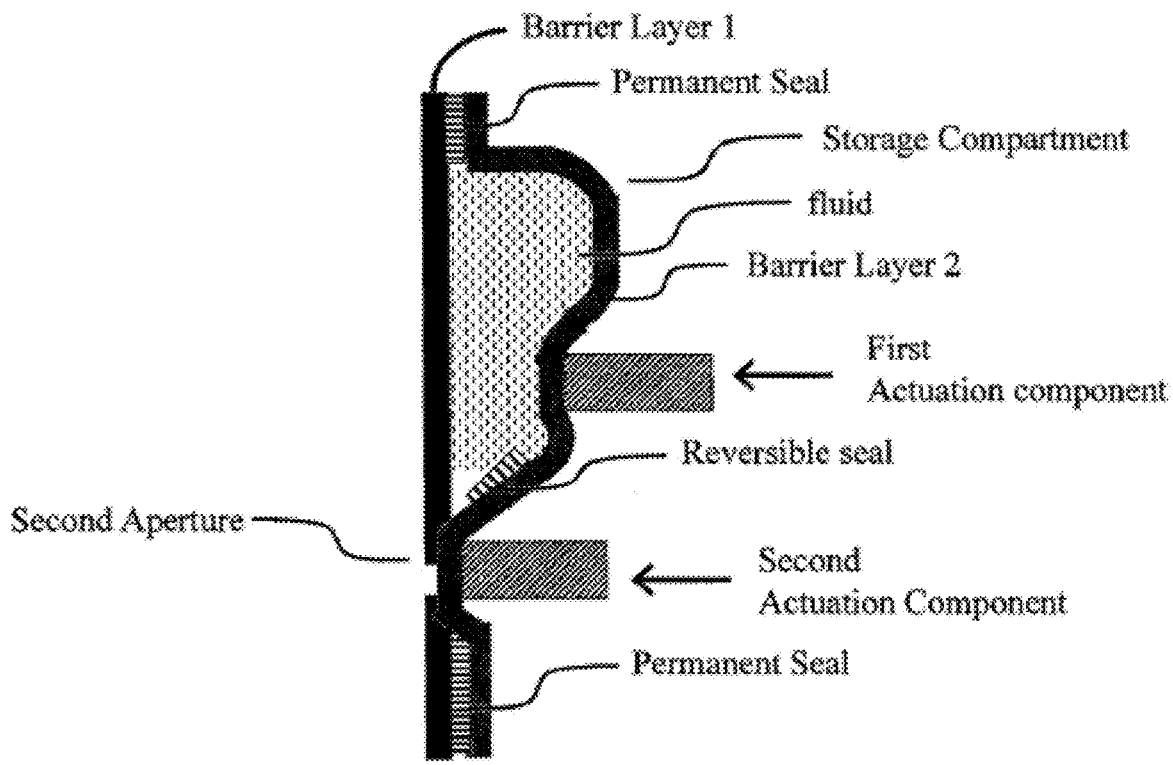

In some embodiments, the packaging device further comprises a second actuation component. FIG. 7C shows a non-limiting example of a fluid packaging device described herein. In this example, the second actuation component faces the predefined opening of the second aperture. As shown in FIG. 7D, when it compresses the barrier layer 2, the deformation of the layer 2 seals up the predefined opening. In this way, the second actuation component can be used to close the second aperture and block fluid either exiting or entering the storage compartment via the second aperture.

Figure 8A:
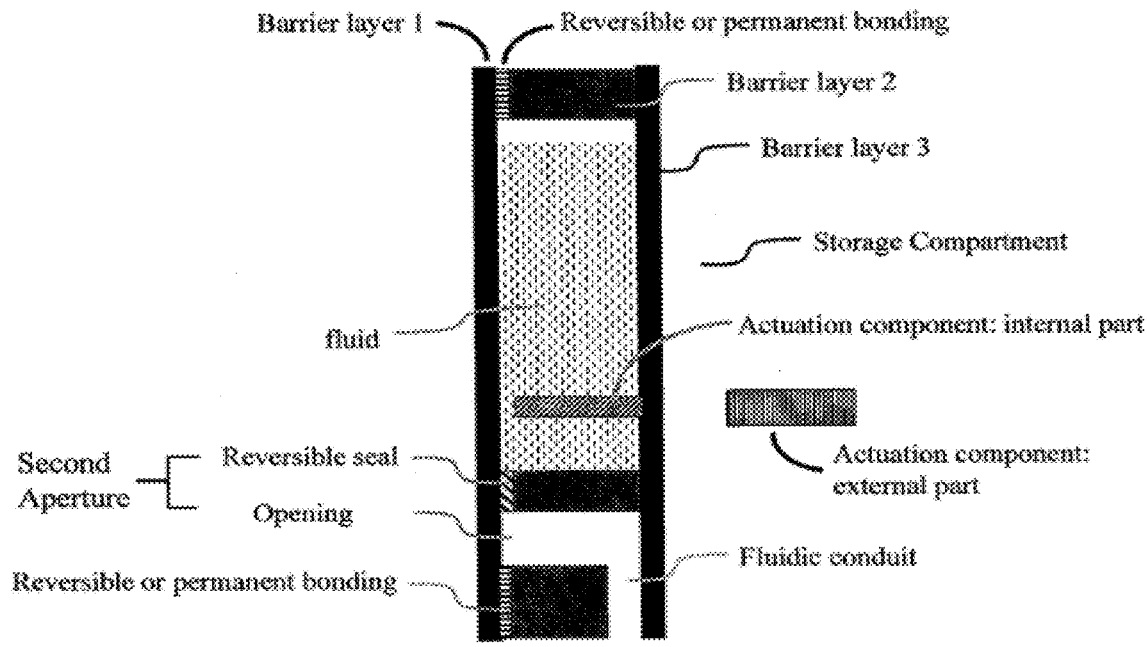
FIGS. 8A-8D illustrate, in accordance with various embodiments of the disclosure, another non-limiting example of a packaging device described herein.

FIG. 8A shows another non-limiting example of a packaging device described herein. In this example, the fluid packaging devices comprises a storage compartment, a first aperture (not shown in the drawing), a pneumatic component to open the first aperture (not shown in the drawing), a second aperture, and an actuation component to open the second aperture. The storage compartment comprises three barrier layers: layer 1, layer 2 and layer 3. The layer 2 is bonded to the barrier layer 3. This bonding can be either a permanent bonding or a reversible bonding. On the other side, the layer 2 is bonded to the barrier layer 1 with a reversible bonding. The second aperture comprises a predefined opening that leads to a fluidic conduit. The aperture further comprises a reversible seal, which can utilize an area of the reversible bonding between the layer 1 and layer 2 or use an additional reversible bonding layer, to block the fluid exiting the second aperture. The actuation component comprises an internal part, which is a pillar structure affixed on the layer 3 and facing the layer 1, and an external part to provide a compression force for the actuation.

Figure 8B:
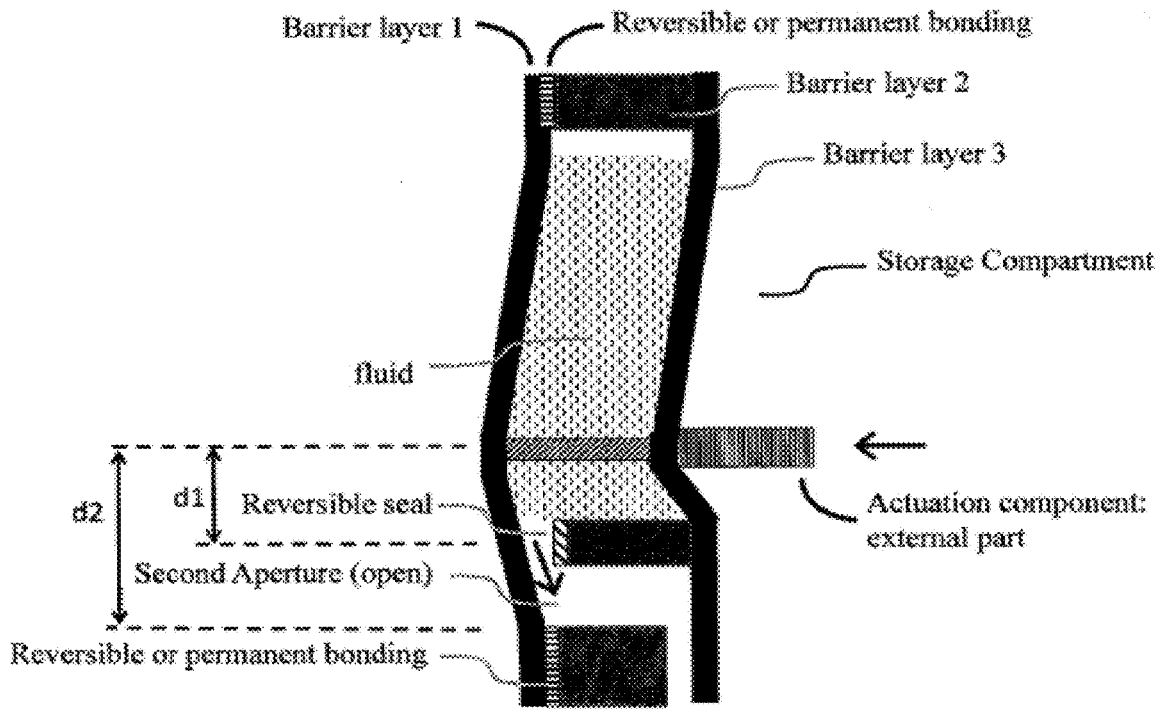

To open the second aperture, as shown in FIG. 8B, the external part of the actuation component compresses the layer 3 to deform out of plane. This deformation further pushes the pillar structure to compress against the layer 1, and cause the layer 1 to deform as well. The deformation of the layer 1 applies a tensile stress on the reversible seal of the second aperture, which increases in response to an increasing amount of the deformation of the layer 1. When this tensile stress surpasses the bonding strength of the reversible seal, it breaks the reversible seal and open up the second aperture. In some embodiments where the layer 1 and the layer 2 are bonded together also by reversible bonding, it is preferred that the distance d1 (the distance from the pillar structure to the reversible seal of the second aperture) is shorter than the distances d2 (the shortest distance from the pillar structure to any other parts of the reversible bonding). For one example, d1 can be 90% or less of d2. For another example, d1 can be 80% or less of d2. For yet another example, d1 can be 70%, 60%, or 50%, or less of d2. In this way, the same amount of the deformation of the layer 1 at the pillar structure causes the largest amount of tensile stress at the reversible seal of the second aperture, in comparison to other parts of the reversible bonding. Therefore, the actuation component can be used to break the reversible seal of the second aperture, without breaking the other part of the reversible bonding.

Figure 8C:
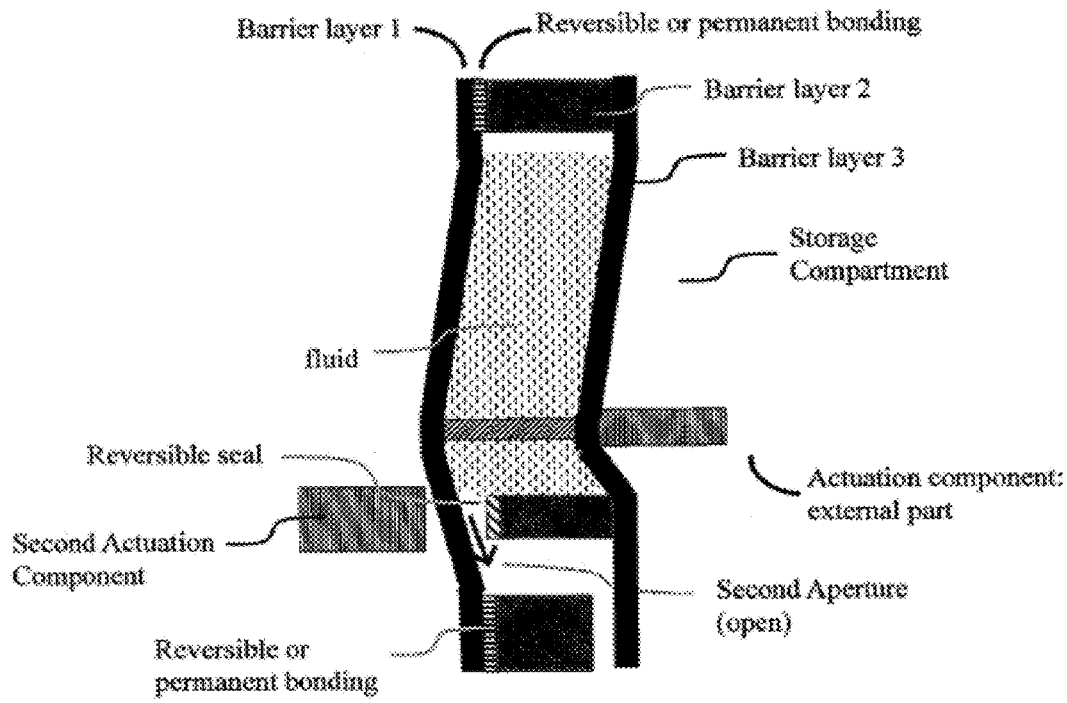
Figure 8D:
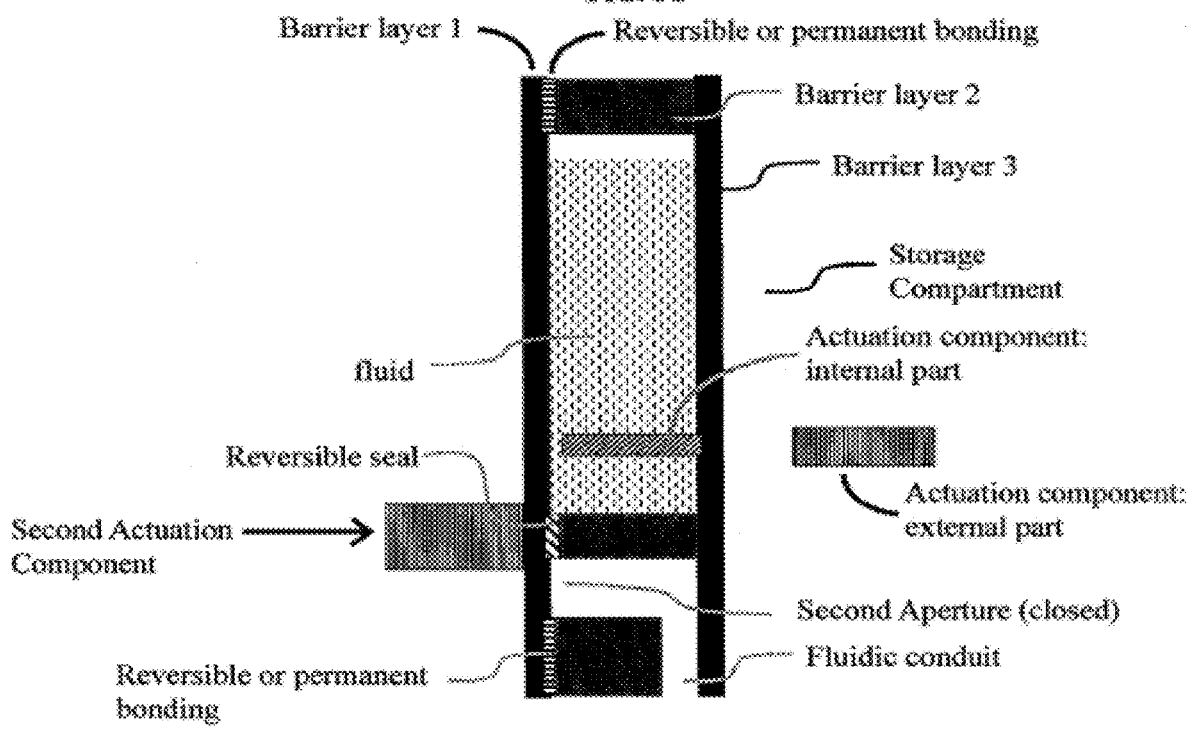

In some embodiments, the packaging device further comprises a second actuation component, which is used to close the second aperture after the reversible seal is broken. In the non-limiting example of the FIG. 8C, the second actuation component is a rod having a flat surface facing the reversible seal. To open the second aperture, as described above, the first actuation component is used to deform the layer 1 to break the reversible seal. To close the second aperture after the reversible seal is broken, as shown in FIG. 8D, the second actuation component compresses the area of the barrier layer 1 at the reversible seal, and pushes the layer 1, the broken reversible seal and the layer 2 to form physical contact. This physical contact stops the fluid to exit the storage compartment. In this way, the second actuation component can be used to close the second aperture after the initial reversible seal is broken.

Figure 9A:
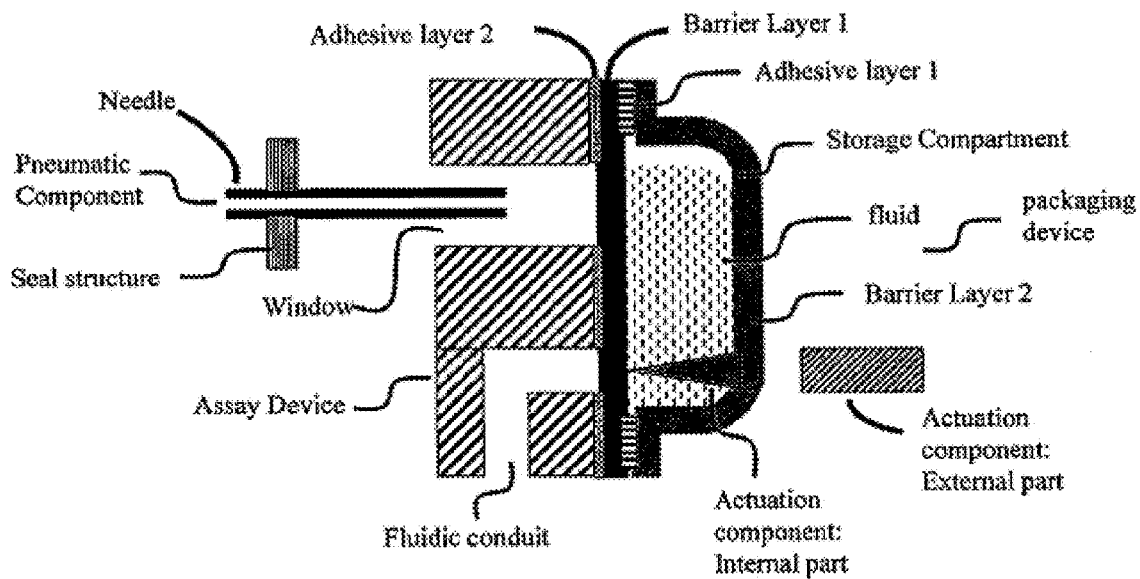
FIGS. 9A-9E illustrate, in accordance with various embodiments of the disclosure, one non-limiting example of an assay system described herein. The assay system comprises a packaging device and an assay device attached together. The packaging device comprises a storage compartment that is formed by a barrier layer 1 and a barrier layer 2 bonded together by an adhesive layer 1.

FIG. 9A shows one non-limiting example of an assay system described herein. The assay system comprises a packaging device and an assay device attached together. The packaging device comprises a storage compartment that is formed by a barrier layer 1 and a barrier layer 2 bonded together by an adhesive layer 1. The packaging device further comprises a first aperture, a second aperture, a pneumatic component, and an actuation component. The first aperture comprises a designated area on the barrier layer 1. The second aperture comprises another designated area on the barrier layer 1. The pneumatic component comprises a hollow needle and a seal structure. The actuation component comprises an internal part with a sharp tip facing the second aperture and an external part configured for applying compression to move the internal part. The assay device and the packing device are attached together using an adhesive layer 2. The assay device comprises a window and a fluidic conduit. The window is configured to allow the pneumatic component to access the first aperture of the packaging device. The fluidic conduit is configured to face the second aperture of the packaging device for accessing the fluid packaged therein.

Figure 9B:
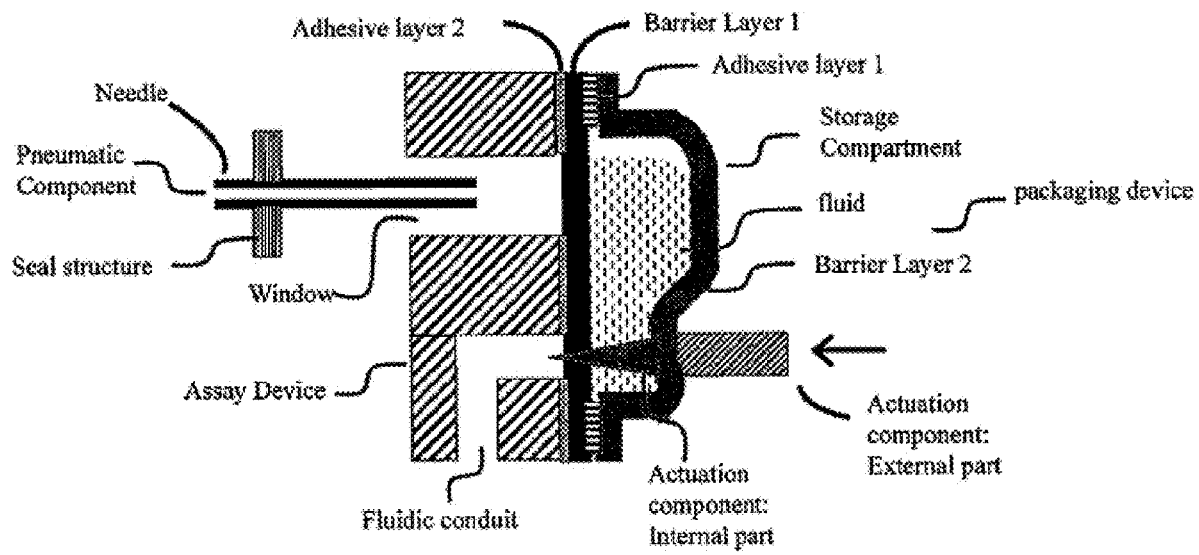
Figure 9C:
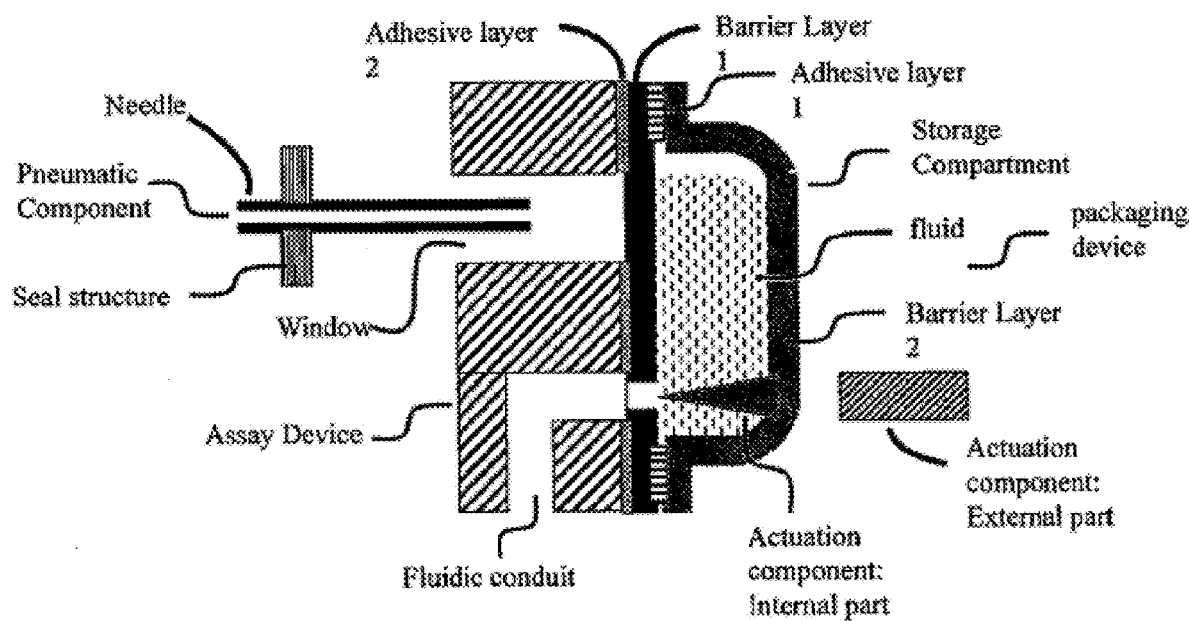

To open the second aperture, as shown in FIG. 9B, the external part of the actuation component compresses the barrier layer 2 to push the sharp tip to pierce the barrier layer 1 within the second aperture to create an opening. Upon releasing the sharp tip, as shown in FIG. 9C, the opened second aperture allows the fluid inside the storage compartment to exit the storage compartment and hence enter the fluidic conduit of the assay device.

Figure 9D:
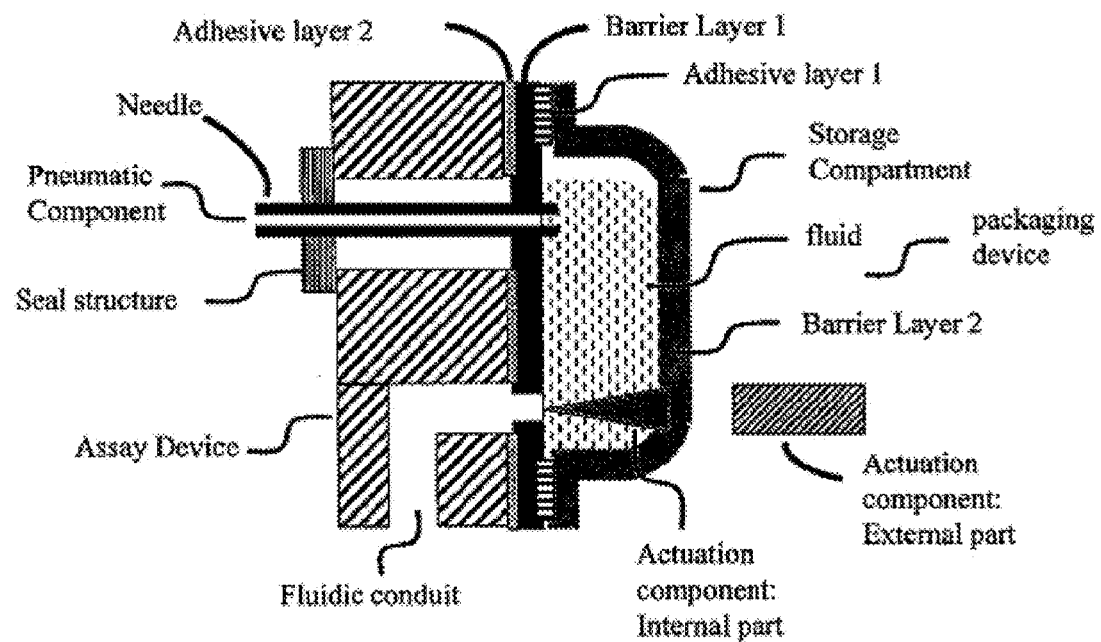
Figure 9E:
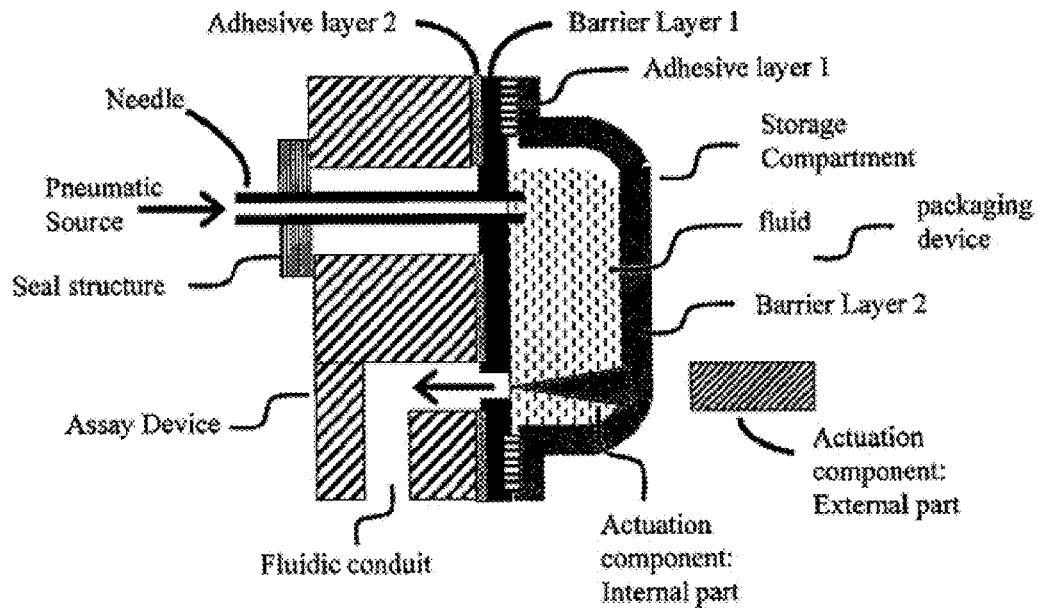

To open the first aperture, as shown in FIG. 9D, the pneumatic component moves through the window towards the storage compartment until the hollow needle pierces open the layer 1 within the first aperture and accesses the inside of the storage compartment. Additionally, the seal structure forms a close contact with the window of the assay device to create a pneumatic seal preventing pressure leakage at the interface. By applying a positive pneumatic pressure, which has a pressure level higher than the pressure in the fluidic conduit, as shown in FIG. 9E, the fluid inside the storage compartment is driven to exit the storage compartment via the second aperture and enter the fluidic conduit of the assay device.

Figure 10A:
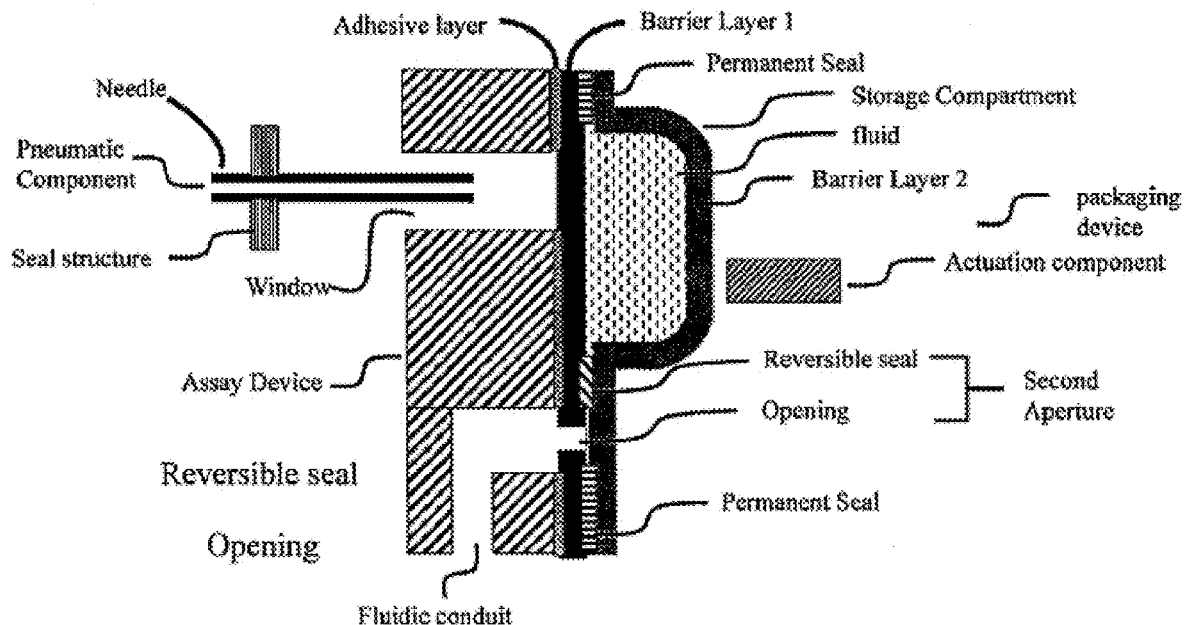
FIGS. 10A-10C illustrate, in accordance with various embodiments of the disclosure, another non-limiting example of an assay system described herein. In this example, the second aperture comprises a predefined opening on the barrier layer 1 and a reversible seal between the two barrier layers.
Figure 10B:
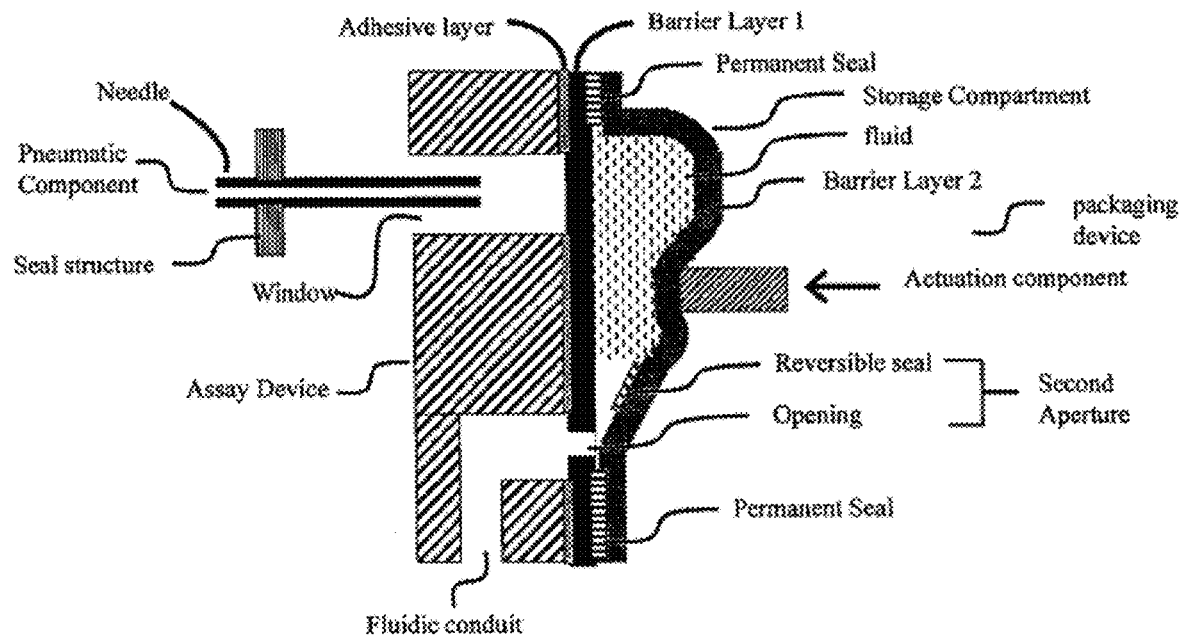
Figure 10C:
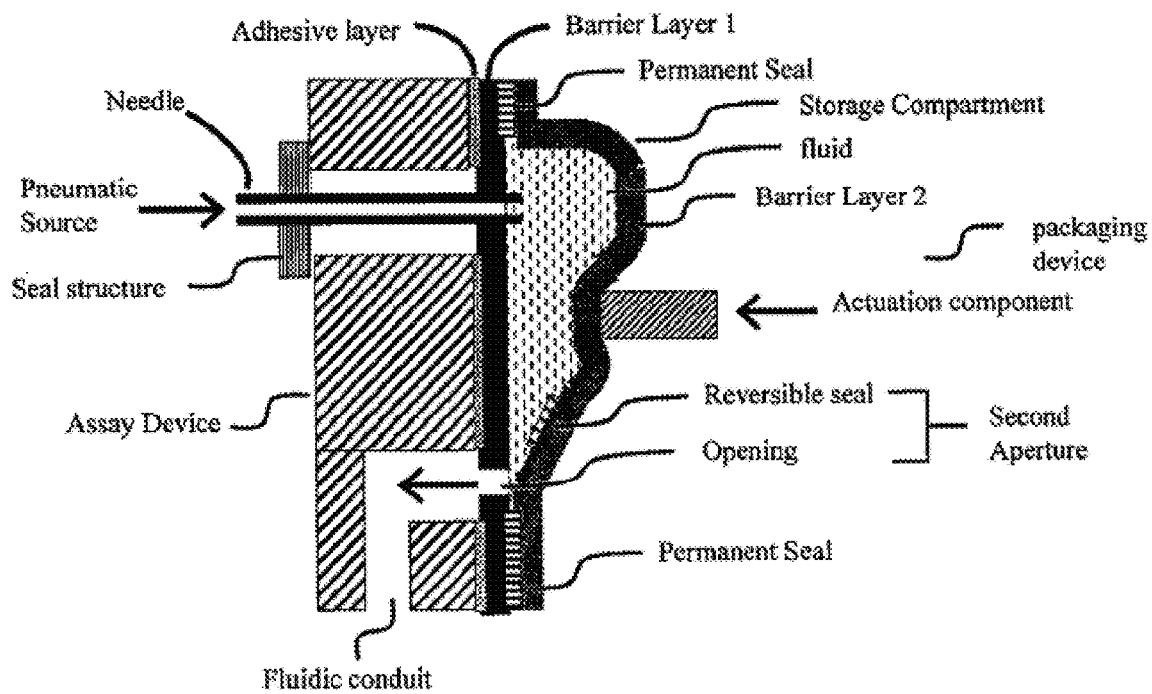

FIG. 10A shows another non-limiting example of an assay system described herein. In this example, the second aperture comprises a predefined opening on the barrier layer 1 and a reversible seal between the two barrier layers. The predefined opening of the second aperture is facing the fluidic conduit of the assay device. To open the second aperture, as shown in FIG. 10B, the actuation component applies a mechanical compression force on the barrier layer 2, which causes the barrier layer 2 to deform and further compress the liquid inside the storage compartment. The compression on the liquid generates a hydraulic pressure, which applies a tensile stress on the reversible seal. When this tensile stress increases above the bonding strength of the reversible seal, it breaks open the reversible seal between the two layers, thus creating a path for fluid in the storage compartment to exit. To open the first aperture, as shown in FIG. 10C, the pneumatic component moves through the window towards the storage compartment until the hollow needle pierces open the layer 1 within the first aperture and accesses the inside of the storage compartment. Additionally, the seal structure forms a close contact with the window of the assay device to create a pneumatic seal preventing pressure leakage at the interface. By applying a positive pneumatic pressure, which has a pressure level higher than the pressure in the fluidic conduit, the fluid inside the storage compartment is driven to exit the storage compartment via the second aperture and enter the fluidic conduit of the assay device.

Figure 10D:
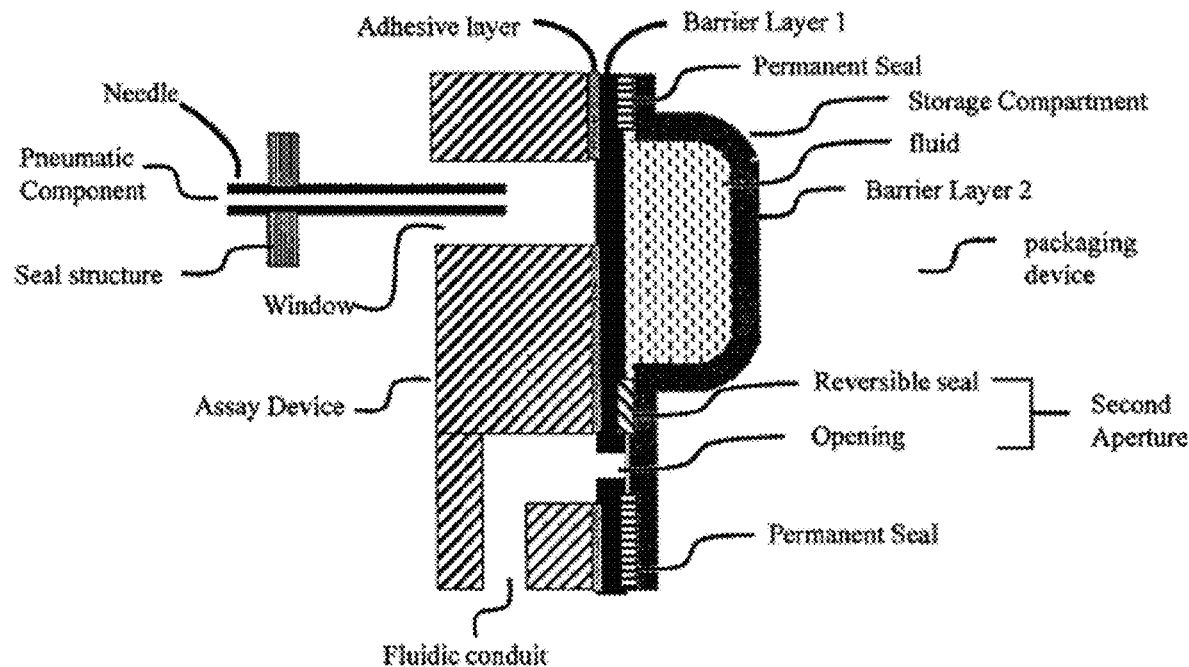
FIGS. 10D-10F illustrate, in accordance with various embodiments of the disclosure, another non-limiting example of an assay system described herein. In this example, the pneumatic component is used not only for opening the first aperture and introducing a pneumatic pressure, but also as an actuation component for opening the second aperture.
Figure 10E:
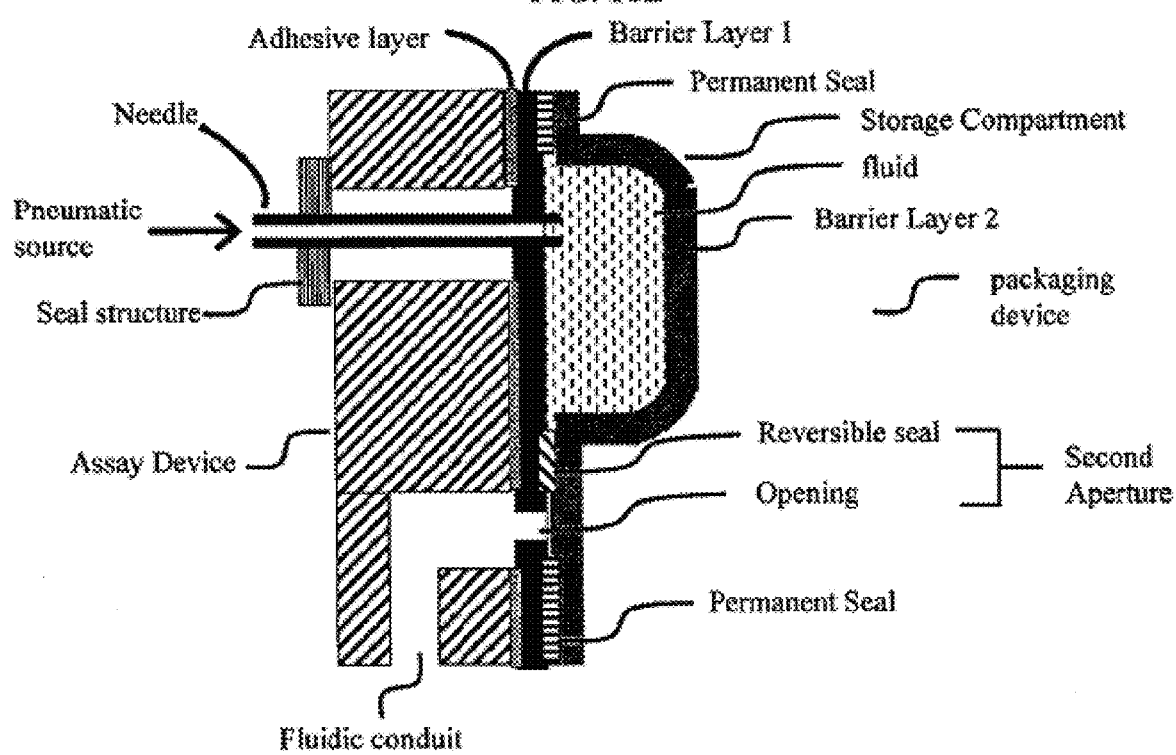
Figure 10F:
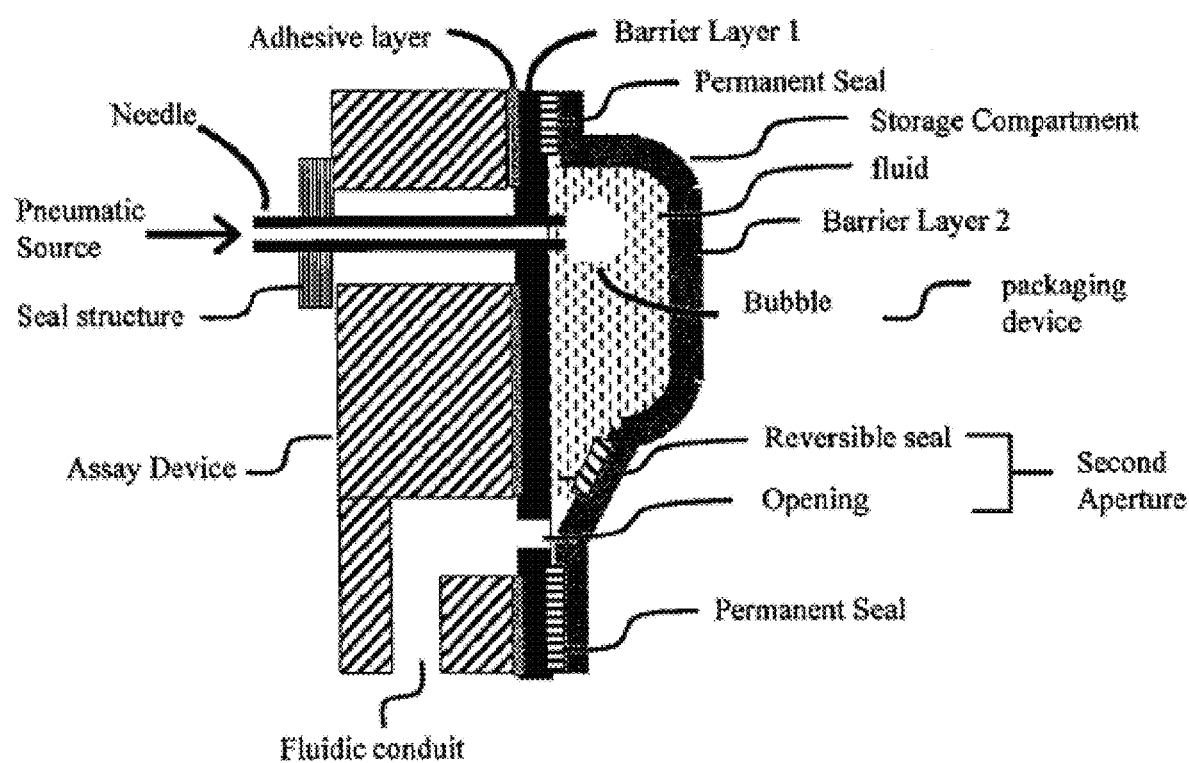

FIG. 10D shows another non-limiting example of an assay system described herein. In this example, the pneumatic component is used not only for opening the first aperture and introducing a pneumatic pressure, but also as an actuation component for opening the second aperture. First, the pneumatic component is used to open the first aperture by piercing open the barrier layer 1, as shown in FIG. 10E. Then, by introducing a positive pneumatic pressure (e.g., pumping air) into the storage compartment, the hydraulic pressure of the fluid inside the storage compartment is increased. This hydraulic pressure applies a tensile stress on the reversible seal that breaks the reversible seal to open the second aperture, as shown in FIG. 10F. By continuing to apply a positive pneumatic pressure, the fluid inside the storage compartment is driven to exit the storage compartment via the second aperture and enter the fluidic conduit of the assay device.

Figure 11A:
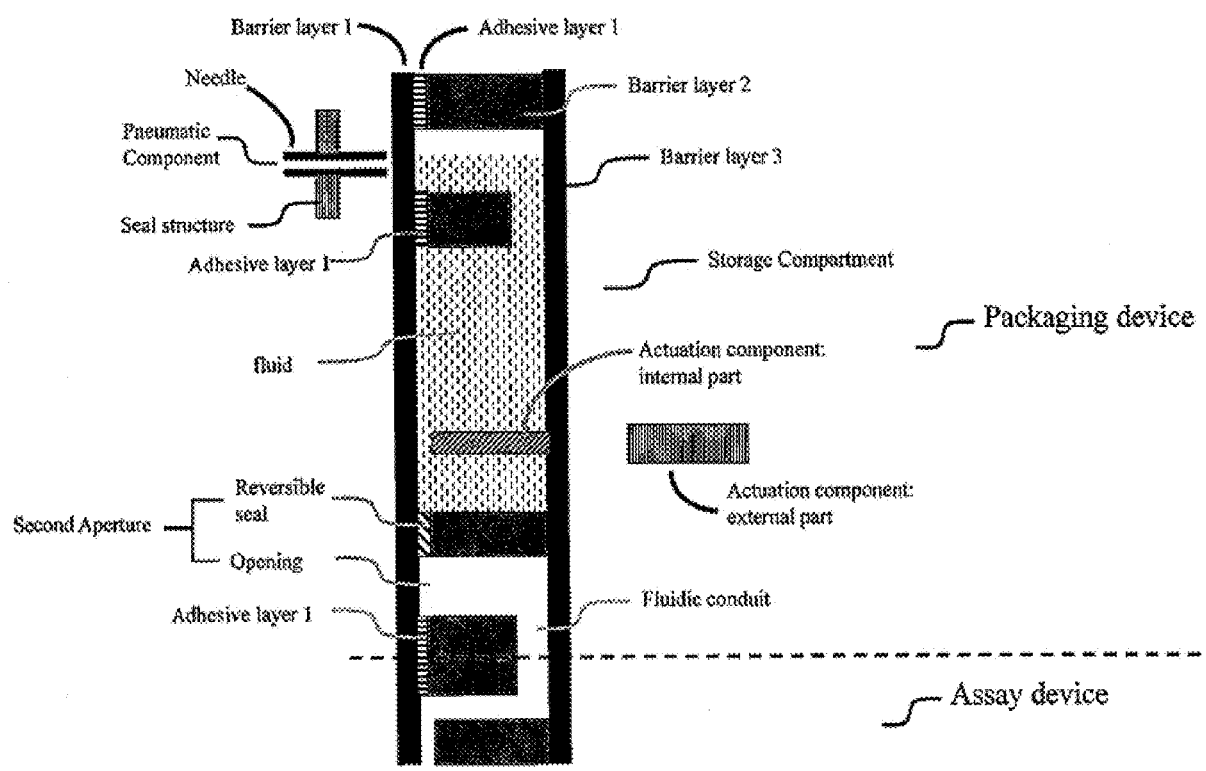
FIGS. 11A-11F illustrate, in accordance with various embodiments of the disclosure, another non-limiting example of an assay system described herein. In this example, the assay system comprises a packaging device and an assay device. The packaging device comprises three barrier layers (layer 1, layer 2 and layer 3) to form the storage compartment.

FIG. 11A shows another non-limiting example of an assay system described herein. In this example, the assay system comprises a packaging device and an assay device. The packaging device comprises three barrier layers (layer 1, layer 2 and layer 3) to form the storage compartment. The layer 2 and layer 3 are bonded together using a direct bonding as described herein. The layer 1 and the layer 2 are bonded together using an adhesive layer 1. Additionally, the three barrier layers are also used to form the assay device. Only part of the assay device is shown in the drawing, which comprises a fluid conduit accessing the second aperture of the packaging device. By using the same barrier layers to form the packaging device and the assay device, the assay system can be built with a simple process without additional assembly steps. In various embodiments, the barrier layers are used to form a portion or the whole of assay devices.

Figure 11B:
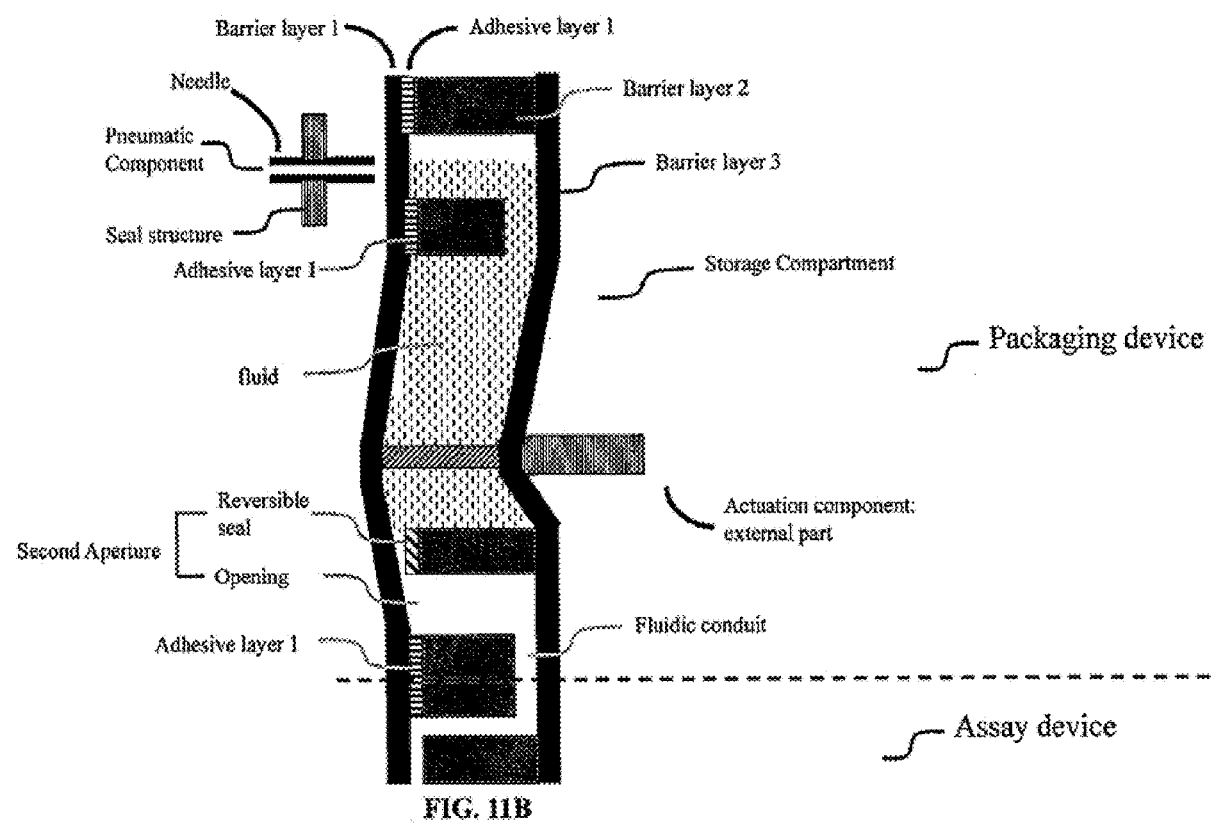
Figure 11C:
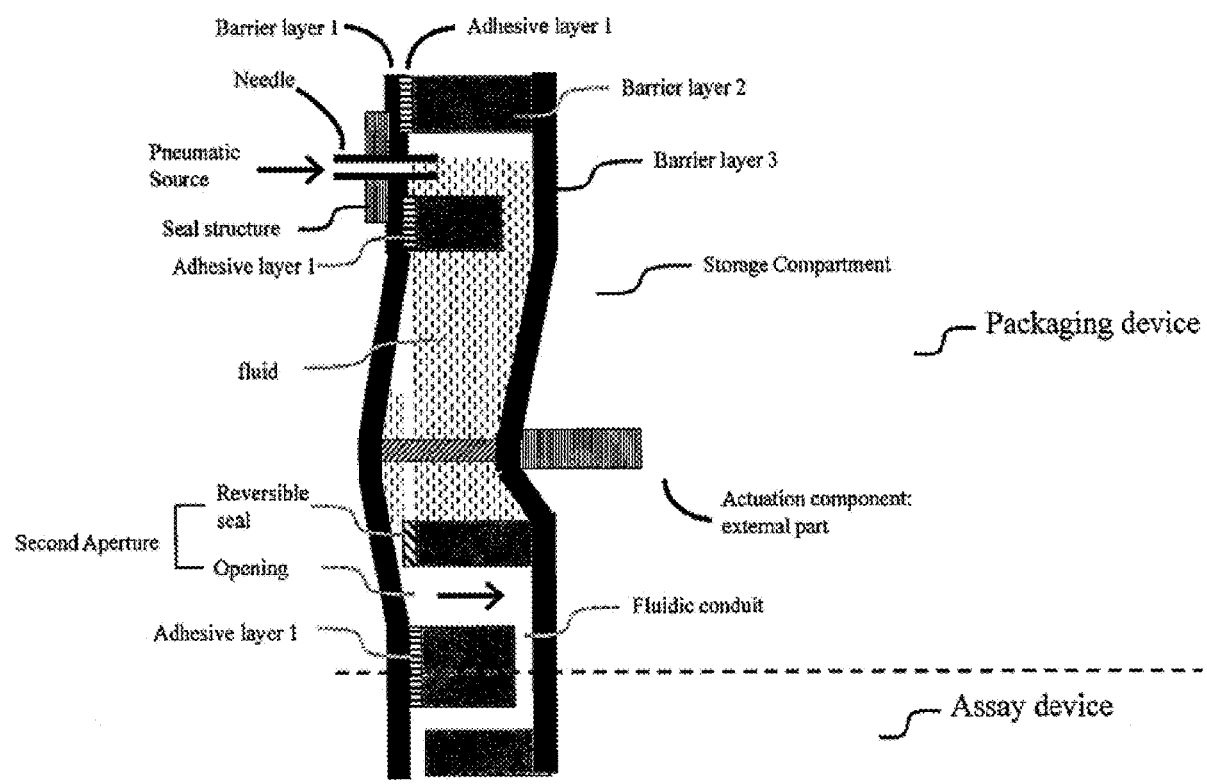

In this example, the first aperture comprises a designated area on the layer 1. The second aperture comprises a predefined opening accessing the fluidic conduit in the assay device, and a reversible seal between the layer 1 and the layer 2 configured to block the fluid inside the storage compartment from exiting through the predefined opening. The packaging device further comprises a pneumatic component and an actuation component. The pneumatic component comprises a hollow needle and a seal structure. The actuation component comprises an internal part having a pillar structure and an external part configured to induce compression To open the second aperture, as shown in FIG. 11B, the external part of the actuation component compresses the layer 3 and leads to its deformation. This deformation further pushes the pillar structure to deform the layer 1. The deformation of the layer 1 increases the tensile stress in the reversible seal until it breaks the reversible seal, thus creating a fluid path for the fluid to exit the storage compartment via the second aperture. To open the first aperture, as shown in FIG. 11C, the hollow needle of the pneumatic component pierces open the layer 1 inside the first aperture and the seal structure forms a close contact with the layer 1 to create a pneumatic seal. When a positive pneumatic pressure is applied through first aperture, it drives the fluid inside the storage compartment to exit via the second aperture and enter the fluidic conduit of the assay device.

Figure 11D:
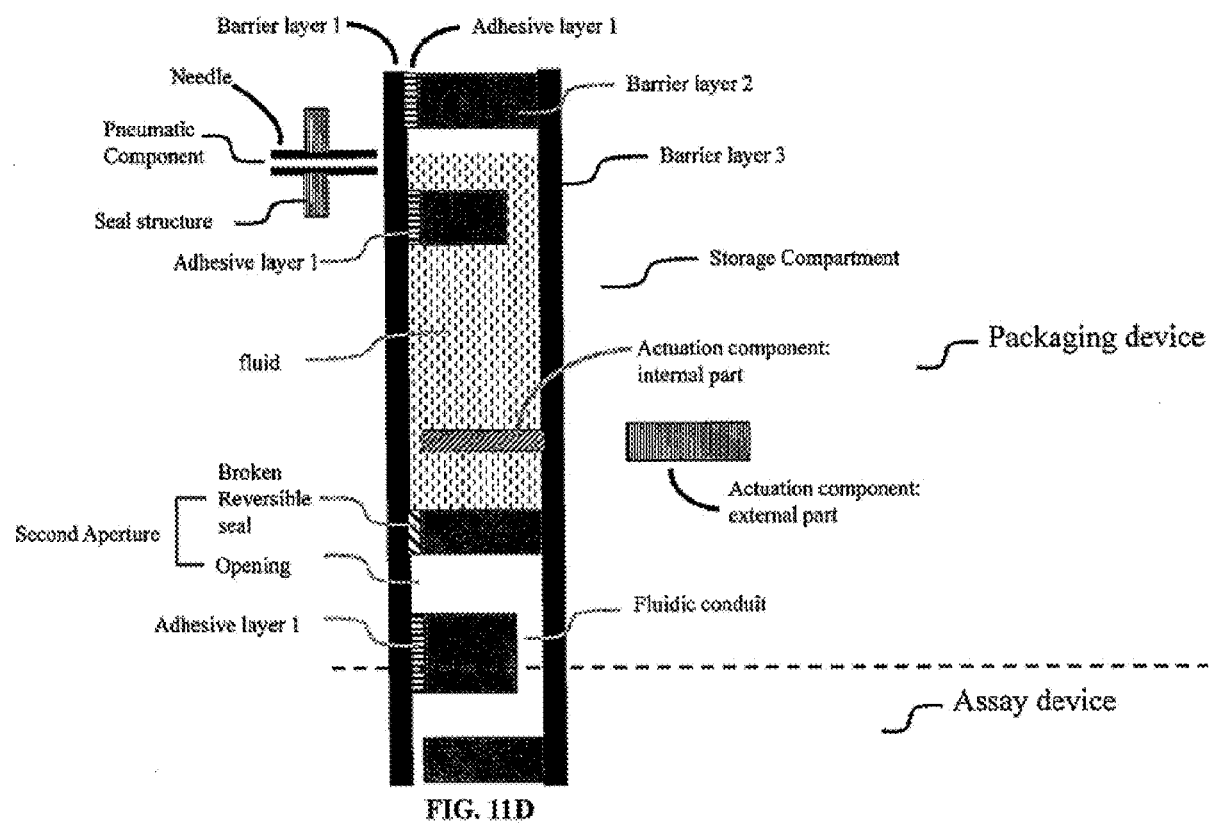
Figure 11E:
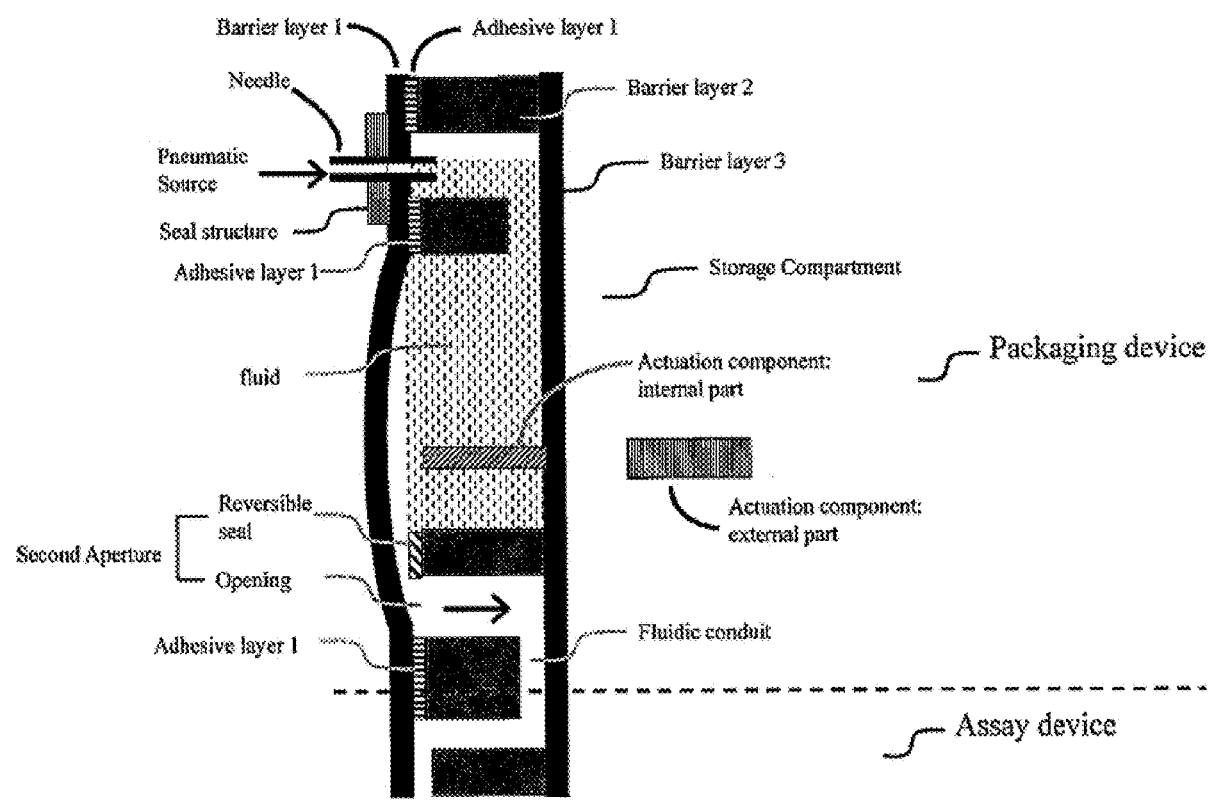

In some embodiments, the reversible seal uses a pressure sensitive adhesive, which requires a compression pressure to establish a strong bonding between the layer 1 and the layer 2. After the reversible seal is broken by the actuation component, it has no or minimal bonding strength to hold together the layer 1 and the layer 2. Without a compression pressure to re-establish the strong bonding, the reversible seal remains broken after the deformation of the layer 1 is relieved, as shown in FIG. 11D. With this broken seal, a positive pneumatic pressure applied through the first aperture can generate sufficient hydraulic pressure in the fluid inside the storage compartment, and this hydraulic pressure can separate the layer 1 from the layer 2, as shown in FIG. 11E, and hence create a path to allow the fluid to exit the second aperture.

Figure 11F:
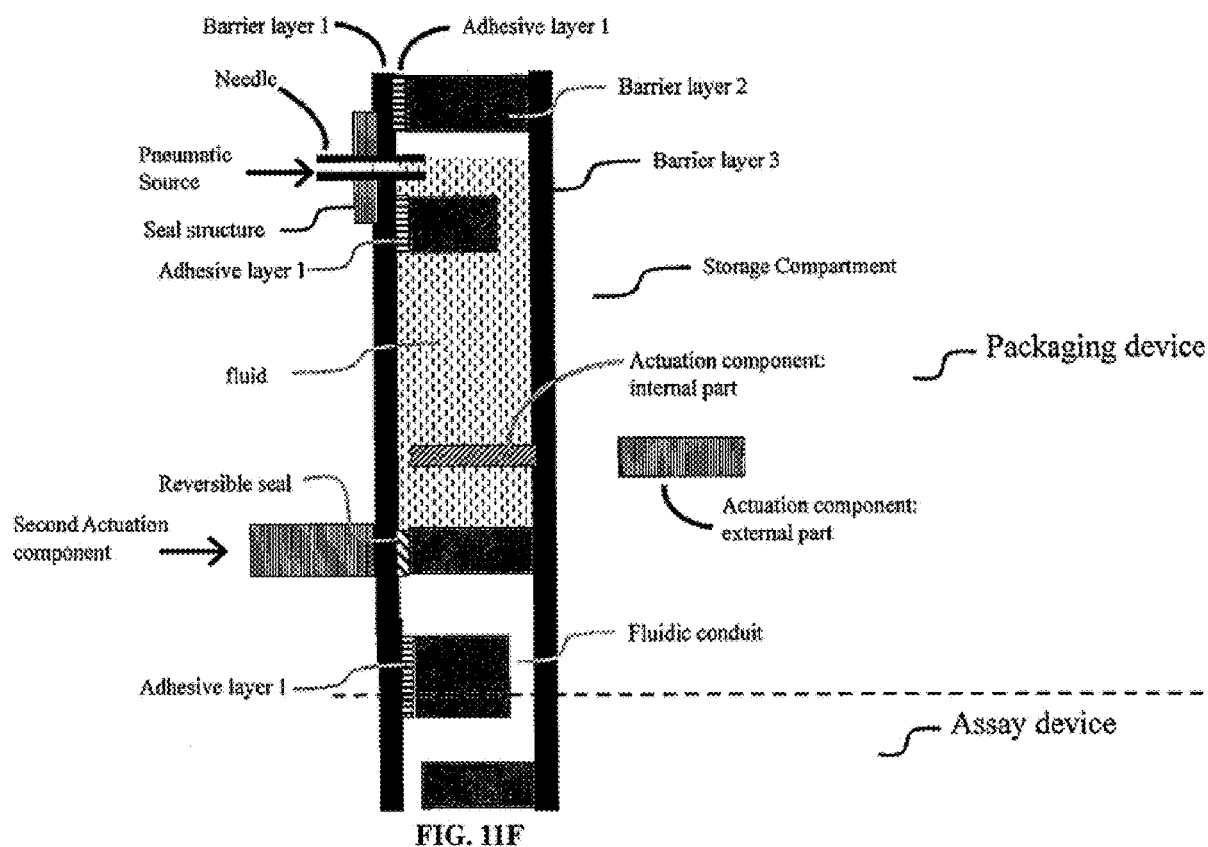

In some embodiments, the packaging device further comprises a second actuation component, as shown in the non-limiting example of FIG. 11F. The second actuation component is a rod having a flat surface facing the reversible seal. To close the second aperture after the reversible seal is broken, the second actuation component compresses the area of the barrier layer 1 at the reversible seal, and pushes the layer 1, the broken reversible seal and the layer 2 to form physical contact. This physical contact stops the fluid to exit the storage compartment. In this way, the second actuation component can be used to close the second aperture after it is opened by the first actuation component.

The storage compartment of the fluid packaging device could be of any shapes including but not limited to circle, semi-circle, quarter circle, oval, ellipse, triangle, square, rectangular, corner-rounded rectangular, pentagon, hexagon, heptagon, octagon, nonagon, decagon, and dome, other regular and irregular shapes, and their combinations.

Figure 12A:
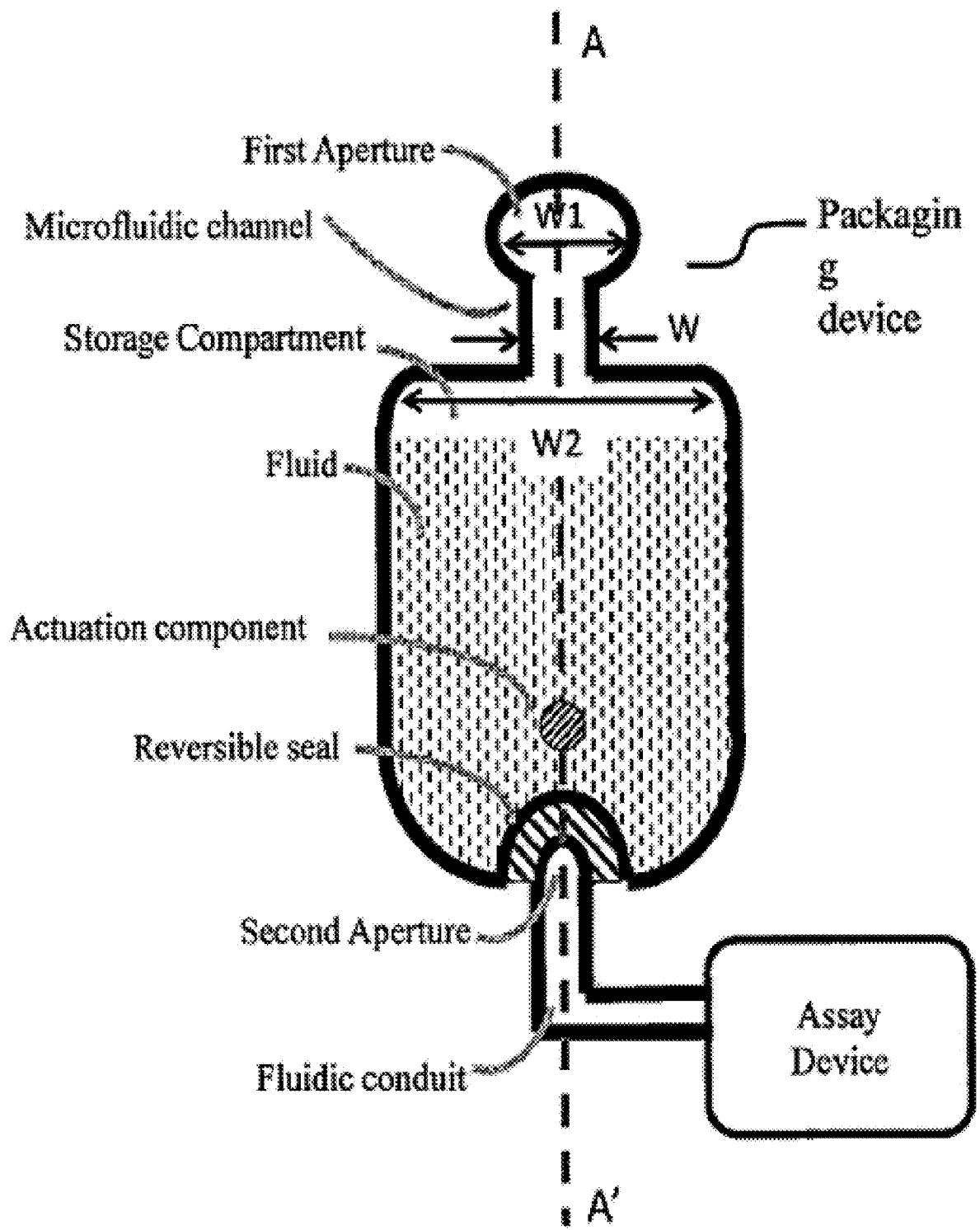
FIG. 12A illustrates, in accordance with various embodiments of the disclosure, the top view of a non-limiting example of such a packaging device.
Figure 12B:
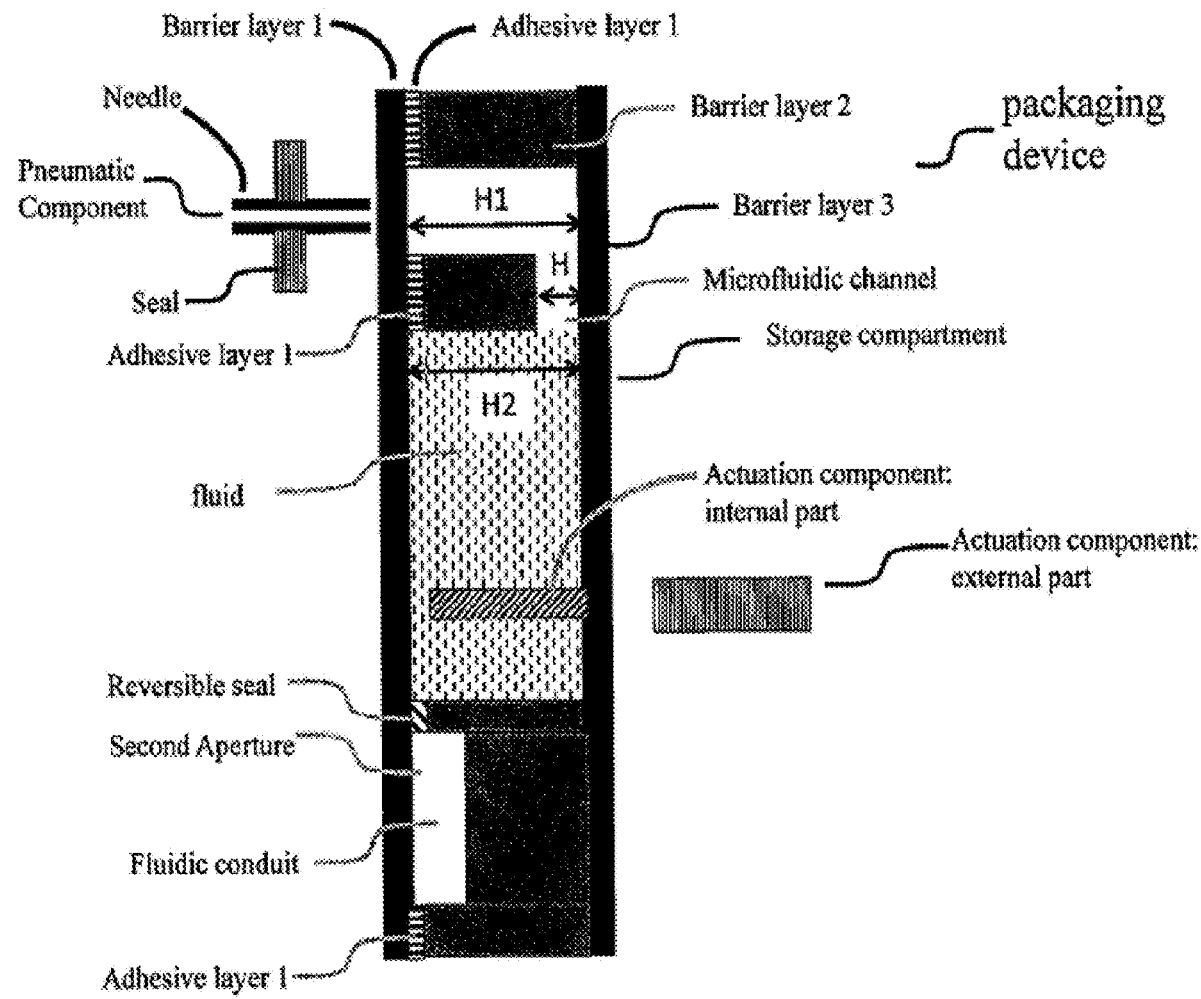
FIG. 12B illustrates, in accordance with various embodiments of the disclosure, The cross-section view along the dot line AA' in FIG. 12A.

In various embodiments, a packing device as described herein comprises a segment configured as a microfluidic channel. FIG. 12A shows the top view of a non-limiting example of such a packaging device. The cross-section view along the dot line AA' is shown in FIG. 12B. In this example, the packaging device is fluidly connected to an assay device to form an assay system. The assay device comprises a fluidic conduit accessing the second aperture of the packaging device. The packaging device comprises a storage compartment, a first aperture, a second aperture with a reversible seal, a pneumatic component to open the first aperture and to introduce a pneumatic pressure, and an actuation component. The actuation component comprises an internal part having a pillar structure and an external part configured to induce compression. In addition to forming the packaging device, three barrier layers (layer 1, layer 2 and layer 3) are used as material structures to form a portion or the whole of the assay device. In this example, they form a fluidic conduit in the assay device for accessing the second aperture of the packing device. In some embodiments, a sample is received into the assay device for analysis. After opening the first aperture and the second aperture, at least a portion of the fluid stored in the packaging device exits the storage compartment and enters the assay device via the fluid conduit accessing the second aperture. In some embodiments, at least a portion of the fluid entering the assay device is used to mix with at least a portion of the sample to form a sample mixture for analysis. The storage compartment has a corner-rounded rectangular shape as the main storage space for the fluid, and further has a segment configured as a microfluidic channel. This portion is between the main storage space of the storage compartment and the first aperture.

In some embodiments, this microfluidic channel has a width W smaller than the widths of the segments of the storage compartment that are next to it (W1 and W2). The abrupt narrowing of the width from W2 to W works as a capillary valve to prevent the fluid in the main storage space from entering the microfluidic channel, when the surface of the microfluidic channel contacting the fluid is hydrophobic (see e.g., U.S. patent application Ser. No. 15/176,729). The abrupt enlargement of the width from W to W1 works as a capillary valve to prevent the fluid in the microfluidic channel from entering the first aperture, when the surface of the microfluidic channel contacting the fluid is hydrophilic. In certain embodiments, the width W is in the range of about 1-10, 10-20, 20-30, 30-40, 40-50, 50-60, 60-70, 70-80, 80-90, 90-100, 100-200, 200-300, 300-400, 400-500, 500-600, 600-700, 700-800, 800-900, or 900-1000 μm. In some embodiments, the width W is 50%, 40%, or 30% or less of W1 or W2. In some embodiments, the width W is 20% or less of W1 or W2. In some embodiments, the width W is 10% or less of W1 or W2. In some embodiments, the width W is 5% or less of W1 or W2.

In some embodiments, this microfluidic channel has a height H smaller than the heights of the segments of the storage compartment that are next to it (H1 and H2). The abrupt narrowing of the height from H2 to H works as a capillary valve to prevent the fluid in the main storage space from entering the microfluidic channel if the surface of the microfluidic channel is hydrophobic. The abrupt enlargement of the height from H to H1 works as a capillary valve to prevent the fluid in the microfluidic channel from entering the first aperture if the surface of the microfluidic channel is hydrophilic. In certain embodiments, the height H is in the range of about 1-10, 10-20, 20-30, 30-40, 40-50, 50-60, 60-70, 70-80, 80-90, 90-100, 100-200, 200-300, 300-400, 400-500, 500-600, 600-700, 700-800, 800-900, or 900-1000 μm. In some embodiments, the width H is 50%, 40%, or 30% or less of H1 or H2. In some embodiments, the width H is 20% or less of H1 or H2. In some embodiments, the width H is 10% or less of H1 or H2. In some embodiments, the width H is 5% or less of H1 or H2.

In some embodiments, this microfluidic channel has a diameter Ø smaller than the diameters of the segments of the storage compartment that are next to it (Ø1 and Ø2). The abrupt narrowing of the diameter from Ø2 to Ø works as a capillary valve to prevent the fluid in the main storage space from entering the microfluidic channel if the surface of the microfluidic channel is hydrophobic. The abrupt enlargement of the diameter from Ø to Ø2 works as a capillary valve to prevent the fluid in the microfluidic channel from entering the first aperture if the surface of the microfluidic channel is hydrophilic. In certain embodiments, the diameter Ø is in the range of about 1-10, 10-20, 20-30, 30-40, 40-50, 50-60, 60-70, 70-80, 80-90, 90-100, 100-200, 200-300, 300-400, 400-500, 500-600, 600-700, 700-800, 800-900, or 900-1000 μm. In some embodiments, the width Ø is 50%, 40%, or 30% or less of Ø1 or Ø2. In some embodiments, the width Ø is 20% or less of Ø1 or Ø2. In some embodiments, the width Ø is 10% or less of Ø1 or Ø2. In some embodiments, the width Ø is 5% or less of Ø1 or Ø2.

In the non-limiting example shown in FIG. 12A and FIG. 12B, the second aperture of the packaging device comprises an opening that is accessing the fluidic conduit of the assay device, and a reversible seal in the shape of a circular band that is blocking the fluid in the storage compartment to exit via the second aperture. The second aperture is at the bottom the storage compartment. In some embodiments, the storage compartment is used in a vertical positioning, and the second aperture at the bottom of the compartment helps to drain the fluid completely from the storage compartment.

Figure 13A:
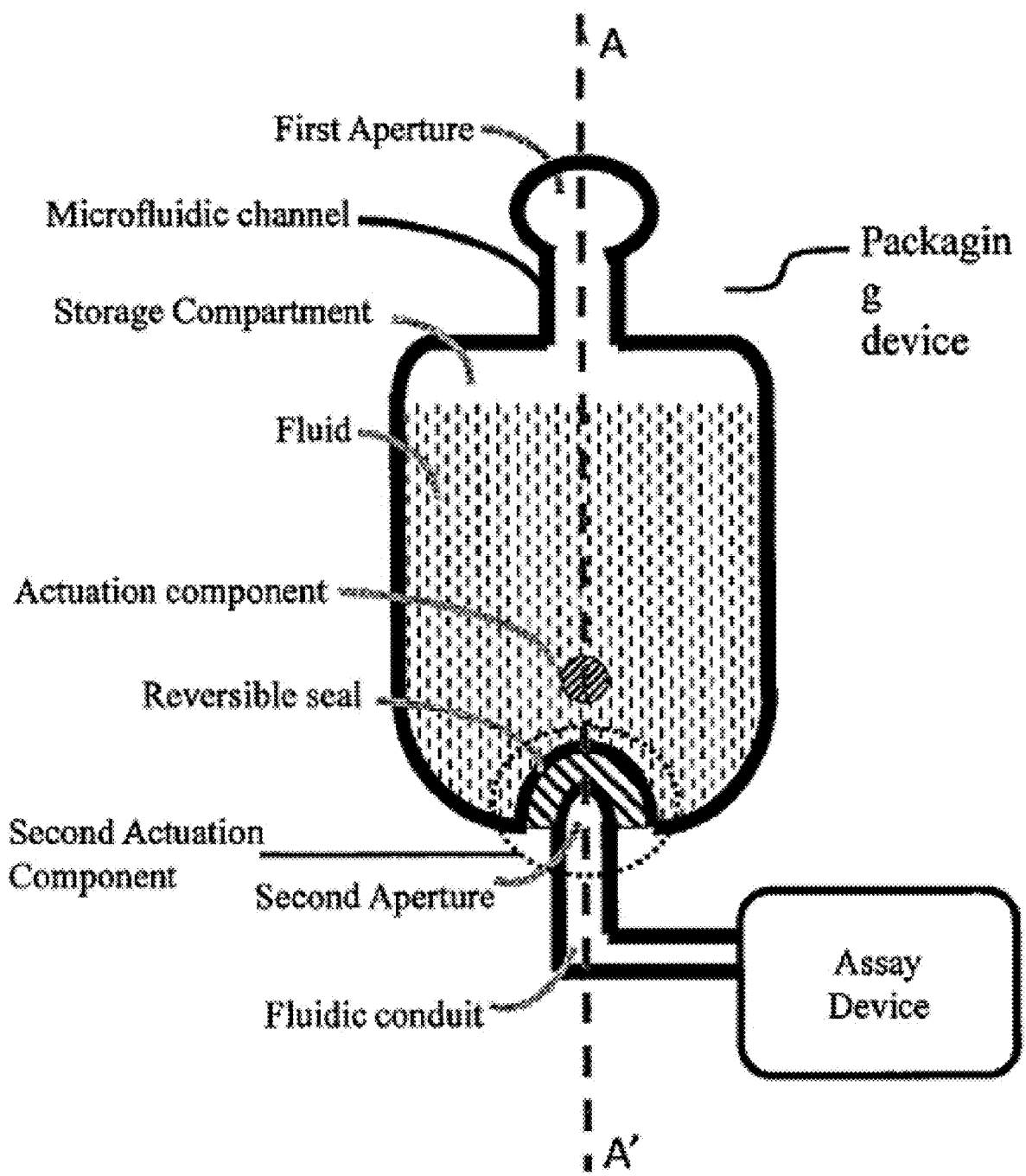
FIGS. 13A-13B illustrates, in accordance with various embodiments of the disclosure, the packaging device can further comprise a second actuation component to close the second aperture, after the reversible seal is broken by the first actuation component.
Figure 13B:
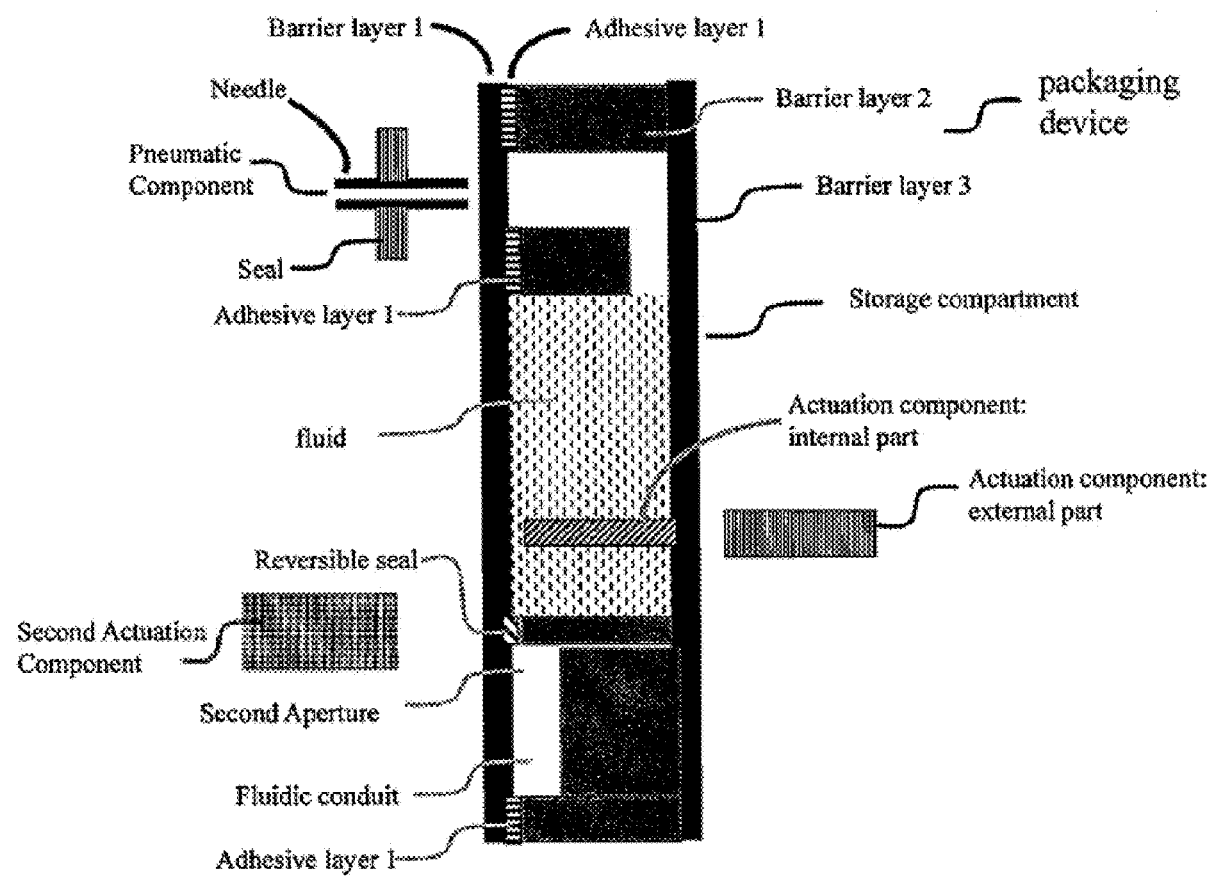

In certain embodiments, as shown in the example of FIG. 13A and FIG. 13B, the packaging device further comprises a second actuation component to close the second aperture, after the reversible seal is broken by the first actuation component.

In various embodiments, a storage compartment described herein has enclosed space for holding a fluid volume in the range of 10-20, 20-30, 30-40, 40-50, 50-60, 60-70, 70-80, 80-90, 90-100, 100-200, 200-300, 300-400, 400-500, 500-600, 600-700, 700-800, 800-900, or 900-1000 nl. In various embodiments, a storage compartment described herein has enclosed space for holding a fluid volume in the range of 1-10, 10-20, 20-30, 30-40, 40-50, 50-60, 60-70, 70-80, 80-90, 90-100, 100-200, 200-300, 300-400, 400-500, 500-600, 600-700, 700-800, 800-900, or 900-1000 μl. In various embodiments, a storage compartment described herein has enclosed space for holding a fluid volume in the range of 1-10, 10-20, 20-30, 30-40, 40-50, 50-60, 60-70, 70-80, 80-90, or 90-100 ml.

In various embodiments, a pneumatic pressure described herein is in the range of about 0-1, 1-5, 5-10, 10-20, 20-30, 30-40, 40-50, 50-60, 60-70, 70-80, 80-90, or 90-100 psig (per square inch gage in relative to atmosphere). The pneumatic pressure can be positive (where the first aperture pressure level is higher than the second aperture pressure level) or negative (wherein the first aperture pressure level is lower than the second aperture pressure level). A positive pneumatic pressure is used to drive a fluid to exit the storage compartment through the second aperture, and a negative pneumatic pressure is used to draw a fluid to enter the storage compartment through the second aperture.

The fluid packaging devices described herein can be used together with various assay devices to form assay systems. For example, the fluid packaging devices described herein can be used with a class of assay devices having a sheathless cytometer (see e.g., U.S. Patent Application No. 62/497,075 and U.S. patent application Ser. No. 15/803,133, which are incorporated herein by reference in their entirety as if fully set forth). An assay system comprising a fluid packaging device and an assay device having a sheathless cytometer can be self-sufficient assay for cytometer analysis of biological samples. For another example, the fluid packaging devices described herein can also be used together with a class of assay devices for Complete Blood Count analysis (see e.g. U.S. Patent Application No. 62/425,395 and U.S. patent application Ser. No. 15/819,416, which are incorporated herein by reference in their entirety as if fully set forth). For yet another example, the fluid packaging devices described herein can also be used together with a class of assay devices for various chemical and biological analysis (see e.g. U.S. patent application Ser. No. 15/176,729, which is incorporated herein by reference in its entirety as if fully set forth). In other embodiments, the fluid packaging devices can be used with any other disposable fluidic cartridges for chemical, biological, and in vitro diagnostic analysis.

In various embodiments, an assay system comprising the fluid packaging device and the assay device is in the format of a fluidic cartridge device. In some embodiments, a sample is received into the fluidic cartridge device, and at least a portion of the sample is mixed with at least a portion of the fluid stored in the fluid packaging device to form a sample mixture.

In various embodiments, after the sample is received into the fluidic cartridge device, the fluidic cartridge device is placed into a reader instrument to perform an analysis of the sample. In some embodiments, the pneumatic pressure applied onto the opened first aperture of the fluid packaging device is from a pneumatic source in the reader instrument.

In various embodiments, the pneumatic component configured to open the first aperture is controlled or driven by the reader instrument. In some embodiments, the pneumatic component is part of the reader instrument. In some embodiments, the pneumatic component is a reusable component.

In various embodiments, the actuation component configured to open the second aperture of the fluid packaging device is controlled or driven by the reader instrument. In some embodiments, the external part of the actuation component is part of the reader instrument. In some embodiments, the external part of the actuation component is a reusable component.

In various embodiments, the second actuation component configured to close the opened second aperture is controlled or driven by the reader instrument. In some embodiments, the second actuation component is part of the reader instrument. In some embodiments, the second actuation component is a reusable component.

Figure 14A:
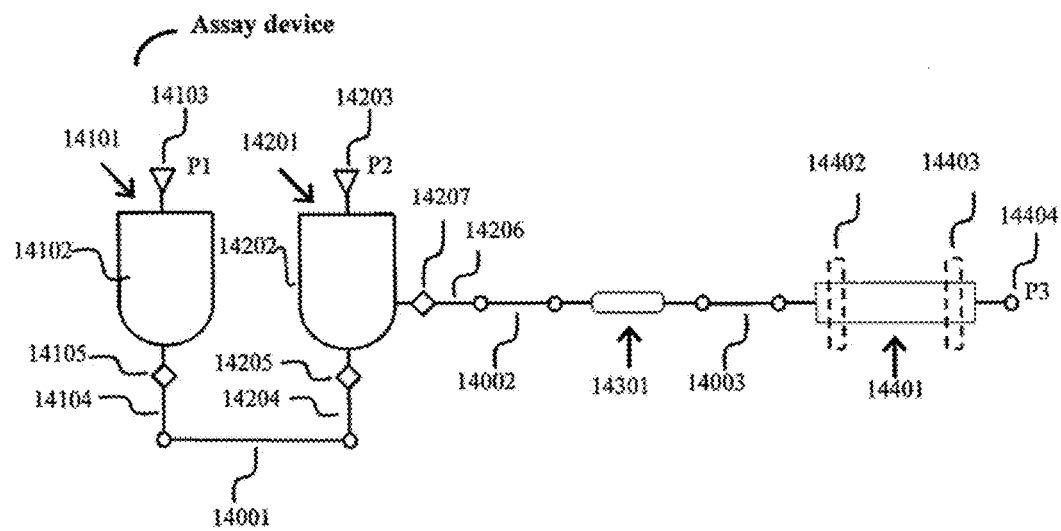
FIG. 14A illustrates, in accordance with various embodiments of the disclosure, an exemplary cytometer assay device described herein.

FIG. 14A shows one non-limiting example of an assay device for cytometer analysis described in U.S. Patent Application No. 62/497,075 or U.S. patent application Ser. No. 15/803,133. In this example, two of the basic fluidic units 14101 and 14201 are used in serial with a sheathless flow cell 14301 and a flow sensor 14401. A fluidic conduit 14001 connects the fluidic unit 14101's microfluidic channel 14104 (having a valve 14105) with the fluidic unit 14201's microfluidic channel 14204 (having a valve 14205). The fluidic unit 14201 has a second microfluidic channel 14206 (having a valve 14207), which connects to the upstream end of the flow cell 14301 by a fluid conduit 14002. The downstream end of the flow cell 14301 is further connected to the flow sensor 14401 by a fluid conduit 14003. In this example, the flow sensor 14401 has two sensing zones 14402 and 14403. The fluid transferring in this assay device is driven by pneumatic pressures, including P1 applying to the venting port 14103 of the fluidic unit 14101, P2 applying to the venting port 14203 of the fluidic unit 14201, and P3 at the downstream port 14404 of the flow sensor 14401.

Figure 14B:
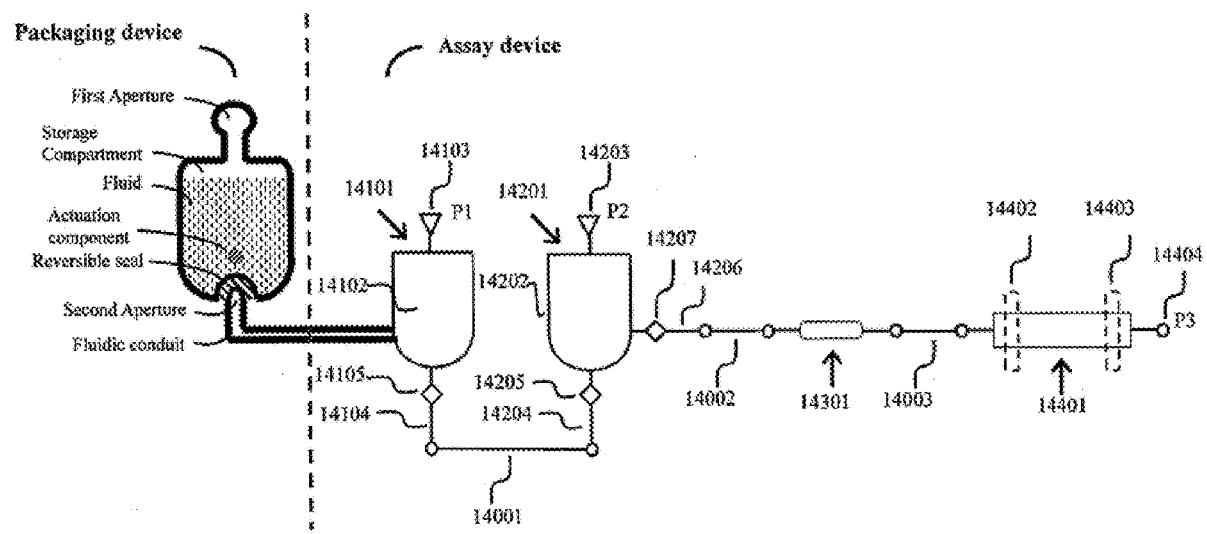
FIG. 14B illustrates, in accordance with various embodiments of the disclosure, one non-limiting example of using a fluid packaging device described herein with an exemplary cytometer assay device to form an assay system. In this example, two of the basic fluidic units 14101 and 14201 are used in serial with a sheathless flow cell 14301 and a flow sensor 14401.

FIG. 14B shows one non-limiting example of using a fluid packaging device described herein with an exemplary cytometer assay device to form an assay system. In this example, this assay system is in the format of a fluidic cartridge device. A fluidic conduit in the assay device that is connected to the chamber 14102 of the fluidic unit 14101 accesses the second aperture of the packaging device. By opening the second aperture with the actuation component, a positive pneumatic pressure can be used to drive the fluid inside the storage compartment to exit the second aperture, and further flow into the chamber 14102 via the fluidic conduit. The fluid reagent from the packaging device is then used for the sheathless cytometer analysis in the assay device. In this example, the fluid packaging device is used to provide on-board fluid reagent for the assay system. In some embodiments, a sample is received into the assay device for analysis. For example, the sample can be received into the chamber 14102. The fluid from the storage compartment is driven by a positive pneumatic pressure to exit the second aperture, flow through the fluidic conduit connected to the chamber 14102, and enter the chamber 14102. At least a portion of the fluid is driven into the chamber 14102, mixes with the sample in the chamber 14102, and forms a sample mixture for analysis. In some embodiments, this assay system is in the format of a fluidic cartridge device, and it can be placed into a reader instrument to perform an analysis of the sample.

Figure 14C:
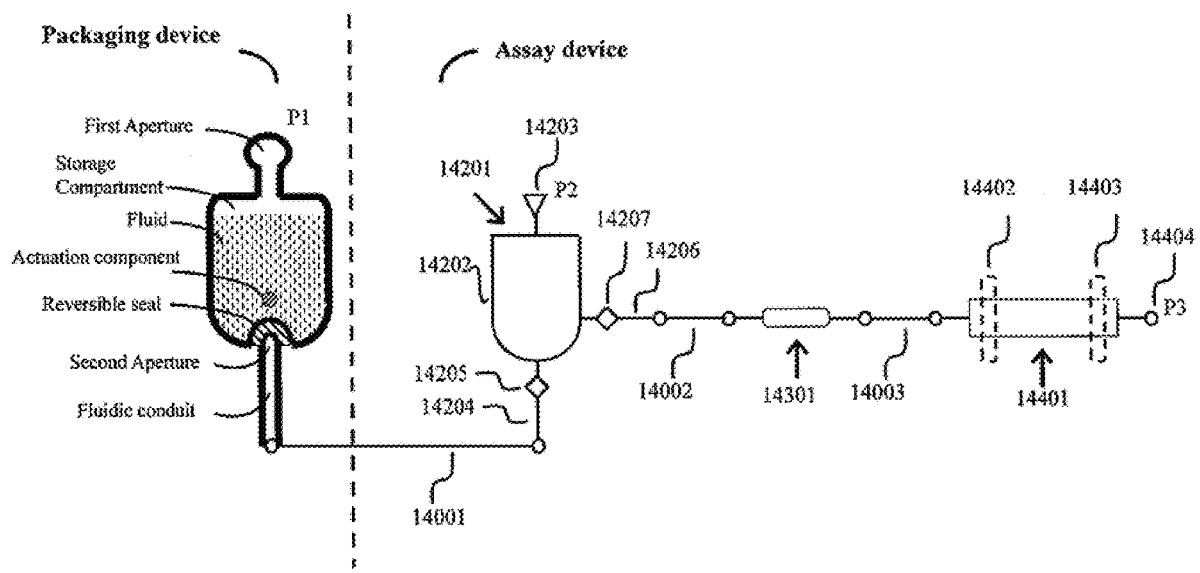
FIG. 14C illustrates, in accordance with various embodiments of the disclosure, another non-limiting example of using the fluid packaging device described herein with an exemplary cytometer assay device to form an assay system. In this example, one fluidic unit 14201 is used in serial with a sheathless flow cell 14301 and a flow sensor 14401.

FIG. 14C shows another non-limiting example of using the fluid packaging device described herein with an exemplary cytometer assay device to form an assay system. In this example, one fluidic unit 14201 is used in serial with a sheathless flow cell 14301 and a flow sensor 14401. A fluidic conduit 14001 connects to the fluidic unit 14201's microfluidic channel 14204 (having a valve 14205). The fluidic unit 14201 has a second microfluidic channel 14206 (having a valve 14207), which connects to the upstream end of the flow cell 14301 by a fluid conduit 14002. The downstream end of the flow cell 14301 is further connected to the flow sensor 14401 by a fluid conduit 14003. In this example, the flow sensor 14401 has two sensing zones 14402 and 14403. In this assay device, a fluidic conduit in connection with the conduit 14001 accesses the second aperture of the packaging device.

By opening the second aperture with the actuation component, a positive pneumatic pressure can be used to drive the fluid inside the storage compartment to exit the second aperture, and further flow into the chamber 14202 via the fluidic conduit 14001. After the second aperture is opened, a negative pneumatic pressure P1 (P1<P2) can also be applied to the first aperture of the packaging device, and then the fluid in the chamber 14202 can be pulled back into the storage compartment via the second aperture. In this way, the storage compartment of the packaging device can be used for functions in addition to reagent storage. For one non-limiting example, it can be used as a mixing chamber for sample preparation as described in U.S. Patent Application No. 62/497,075 and U.S. patent application Ser. No. 15/803,133, which are incorporated herein by reference in their entirety as if fully set forth. By using the packaging device as both a fluid storage component and a functional component in the assay analysis, the complexity of the assay system can be reduced.

Figure 14D:
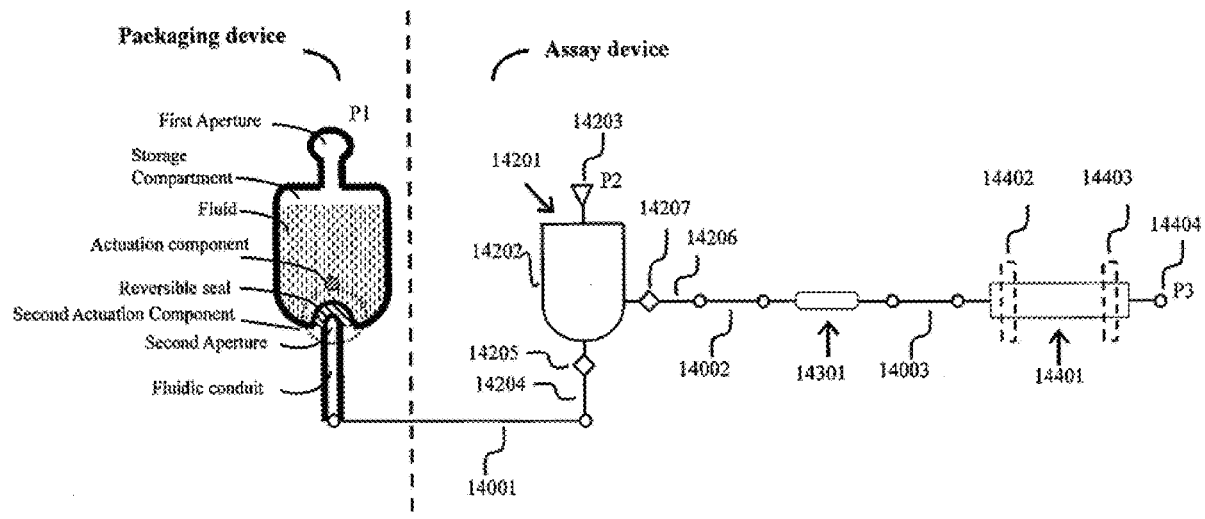
FIG. 14D illustrates, in accordance with various embodiments of the disclosure, that the packaging device can further comprise a second actuation component to close the second aperture.

In some embodiments, as shown in the example of FIG. 14D, the packaging device can further comprise a second actuation component to close the second aperture. This operation can further enrich the possible operations of the assay system. For one non-limiting example, after a certain amount of the fluid is drawn from the chamber 14202 for the cytometer analysis in the sheathless structure 14301, the remaining fluid waste in the chamber 14202 can be pulled into the storage compartment via the opened second aperture. Then the second actuation component can be used to close the second aperture and thus seal the fluid waste inside the storage compartment. In some embodiments, the second actuation component can be used to control the second aperture for multiple switches between the open and closed states, thus enabling additional fluidic functions for the assay system.

In accordance with various embodiments of the present disclosure, a fluid packaging device as described herein can be placed in any orientation for use. In some embodiments, the fluid packaging device is placed in a vertical orientation. In some embodiments, the fluid packaging device is placed in a horizontal orientation. In various embodiments, the fluid packaging device is placed in a tilted, sloped, or inclined orientation.

Figure 15A:
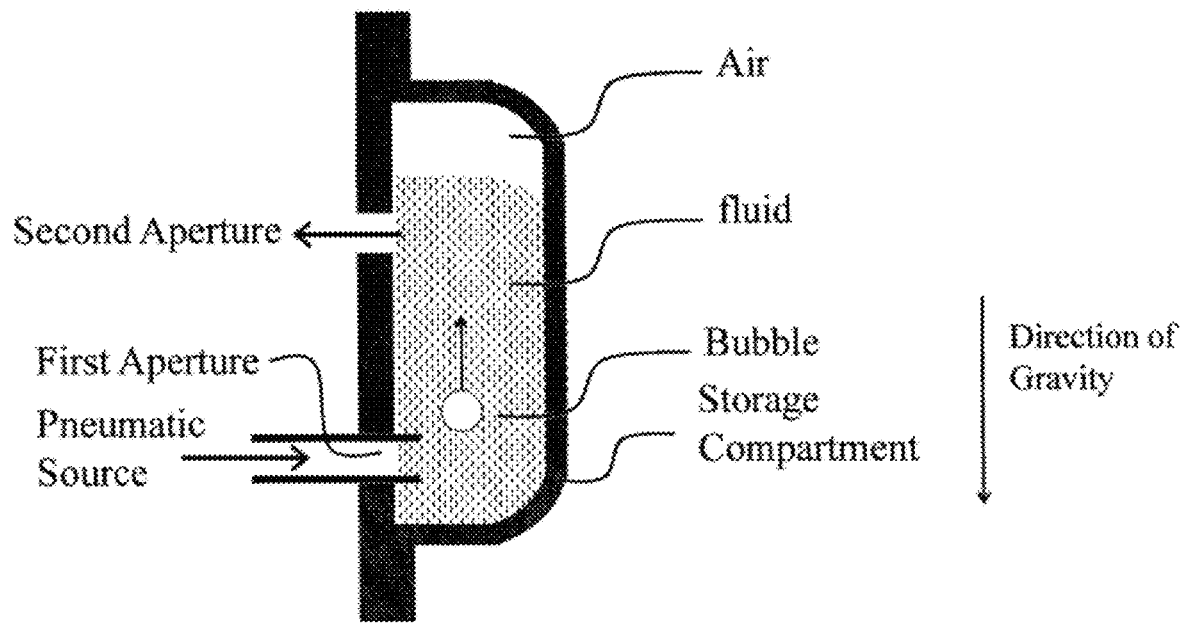
FIG. 15A illustrates, in accordance with various embodiments of the disclosure, that the fluid packaging device is placed in such an orientation where the first aperture is positioned lowered than the second aperture along the direction of gravity.

In some embodiments, the fluid packaging device is placed in such an orientation where the first aperture is positioned lowered than the second aperture along the direction of gravity, as shown in the non-limiting example of FIG. 15A. In this orientation, the fluid is constantly pulled in the direction of gravity, that is, towards the first aperture, while the bubbles formed by air or any other gas introduced by a pneumatic source into the fluid are constantly pushed in the opposite direction of gravity, that is, towards the second aperture. In this orientation, there is the risk of the bubbles being sucked out of the second aperture.

Figure 15B:
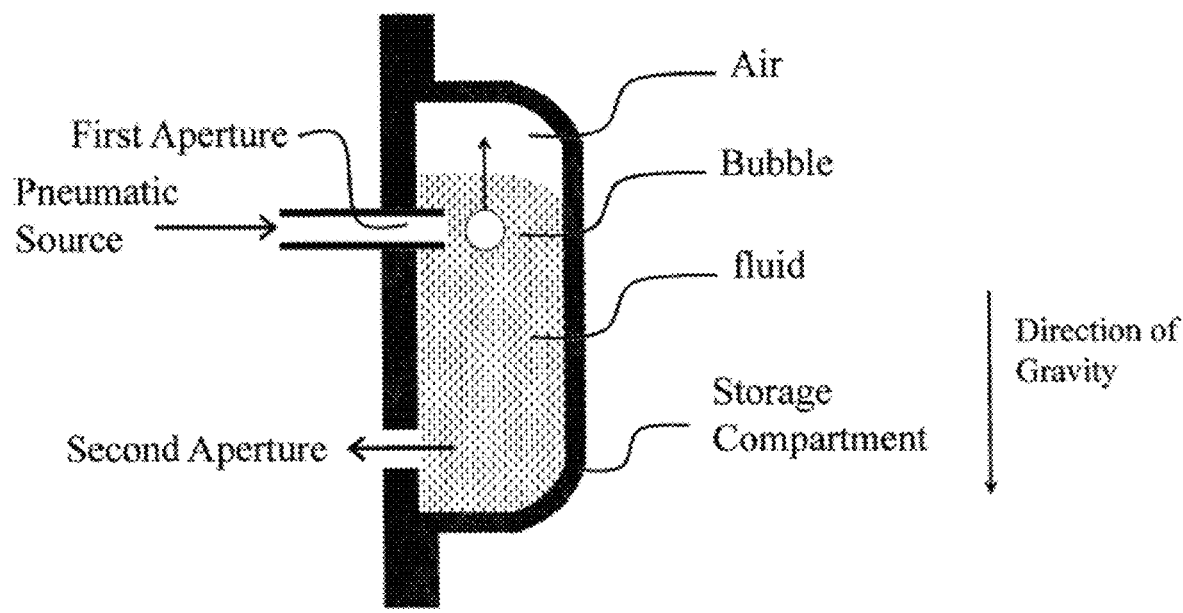
FIG. 15B illustrates, in accordance with various embodiments of the disclosure, that the fluid packaging device is placed in such an orientation where the first aperture is positioned higher than the second aperture along the direction of gravity.

In other embodiments, the fluid packaging device is placed in such an orientation where the first aperture is positioned higher than the second aperture along the direction of gravity, as shown in the non-limiting example of FIG. 15B. In this orientation, the fluid is constantly pulled in the direction of gravity, that is, towards the second aperture, while the bubbles formed by air or any other gas introduced by a pneumatic source into the fluid are constantly pushed in the opposite direction of gravity, that is, away from the second aperture. In this orientation, the risk of the bubbles being sucked out of the second aperture is eliminated.

Figure 16:
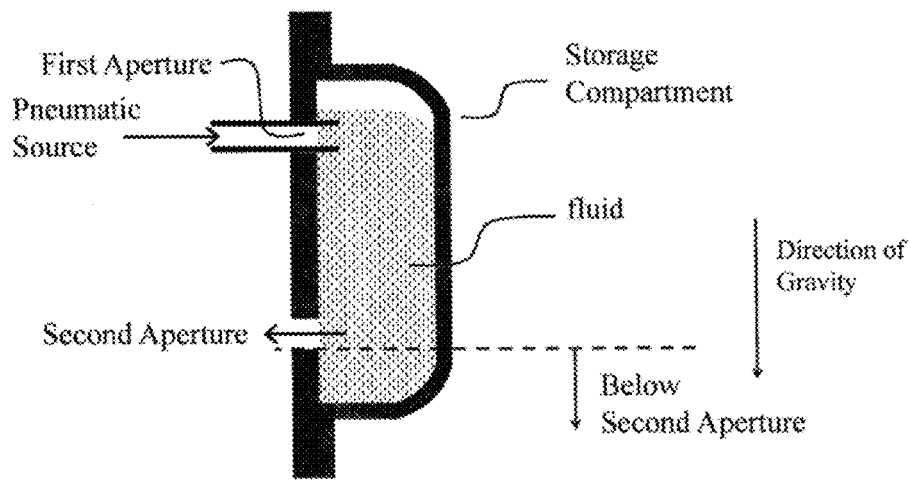
FIG. 16 illustrates, in accordance with various embodiments of the disclosure, that the second aperture is placed at such a position that the volume of the fluid below the second aperture is a small portion of the total fluid volume stored in the packaging device.

In accordance with various embodiments of the present disclosure, the second aperture of the fluid packaging device as described herein can be placed at any position of the storage compartment for use. In some embodiments, the second aperture is placed at such a position, as illustrated in the non-limiting example of FIG. 16, that the volume of the fluid below the second aperture is a small portion of the total fluid volume stored in the packaging device. This is to ensure that a majority of the fluid can easily be driven out of the second aperture by the pneumatic source and the gravity. In various embodiments, the volume of the fluid below the second aperture is less than 0-%, 1-3%, 3-5%, 5-10% or 10-20% of the total fluid volume stored in the packaging device.

Figure 17A:
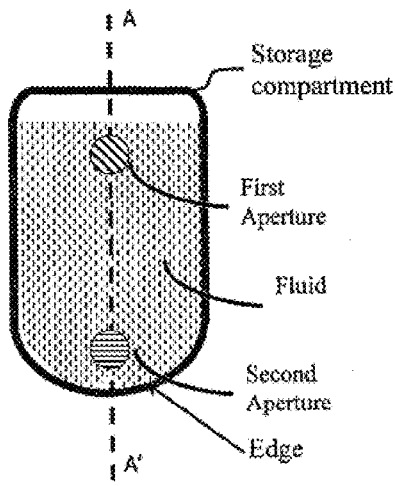
FIG. 17A illustrates, in accordance with various embodiments of the disclosure, that the second aperture can be positioned away from the edge of the storage compartment.
Figure 17A:
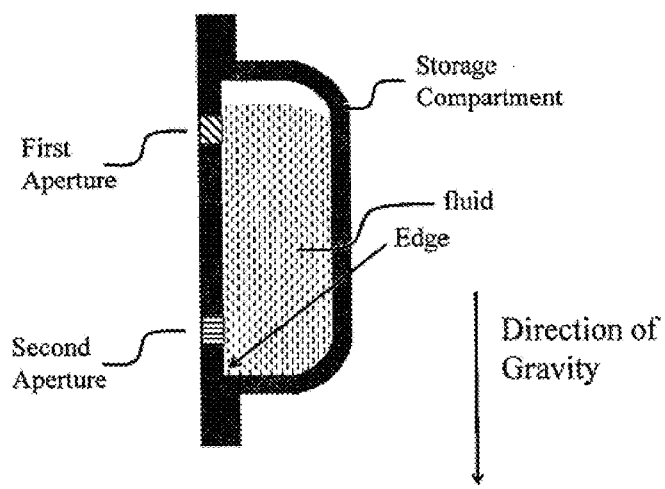
Figure 17B:
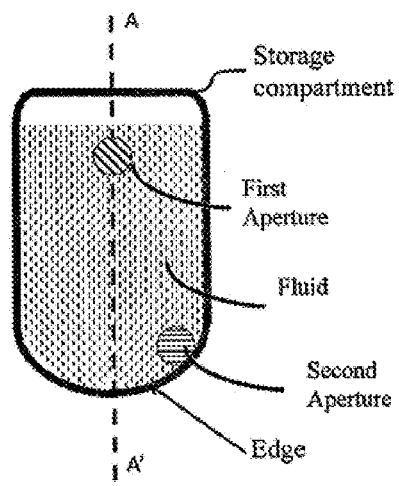
FIGS. 17B-17C illustrates, in accordance with various embodiments of the disclosure, that the second aperture can be positioned in contact with the edge of the storage compartment.
Figure 17B:
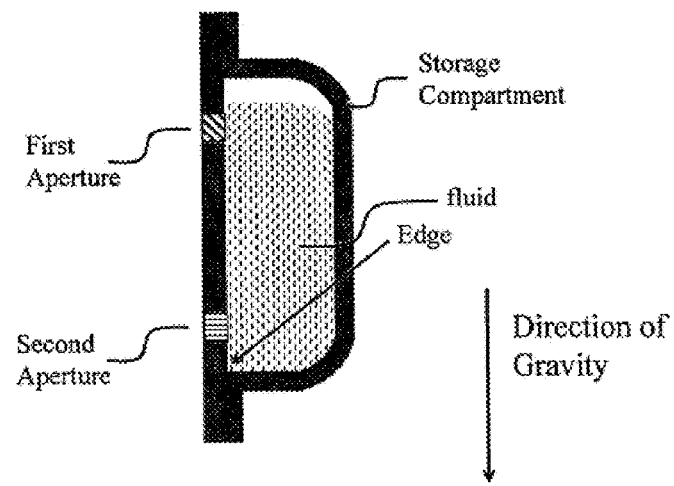
Figure 17C:
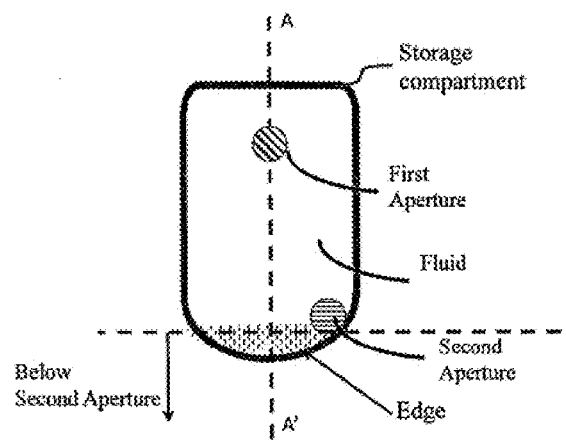
Figure 17C:
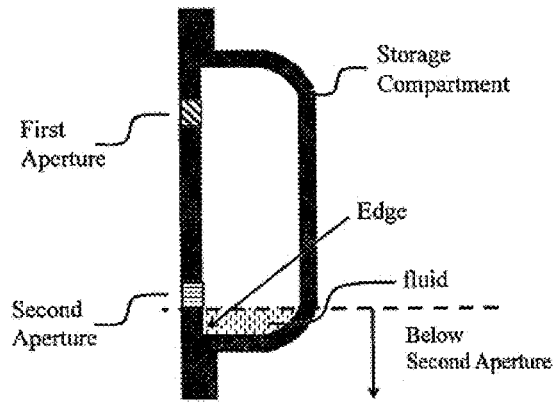

In some embodiments, the second aperture can be positioned away from the edge of the storage compartment, as shown in the non-limiting example of FIG. 17A. In some embodiments, the second aperture can be positioned in contact with the edge of the storage compartment, as shown in the non-limiting example of FIG. 17B. In various embodiments, the edge forms sharp, continuous corner along the boundary of the storage compartment. The residual fluid along this edge is subjected to the capillary force caused by the surface tension of the fluid in the sharp corner, which helps to keep the residual fluid in continuity. By positioning the second aperture to be in contact with the edge, this residual fluid in continuity, even when it is below the second aperture as shown in FIG. 17C, can be driven out of the second aperture by the pneumatic source and the capillary force. In various embodiments, the edge of the storage compartment below the second aperture has a corner angel that is less than 30, 40, 50, 60, 70, 80, 90, 100, 110, or 120 degrees.

Figure 18A:
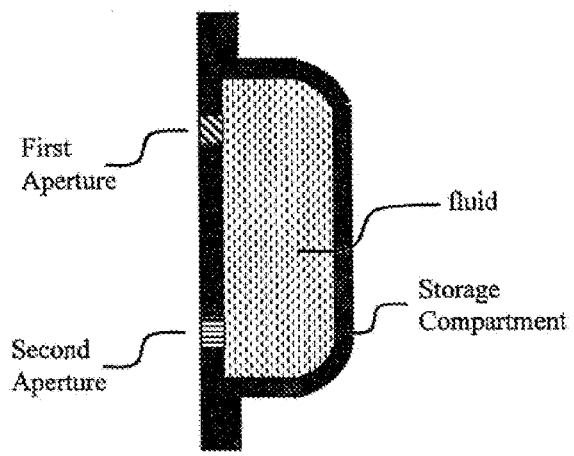
FIG. 18A illustrates, in accordance with various embodiments of the disclosure, that the storage compartment can be initially filled with fluid to 100% of its storage volume.
Figure 18B:
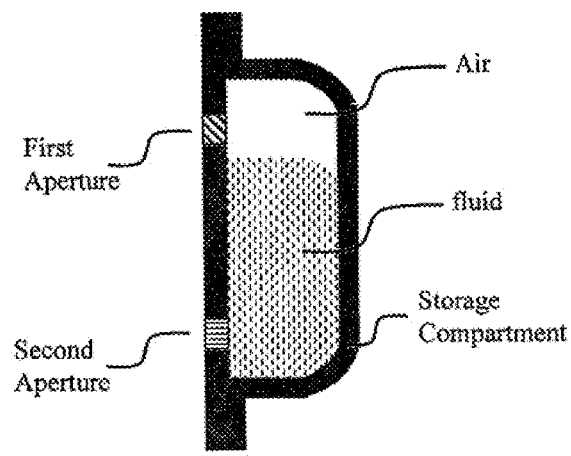
FIG. 18B illustrates, in accordance with various embodiments of the disclosure, that the storage compartment can be initially filled with fluid to less than 100% of its storage volume with the remaining volume being occupied by air or any other gas or vacuum.

In accordance with various embodiments of the present disclosure, the storage compartment can be initially filled with fluid to 100% of its storage volume, as shown in the non-limiting example of FIG. 18A, or filled with fluid to less than 100% of its storage volume with the remaining volume being occupied by air or any other gas or vacuum, as shown in the non-limiting example of FIG. 18B. In various embodiments, the compartment is initially filled by fluid to 30-40%, 40-50%, 50-60%, 60-70%, 70-80%, 80-90%, 90-95%, 95-98%, or 98%-100% of its storage volume, whereas the remaining volume is occupied by air or any other gas or vacuum. In various embodiments, the compartment is initially filled by fluid to 100% of its storage volume. In the manufacturing process, it can be challenging to fill up a storage compartment to 100% of its storage volume. Therefore, it is advantageous that the fluid packaging device can be used when less than 100% of its storage volume in the storage compartment is filled up.

Various embodiments of the present disclosure provide a fluid packaging device, comprising: a) a fluid packaging device comprising one or more fluid storage compartments, wherein each of said fluid storage compartments comprise a fluid, a first aperture and a second aperture that are initially sealed; b) a pneumatic component configured to open the seal of the first aperture and connect a pneumatic pressure source to the storage compartment via the opened first aperture; and c) an actuation component configured to open the seal of the second aperture.

Various embodiments of the present disclosure provide an assay system, comprising: a) a fluid packaging device comprising one or more fluid storage compartments, wherein each of said fluid storage compartments comprise a fluid, a first aperture and a second aperture that are initially sealed; b) a pneumatic component configured to open the seal of the first aperture and connect a pneumatic pressure source to the storage compartment via the opened first aperture; c) an actuation component configured to open the seal of the second aperture; and d) an assay device configured to accept the fluid from the storage compartment via the opened second aperture.

Various embodiments of the present disclosure provide an assay method, comprising: a) operating the actuation component to open the seal of the second aperture; b) operating the pneumatic component to open the seal of the first aperture; and c) applying a positive pneumatic pressure via the pneumatic component to release the fluid from the storage compartment into the assay device via the open second aperture. The sequential order of these steps is not fixed and can be varied. For example, the step a) can be conducted before, after, or together with the step b).

Various embodiments of the present disclosure provide an assay method, comprising: a) operating the actuation component to open the seal of the second aperture; b) operating the pneumatic component to open the seal of the first aperture; c) applying a positive pneumatic pressure via the pneumatic component to release the fluid from the storage compartment into the assay device via the open second aperture; and d) after the release of a portion or the whole of the fluid from the storage compartment into the assay device, applying a negative pneumatic pressure via the pneumatic component to draw the fluid from the assay device into the storage compartment. The sequential order of these steps is not fixed and can be varied. For example, the step a) can be conducted before, after, or together with the step b).

Various embodiments of the present disclosure provide an assay system, comprising: a) a fluid packaging device comprising one or more fluid storage compartments, wherein each of said fluid storage compartments comprise a fluid, a first aperture and a second aperture that are initially sealed; b) a pneumatic component configured to open the seal of the first aperture and connect a pneumatic pressure source to the storage compartment via the opened first aperture; c) a first actuation component configured to open the seal of the second aperture; d) an assay device configured to accept the fluid from the storage compartment via the opened second aperture; and e) a second actuation component configured to close the seal of the second aperture after it was opened.

Various embodiments of the present disclosure provide an assay method, comprising: a) operating the first actuation component to open the seal of the second aperture; b) operating the pneumatic component to open the seal of the first aperture; c) applying a positive pneumatic pressure via the pneumatic component to release the fluid from the storage compartment into the assay device via the open second aperture; and d) after the release of a portion or the whole of the fluid from the storage compartment into the assay device, operating the second actuation component to close the seal of opened second aperture. The sequential order of these steps is not fixed and can be varied. For example, the step a) can be conducted before, after, or together with the step b).

Many variations and alternative elements have been disclosed in embodiments of the present disclosure. Still further variations and alternate elements will be apparent to one of skill in the art. Among these variations, without limitation, are the selection of fluidic units, components and structures for the inventive devices and methods, and the samples that may be analyzed therewith. Various embodiments of the disclosure can specifically include or exclude any of these variations or elements.

In some embodiments, the numbers expressing quantities of ingredients, properties such as concentration, reaction conditions, and so forth, used to describe and claim certain embodiments of the disclosure are to be understood as being modified in some instances by the term "about." As one non-limiting example, one of ordinary skill in the art would generally consider a value difference (increase or decrease) no more than 10% to be in the meaning of the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the disclosure are approximations, the numerical values set forth in the specific examples are reported as precisely as practicable. The numerical values presented in some embodiments of the disclosure may contain certain errors necessarily resulting from the standard deviation found in their respective testing measurements.

Groupings of alternative elements or embodiments of the disclosure disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The disclosure is explained by various examples, which are intended to be purely exemplary of the disclosure, and should not be considered as limiting the disclosure in any way. Various examples are provided to better illustrate the claimed disclosure and are not to be interpreted as limiting the scope of the disclosure. To the extent that specific materials are mentioned, it is merely for purposes of illustration and is not intended to limit the disclosure. One skilled in the art may develop equivalent means or reactants without the exercise of inventive capacity and without departing from the scope of the disclosure.

The various methods and techniques described above provide a number of ways to carry out the application. Of course, it is to be understood that not necessarily all objectives or advantages described can be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as taught or suggested herein. A variety of alternatives are mentioned herein. It is to be understood that some preferred embodiments specifically include one, another, or several features, while others specifically exclude one, another, or several features, while still others mitigate a particular feature by inclusion of one, another, or several advantageous features.

Furthermore, the skilled artisan will recognize the applicability of various features from different embodiments. Similarly, the various elements, features and steps discussed above, as well as other known equivalents for each such element, feature or step, can be employed in various combinations by one of ordinary skill in this art to perform methods in accordance with the principles described herein. Among the various elements, features, and steps some will be specifically included and others specifically excluded in diverse embodiments.

Although the application has been disclosed in the context of certain embodiments and examples, it will be understood by those skilled in the art that the embodiments of the application extend beyond the specifically disclosed embodiments to other alternative embodiments and/or uses and modifications and equivalents thereof.

Preferred embodiments of this application are described herein, including the best mode known to the inventors for carrying out the application. Variations on those preferred embodiments will become apparent to those of ordinary skill in the art upon reading the foregoing description. It is contemplated that skilled artisans can employ such variations as appropriate, and the application can be practiced otherwise than specifically described herein. Accordingly, many embodiments of this application include all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

All patents, patent applications, publications of patent applications, and other material, such as articles, books, specifications, publications, documents, things, and/or the like, referenced herein are hereby incorporated herein by this reference in their entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

It is to be understood that the embodiments of the application disclosed herein are illustrative of the principles of the embodiments of the application. Other modifications that can be employed can be within the scope of the application. Thus, by way of example, but not of limitation, alternative configurations of the embodiments of the application can be utilized in accordance with the teachings herein. Accordingly, embodiments of the present application are not limited to that precisely as shown and described.

Various embodiments of the disclosure are described above in the Detailed Description. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventors that the words and phrases in the specification and claims be given the ordinary and accustomed meanings to those of ordinary skill in the applicable art(s).

The foregoing description of various embodiments of the disclosure known to the applicant at this time of filing the application has been presented and is intended for the purposes of illustration and description. The present description is not intended to be exhaustive nor limit the disclosure to the precise form disclosed and many modifications and variations are possible in the light of the above teachings. The embodiments described serve to explain the principles of the disclosure and its practical application and to enable others skilled in the art to utilize the disclosure in various embodiments and with various modifications as are suited to the particular use contemplated. Therefore, it is intended that the disclosure is not limited to the particular embodiments disclosed for carrying out the disclosure.

While particular embodiments of the present disclosure have been shown and described, it will be obvious to those skilled in the art that, based upon the teachings herein, changes and modifications may be made without departing from this disclosure and its broader aspects and, therefore, the appended claims are to encompass within their scope all such changes and modifications as are within the true spirit and scope of this disclosure.

Additional Aspects of the Present Disclosure

Aspects of the subject matter described herein may be useful alone or in combination with any one or more of the other aspect described herein. Without limiting the foregoing description, in a first aspect of the present disclosure, a device includes a storage compartment; a fluid stored in the storage compartment; a first aperture on the storage compartment; and a second aperture on the storage compartment. The first aperture is initially sealed or closed before the use of the device and configured to be opened to receive a pneumatic pressure. The second aperture is initially sealed or closed before the use of the device and configured to be opened to allow the fluid to exit or enter the storage compartment via the opened second aperture In accordance with a second aspect of the present disclosure, which may be used in combination with any other aspect or combination of aspects listed herein, the storage compartment comprises a barrier layer that comprises a material having a water vapor transmission rate in the range of about 0-0.01, 0.01-0.02, 0.02-0.05, 0.05-0.1, or 0.1-0.2 g·mm/m$^2$·day.

In accordance with a third aspect of the present disclosure, which may be used in combination with any other aspect or combination of aspects listed herein, the storage compartment comprises a barrier layer that comprises one or more of aluminum foil, $SiO_x$, $Al_2O_3$, Cyclic Olefin Polymer, Cyclic Olefin Copolymer, Polychlorotrifluoroethylene, and High-density Polyethylene.

In accordance with a fourth aspect of the present disclosure, which may be used in combination with any other aspect or combination of aspects listed herein, the first aperture comprises a reversible seal or an intact area of a barrier layer. The reversible seal or the intact area of the barrier layer is configured to be opened to allow the first aperture to receive the pneumatic pressure.

In accordance with a fifth aspect of the present disclosure, which may be used in combination with any other aspect or combination of aspects listed herein, the first aperture further comprises a predefined opening that is initially sealed by the reversible seal or the intact area of the barrier layer.

In accordance with a sixth aspect of the present disclosure, which may be used in combination with any other aspect or combination of aspects listed herein, the second aperture comprises a reversible seal or an intact area of a barrier layer. The reversible seal or the intact area of the barrier layer is configured to be opened to allow the fluid to exit or enter the storage compartment via the opened second aperture.

In accordance with a seventh aspect of the present disclosure, which may be used in combination with any other aspect or combination of aspects listed herein, the storage compartment has a storage volume in the range of about 0.01-0.1, 0.1-1, 1-10, 10-20, 20-30, 30-40, 40-50, 50-60, 60-70, 70-80, 80-90, or 90-100 ml.

In accordance with an eighth aspect of the present disclosure, which may be used in combination with any other aspect or combination of aspects listed herein, before the use of the device, the fluid initially fills about 30-40%, 40-50%, 50-60%, 60-70%, 70-80%, 80-90%, 90-95%, 95-98%, or 98%-100% of the storage volume of the storage compartment.

In accordance with a ninth aspect of the present disclosure, which may be used in combination with any other aspect or combination of aspects listed herein, when the device is in use, the first aperture is positioned higher than the second aperture along the gravity orientation.

In accordance with a tenth aspect of the present disclosure, which may be used in combination with any other aspect or combination of aspects listed herein, the device is a part of a fluidic cartridge device.

In accordance with an eleventh aspect of the present disclosure, which may be used in combination with any other aspect or combination of aspects listed herein, the device is configured for transferring at least a portion of the fluid stored in the storage compartment to form a sample mixture with at least a portion of a sample received in the fluidic cartridge device.

In accordance with a twelfth aspect of the present disclosure, which may be used in combination with any other aspect or combination of aspects listed herein, the storage compartment further comprises a microfluidic channel between the first aperture and the liquid stored in the storage compartment.

In accordance with a thirteenth aspect of the present disclosure, which may be used in combination with any other aspect or combination of aspects listed herein, a method comprises: providing a device including a storage compartment, a fluid stored in the storage compartment, a first aperture on the storage compartment, and a second aperture on the storage compartment; opening the first aperture; opening the second aperture; and applying a pneumatic pressure to the opened first aperture to move the fluid to exit or enter the storage compartment via the opened second aperture. The first aperture is initially sealed or closed before the use of the device. The second aperture is initially sealed or closed before the use of the device.

In accordance with a fourteenth aspect of the present disclosure, which may be used in combination with any other aspect or combination of aspects listed herein, the storage compartment comprises a barrier layer.

In accordance with a fifteenth aspect of the present disclosure, which may be used in combination with any other aspect or combination of aspects listed herein, the first aperture comprises a reversible seal or an intact area of a barrier layer. The reversible seal or the intact area of the barrier layer is configured to be opened to allow the first aperture to receive the pneumatic pressure.

In accordance with a sixteenth aspect of the present disclosure, which may be used in combination with any other aspect or combination of aspects listed herein, the second aperture comprises a reversible seal or an intact area of a barrier layer. The reversible seal or the intact area of the barrier layer is configured to be opened to allow the fluid to exit or enter the storage compartment via the opened second aperture.

In accordance with a seventeenth aspect of the present disclosure, which may be used in combination with any other aspect or combination of aspects listed herein, before the use of the device, the fluid initially fills about 30-40%, 40-50%, 50-60%, 60-70%, 70-80%, 80-90%, 90-95%, 95-98%, or 98%-100% of the storage volume of the storage compartment.

In accordance with an eighteenth aspect of the present disclosure, which may be used in combination with any other aspect or combination of aspects listed herein, when the device is in use, the first aperture is positioned higher than the second aperture along the gravity orientation.

In accordance with a nineteenth aspect of the present disclosure, which may be used in combination with any other aspect or combination of aspects listed herein, a method as described herein further comprises using an external actuation component to seal or close the opened second aperture.

In accordance with a twentieth aspect of the present disclosure, which may be used in combination with any other aspect or combination of aspects listed herein, the device is a part of a fluidic cartridge device.

In accordance with a twenty-first aspect of the present disclosure, which may be used in combination with any other aspect or combination of aspects listed herein, a method as described herein further comprises transferring at least a portion of the fluid stored in the storage compartment to form a sample mixture with at least a portion of a sample received in the fluidic cartridge device.

In accordance with a twenty-second aspect of the present disclosure, which may be used in combination with any other aspect or combination of aspects listed herein, a method as described herein furthering comprises transferring at least a portion of the sample received in the cartridge device into the storage compartment via the opened second aperture.

In accordance with a twenty-third aspect of the present disclosure, which may be used in combination with any other aspect or combination of aspects listed herein, a method as described herein further comprises placing the cartridge device into a reader instrument for analysis.

In accordance with a twenty-fourth aspect of the present disclosure, which may be used in combination with any other aspect or combination of aspects listed herein, a system for analyzing a sample includes: a device comprising: a storage compartment; a fluid stored in the storage compartment; a first aperture on the storage compartment; a second aperture on the storage compartment; and a reader instrument configured for receiving the device to perform an analysis of the sample. The first aperture is initially sealed or closed before the use of the device and configured to be opened to receive a pneumatic pressure. The second aperture is initially sealed or closed before the use of the device and configured to be opened to allow the fluid to exit or enter the storage compartment via the opened second aperture.

The disclosure claimed is:

1. A fluid cartridge device comprising a packaging device, said packaging device comprising:
a storage compartment;
a fluid stored in the storage compartment; and
an aperture on the storage compartment, the aperture being initially sealed or closed before the use of the packaging device and being configured to be opened to allow the fluid to exit or enter the storage compartment via the opened aperture;
wherein:
the packaging device is configured to transfer at least a portion of the fluid stored in the storage compartment to form a sample mixture with at least a portion of a sample received in the fluid cartridge device; and
the packaging device is configured to transfer at least a portion of the sample mixture back into the storage compartment via the opened aperture,
such that the packaging device functions both as a storage device and as a mixing device.

2. The fluid cartridge device of claim 1, wherein the aperture comprises a reversible seal.

3. The fluid cartridge device of claim 1, wherein the aperture is configured to be opened to allow the fluid to exit or enter the storage compartment via the opened aperture by an internal actuation component inside the storage compartment.

4. The fluid cartridge device of claim 3, wherein the internal actuation component is configured to open the aperture by compressing a part of the packaging device.

5. The fluid cartridge device of claim 1, wherein a gas-liquid interface or a vacuum-liquid interface is initially positioned above the aperture along a gravity direction.

6. The fluid cartridge device of claim 1, wherein:
the packaging device comprises an additional aperture on the storage compartment; and
the additional aperture is initially sealed or closed before the use of the packaging device.

7. The fluid cartridge device of claim 6, wherein:
the additional aperture comprises an intact area of a barrier layer; and
the additional aperture is configured to be pierced open.

8. The fluid cartridge device of claim 6, wherein the additional aperture is configured to be opened to receive a pneumatic pressure.

9. The fluid cartridge device of claim 6, wherein:
the additional aperture is positioned higher than the aperture along a gravity direction; and
a gas-liquid interface or a vacuum-liquid interface is initially positioned between the additional aperture and the aperture along the gravity direction.

10. The fluid cartridge device of claim 6, further comprising a microfluidic channel, wherein the microfluidic channel separates the additional aperture from the fluid stored in the storage compartment.

11. The fluid cartridge device of claim 6, further comprising a microfluidic channel, wherein the microfluidic channel is smaller than the additional aperture in a dimension measurement selected from the group consisting of width and height.

12. A packaging device, comprising:
a storage compartment;
a fluid stored in the storage compartment;
a first aperture on the storage compartment, the first aperture being initially sealed or closed before the use of the packaging device;
a second aperture on the storage compartment, the second aperture being initially sealed or closed before the use of the packaging device and being configured to be opened to allow the fluid to exit or enter the storage compartment via the opened second aperture; and an internal actuation component in the storage compartment;

wherein:
the second aperture comprises a reversible seal; and
the internal actuation component is configured to open the second aperture.

13. The packaging device of claim 12, wherein the internal actuation component is configured to break the reversible seal by compressing a part of the packaging device.

14. The packaging device of claim 12, wherein a gas-liquid interface or a vacuum-liquid interface is initially positioned above the second aperture along a gravity direction.

15. The packaging device of claim 12, wherein:
the first aperture is positioned higher than the second aperture along a gravity direction; and
a gas-liquid interface or a vacuum-liquid interface is initially positioned between the first aperture and the second aperture along the gravity direction.

16. The packaging device of claim 12, further comprising a microfluidic channel, wherein the microfluidic channel separates the first aperture from the fluid stored in the storage compartment.

17. The packaging device of claim 12, further comprising a microfluidic channel, wherein the microfluidic channel is smaller than the first aperture in a dimension measurement selected from the group consisting of width and height.

18. The packaging device of claim 12, wherein:
the first aperture comprises an intact area of a barrier layer; and
the first aperture is configured to be pierced open.

19. The packaging device of claim 12, wherein the first aperture is configured to be opened to receive a pneumatic pressure.

20. The packaging device of claim 12, wherein:
the packaging device is configured to transfer at least a portion of the fluid stored in the storage compartment to form a sample mixture with at least a portion of a sample received in a fluid cartridge device; and
the packaging device is configured to transfer at least a portion of the sample mixture back into the storage compartment via the opened aperture,
such that the packaging device functions both as a storage device and as a mixing device.

* * * * *